United States Patent [19]

Johnson

[11] Patent Number: 5,689,529
[45] Date of Patent: *Nov. 18, 1997

[54] COMMUNICATIONS METHOD AND APPARATUS FOR DIGITAL INFORMATION

[75] Inventor: Neldon P. Johnson, American Fork, Utah

[73] Assignee: International Automated Systems, Inc., American Fork, Utah

[*] Notice: The term of this patent shall not extend beyond the expiration date of Pat. No. 5,517,528.

[21] Appl. No.: 628,280

[22] Filed: Apr. 5, 1996

Related U.S. Application Data

[63] Continuation-in-part of Ser. No. 533,618, Sep. 26, 1995, Pat. No. 5,640,422, which is a continuation-in-part of Ser. No. 285,030, Aug. 2, 1994, Pat. No. 5,517,528.

[51] Int. Cl.$^6$ ............................................. H04L 27/00
[52] U.S. Cl. ..................... 375/259; 375/260; 375/295; 375/350; 455/59; 370/442; 370/522
[58] Field of Search ........................... 375/259, 260, 375/295, 345, 350, 316; 370/95.1, 95.3, 110.1, 110.4; 455/59, 234.1; 364/724.01

[56] References Cited

U.S. PATENT DOCUMENTS

| | | | |
|---|---|---|---|
| 3,805,191 | 4/1974 | Kawai | 332/9 |
| 3,890,620 | 6/1975 | Toman | 343/108 |
| 4,001,728 | 1/1977 | Schneider | 332/1 |
| 4,103,238 | 7/1978 | Deming | 325/141 |
| 4,347,616 | 8/1982 | Murakami | 375/20 |
| 4,387,455 | 6/1983 | Schwartz | 370/11 |
| 4,584,692 | 4/1986 | Yazuka | 375/38 |
| 4,766,589 | 8/1988 | Fisher | 370/98 |
| 5,220,557 | 6/1993 | Kelley | 455/103 |
| 5,274,672 | 12/1993 | Weiss | 375/305 |
| 5,364,536 | 11/1994 | Tsujimoto | 375/363 |
| 5,369,669 | 11/1994 | Tombal et al. | 370/110.4 |
| 5,390,185 | 2/1995 | Hooijmans et al. | 370/98 |

*Primary Examiner*—Stephen Chin
*Assistant Examiner*—T. Ghebretinsae
*Attorney, Agent, or Firm*—J. David Nelson

[57] ABSTRACT

A method and apparatus for single signal, multiple channel digital information transfer through pulses with time slot allocation. The apparatus consists of one or more transmitting devices and one or more receiving devices. Multiple source signals are each allocated a unique time slot between successive synchronization pulses. Digital signals from each source are converted to analog information pulses synthesized from a combination of a fundamental frequency wave and a finite number of its harmonics. The total signal, which consists of successive synchronization pulses interspersed with information pulses for each signal source, each within its allocated time slot, is transmitted to the receivers. Each receiving device extracts the fundamental frequency and harmonic components through the use of narrow bandpass, high Q filters for each information pulse in its time slot and uses the known algorithm to reproduce the input digital signals. One or more of the harmonic components may be used for transmitting a reference calibration signal.

197 Claims, 15 Drawing Sheets

LEGEND
1- Transmission Apparatus
2- Digital to Analog Signal Generator
3- Digital Input
4- Composite Signal Generator
5- Sync Pulse Receiver
6- Zero Crossing Reference
7- Sync Pulse
8- Sync Pulse Generator
9- Information Pulse
10- Transmitter
11- Synchronized Information Pulse
14- Control Receiver
15- Master Control Circuit LEGEND
23- Fundamental Frequency
24- Harmonies
25- Frequency Axis
26- Amplitude Axis
27- Frequency Spectrum Between Harmonies

LEGEND
28- First Example of Fourier Formula for Synthesized Wave
29- First Synthesized Wave
30- Second Example of Fourier Formula for Synthesized Wave
31- Second Synthesized Wave LEGEND
2- Digital to Analog Signal Generator
3- Digital Input
4- Composite Signal Generator
6- Zero Crossing Reference
7- Sync Pulse
9- Information Pulse
10- Transmitter
11- Synchronized Information Pulse
12- Transmission Apparatus
13- Sync Pulse Circuit
15- Master Control Circuit LEGEND
37- Impulse Filters
38- Signal Delay Circuits
39- Delay Signal Switches
40- Narrow Band Pass Filters
41- Final Switches

LEGEND
49- Positive Peak Detectors
50- Negative Peak Detectors
51- Analog to Digital Convertors
52- Calibration Circuit
53- Synchronization/Reference Wave
54- Information Wave
55- Information Wave
56- Delay Circuits
57- Narrow Band Pass Filters

COMMUNICATIONS METHOD AND APPARATUS FOR DIGITAL INFORMATION

REFERENCE TO PRIOR FILED CO-PENDING APPLICATIONS

This application is a continuation-in-part application of U.S. patent applications Ser. No. 08/533,618 filed on Sep. 26, 1995 U.S. Pat. No. 5,640,422 which is a CIP of Ser. No. 08/285,030 filed Aug. 2, 1994, U.S. Pat. No. 5,517,528.

FIELD OF THE INVENTION

This invention relates to methods and apparatuses for the use of electromagnetic waves for information transfer and more particularly to methods and apparatuses for the use of electromagnetic waves for digital information transfer.

BACKGROUND OF THE INVENTION

There are several principal modulation methods for electromagnetic signals used in communications. The ones that are most widely used are frequency modulation (FM), amplitude modulation (AM), pulse width modulation (PWM) and phase modulation (PM). There have also been some other less widely used methods for transmitting and receiving information by means of electromagnetic signals. The demands of modern information transfer, in particular computer networking and multi-media communications, have increased the need to transmit more and more information on limited channels of communication. With the ever increasing capacity of digital computers, there is an ever increasing demand for modulation methods to enhance the volume of digital data that can be transmitted and received.

Methods have been developed for increasing the amount of information that can be transmitted and received. One such method is described in U.S. Pat. No. 4,387,455 to Schwartz. This method utilizes several different modulation systems at the same time over the same channel. However, this method uses FM and AM modulation and requires several cycles for each digital bit. Similarly, the device disclosed in U.S. Pat. No. 4,103,238 to Deming, provides for three modulation patterns to be transmitted simultaneously on a single carrier wave. Again, multiple cycles are required for each digital bit. The deficiencies of these methods are typical of efforts to increase the amount of information transmitted.

The method disclosed in U.S. Pat. No. 4,584,692 to Yazuka relies on the same common modulation methods but introduces polarity modulations as a means of enhancing the amount of information that can be transmitted. The polarity of the waves is modulated to encode information and then the original wave and the modulated wave are compared to allow decoding of the information. This results in a modest increase in the amount of information that can be transmitted over a single signal.

Various methods designed specifically for digital information transfer provide some enhancement of the data transfer capabilities. The method disclosed in U.S. Pat. No. 4,001,728 to Schneider is a method of transmitting digital signals through the use of pulse width modulation on an incremental ramp wave. A method of transmitting multiple digital signals on a single carrier wave is disclosed in U.S. Pat. No. 4,347,616 to Murakami. Another method providing for the simultaneous transmission of multiple digital signals independently modulated is disclosed in U.S. Pat. No. 3,805,191 to Kawai.

The method disclosed in U.S. Pat. No. 3,890,620 to Toman provides for the modulation of a carrier wave at prescribed time intervals with digital information. This method, however, points up the limitations of attempts to enhance existing methods of digital information transfer. Incoming digital data must first be stored and then it is recalled for transmission at a rate compatible with the carrier wave modulation. The receiver then extracts the digital information from the signal by synchronization with the transmitter. The resultant signal is subject to interference at both the carrier frequency and the modulation frequency.

U.S. Pat. No. 5,364,536 to Tsujimoto discloses a means of modulating a "data burst" on a carrier signal. Tsujimoto uses a modulation scheme to add a sync burst to the modulated carrier signal. This is accomplished by taking a delayed version of the data burst and the non-delayed data burst and taking the difference. This creates an artificial null in the frequency spectrum of the signal. This null spectrum sync burst is added to the signal before signal transmission. Thus for Tsujimoto, the sync burst becomes a signature burst for identifying the data burst. This method, as with the other known methods, relies upon the modulation of a carrier signal. It also does not provide for allocating time slots to multiple information signals. Also, for Tsujimoto the output digital signal is not calibrated. Instead, the signal strength of the carrier wave is calibrated. The null spectrum sync burst is not used for calibrating the received signal.

The present invention is a method and apparatus for transmitting digital communications. The present invention's primary advantage over traditional modulation techniques is the quantity of digital information that can be transmitted and received. Both FM and AM modulation were developed for transmitting analog signals and, for that reason, are cumbersome in transmitting digital signals. The present invention is designed specifically for transmitting digital signals.

This method does not require a carrier wave to transmit the information. Depending upon the information signal sources and the frequencies utilized, thousands of times more information can be transmitted. In FM systems hundreds and even thousands of cycles are required for just one bit of information. This is also true for AM modulation systems. The present invention provides for the placement of two bytes or more of information in each and every cycle. Another advantage of the present invention is the enhanced signal to noise ratio.

One objective of the present invention is to provide a digital information transfer method which does not require a carrier wave.

Another objective of the present invention is to provide a method and apparatus which substantially increases the amount of digital information that can be transmitted on a single signal.

A further objective is to provide a method and apparatus for transmitting and receiving multiple channels of information on a single communication signal.

A still further objective of the present invention is to provide a method and apparatus for continuously synchronizing a transmitter and receiver so that multiple channels of information can be reliably transmitted on a single communication signal by allocation of time slots to each channel.

A still further objective is to provide a method and apparatus for received signals to be calibrated by the receiver to compensate for signal attenuation, losses, noise, distortion and interference, and thereby to provide for very accurate read out of the digital information transmitted.

A still further objective is to provide a method and apparatus for digital information transfer which can utilize either a common synchronized transmitter or a plurality of remote synchronized transmitters and can utilize either a common receiver or a plurality of receivers.

A still further objective is to provide a method and apparatus for digital information transfer which will increase the signal to noise ratio of the received signals in comparison to other known methods.

A still further objective is to provide a method and apparatus for digital information transfer which will reduce the signal bandwidth required for transmission.

SUMMARY OF THE INVENTION

The present invention provides a method and apparatus for increasing the amount of digital information that can be transmitted over an electromagnetic signal. The apparatus of a preferred embodiment of the present invention includes computer circuits and transmission and receiving devices. Embodiments of the apparatus can include multiple transmitters at multiple locations or a single transmitter which is accessed by each signal source. Under either embodiment, each signal source is allocated a time slot for each successive cycle between synchronization pulses. If multiple transmission locations and transmission apparatuses are utilized, each such transmission apparatus is equipped with an analog receiver for receiving synchronization pulse transmissions from a master synchronization pulse transmitter. Each remote signal source is allocated a unique time slot between successive synchronization pulses for transmission of information simultaneously with other remote signal sources which are each allocated a different time slot between the successive synchronization pulses. Likewise, if a common transmission location and transmission apparatus is utilized, each signal source that accesses the system is allocated a unique time slot between successive synchronization pulses which are generated by the master synchronization pulse transmitter.

For each signal source, the digital value of the source signal during its allocated time slot, is converted, under a preferred embodiment, to an analog pulse, called an information pulse, which is comprised of a wave form synthesized by combining a wave of a selected fundamental frequency and a finite number of waves which are harmonics of the fundamental frequency wave. The wave forms may be sinusoidal or a variety of other waveforms may be used. The amplitudes and phases or the power distribution of the fundamental frequency wave component and each of the respective harmonic wave components of the information pulse is determined by an algorithm based upon the digital value of the source signal which is to be transmitted. Whether the algorithm is amplitude or power based, the result is a composite wave which carries the digital value of the source digital signal.

Each of the information pulses are transmitted and received at each of the desired receiving locations, where it is demodulated. Narrow bandpass filters are used to separate each information pulse into its fundamental frequency and harmonic components. With the algorithm known that was used to generate the amplitudes and phases or power distribution of the fundamental frequency and harmonics components, the magnitude of the original digital input is reproduced. Under some preferred embodiments, the relative magnitude of the harmonic components as compared to the magnitude of the fundamental frequency wave is determined by the algorithm based upon the magnitude of the digital input. For these embodiments, the effects of signal attenuation or noise are reduced, since the fundamental frequency and harmonic components generally will be affected proportionally and relative magnitudes, therefore, generally will not be affected. Also, since a finite number of harmonics are used, the use of filters to separate the information pulse into its fundamental frequency and harmonics components is practical and results in a high signal-to-noise ratio for the received signal.

Under other embodiments, the amplitude or power of one or more of the harmonics can also be used as a reference to allow each of the signal components to be calibrated back to its original amplitude or power, before the algorithm is used to reproduce the magnitude of the digital input.

The present invention can also be used in conjunction with the modulation method and apparatus disclosed in prior related application 08/285,030. That application discloses a modulation method which provides for the generation of time slot allocated information pulses which each consist of an information component and a reference component. Preferably the information component is a positive information spike of a selected waveform and the reference component is a negative reference spike of a selected waveform. The amplitude of the reference spike is held constant and the amplitude of the information spike is a function of the digital input. The method and apparatus of the present invention can be used to enhance the demodulation of the information pulse at the receiving end by synthesizing an information pulse with the desired information spike and reference spike amplitudes through a combination of a selected fundamental frequency wave and a finite number of its harmonics. While a complete synthesis of a wave from the combination of the fundamental frequency wave and its harmonics, according to the Fourier Theorem, requires, generally, an infinite number of harmonics, a wave can be synthesized with the desired magnitude, to any desired degree of error, and with the general wave form desired, through the use of a finite number of harmonics.

Similarly, the present invention can also be used in conjunction with the modulation method and apparatus disclosed in prior related application 08/533,618. That application discloses a modulation method which provides for the generation of time slotted information pulses, each having a positive and a negative wave segment and having a pre-set positive-to-negative offset. The ratio of the amplitude of the positive wave segment to the amplitude of the negative wave segment, the positive-to-negative ratio, is a function of the magnitude of the digital input. The pre-set positive-to-negative offset is the calibration control. The method and apparatus of the present invention can be used to enhance the demodulation of the information pulse at the receiving end by synthesizing an information pulse with the pre-set positive-to-negative offset and with the desired positive-to-negative ratio, through a combination of a selected fundamental frequency wave and a finite number of its harmonics. Through the use of a sufficient number of harmonics, the pre-set positive-to-negative offset and the desired positive-to-negative ratio can be maintained within desired error limitations. Again, narrow bandpass filters are used to separate the received signal into its fundamental frequency and harmonic components, which are then used to reproduce the magnitude of the digital input.

Within the allocated time slot for the information pulse, the transmission apparatus of the present invention generates the information pulse. Whether the embodiment utilizes remote transmission locations and apparatuses or a common transmission location and apparatus, an information pulse is generated for each signal source for each cycle of its allocated time slot. The information pulse generated for each signal source is transmitted in that time slot for each successive cycle of the synchronization pulses. These transmissions may be from remote locations or from a common location and may be wireless or may be transmitted via any of the well known media.

The synchronization pulses provide for continuous synchronization of the transmitting apparatus and the receiving apparatus so that channel tracking integrity is maintained at all times. A common receiver can be utilized from which the various channels of information are disseminated to users or a plurality of receivers can be utilized at various points of use or dissemination.

Other embodiments of the present invention utilize a continuous synchronization wave with a repetitive waveform. One or more cycles of the synchronization wave are generated and transmitted in each time slot. The synchronization wave may be generated and transmitted with a constant pre-set amplitude so that one or more cycles contained in each time slot may be used by the receiver for calibration of the information signal. Alternatively, the amplitude of one of the cycles of the synchronizing wave for each cycle of the allocated time slots may be used as a counter or identifier to facilitate synchronization.

Other embodiments of the present invention may provide for simultaneous transmission of multiple information pulses at distinct frequencies in each time slot. A simple version of these embodiments provides for the use of a simple, repetitive waveform for each of the transmission frequencies, with only the amplitude of each wave being varied in each time slot as a function of the magnitude of the input digital signal allotted to the time slot. A continuous synchronizing wave can be used with these embodiments for calibration or a separate reference wave can be transmitted at one of the information frequencies.

DETAILED DESCRIPTION OF THE PREFERRED EMBODIMENTS

Figure 1:
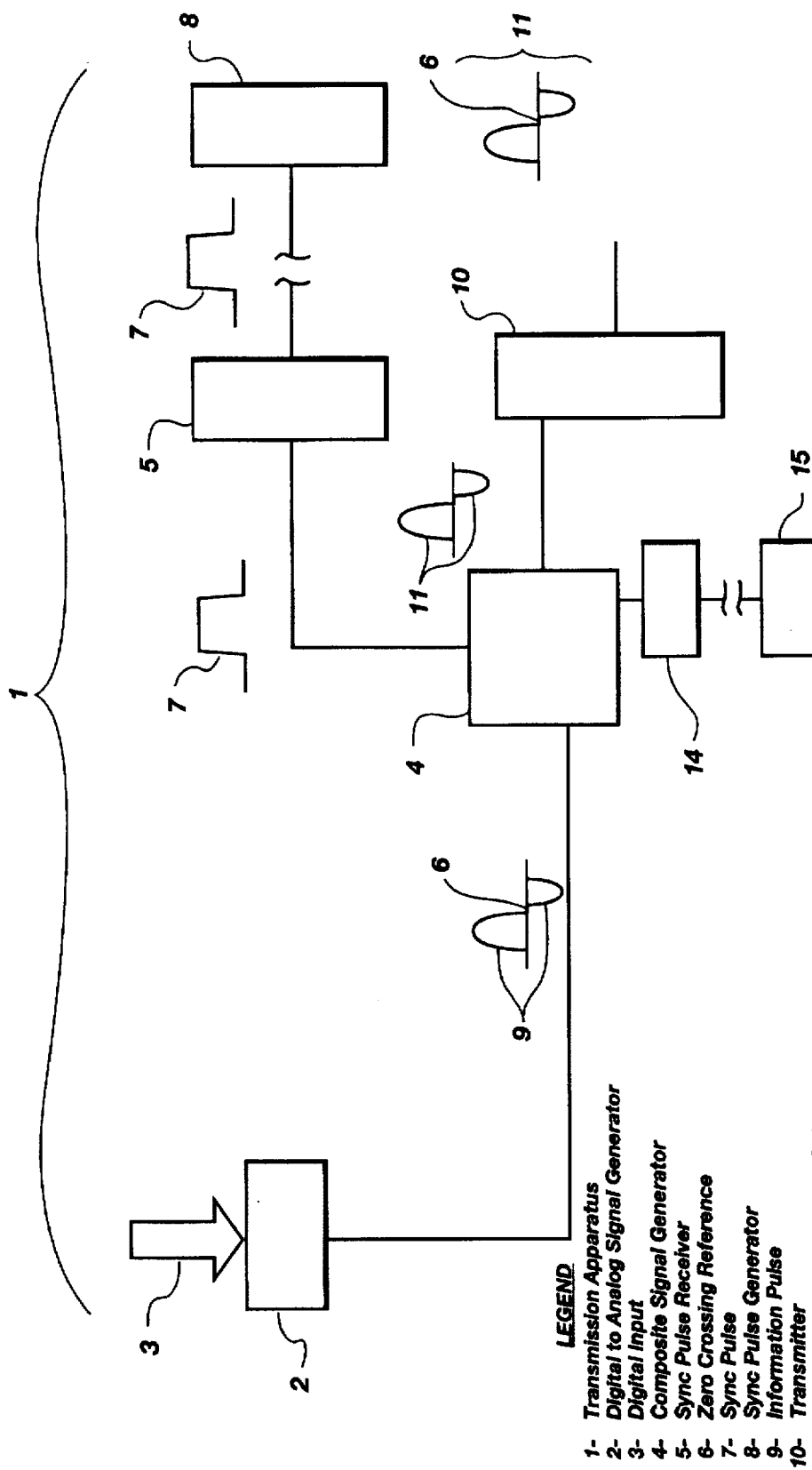
FIG. 1: A schematic of a transmission apparatus of the invention for remote transmission.

Referring first to FIG. 1, there is indicated generally therein a schematic of a preferred embodiment of a transmission apparatus 1 of the invention. This embodiment of the transmission apparatus is utilized for remote, simultaneous transmission of digital signals. Under this embodiment, the transmission apparatus comprises a digital to analog signal generator 2, a composite signal generator 4, a master control circuit 15, a control receiver 14, a remote master synchronization pulse generator 8, a synchronization pulse receiver 5, and a transmitter 10.

Under this embodiment, a digital input 3, for each signal source, is input to its respective transmission apparatus 1. Synchronization pulses 7 of a selected uniform wave form and frequency are generated by the master synchronization pulse transmitter 8 and are transmitted to each of the remote transmission apparatuses 1 where it is received by the analog synchronization pulse receiver 5. The synchronization pulses can be either voltage pulses or power pulses. Each of the signal sources is allocated a time slot between the successive synchronization pulses by the remote master control circuit 15 and the digital value of each signal source at each of its successive allocated time slots is converted to an analog information pulse 9. The wave form for each information pulse is determined by a signal conversion algorithm and is synthesized by combining a wave of a pre-selected wave form and frequency, the fundamental frequency, with a finite number of its harmonics. The amplitude and phase or the power of the fundamental frequency component and the harmonic components respectively are determined by the signal conversion algorithm based upon the magnitude of the digital input.

Figure 2:
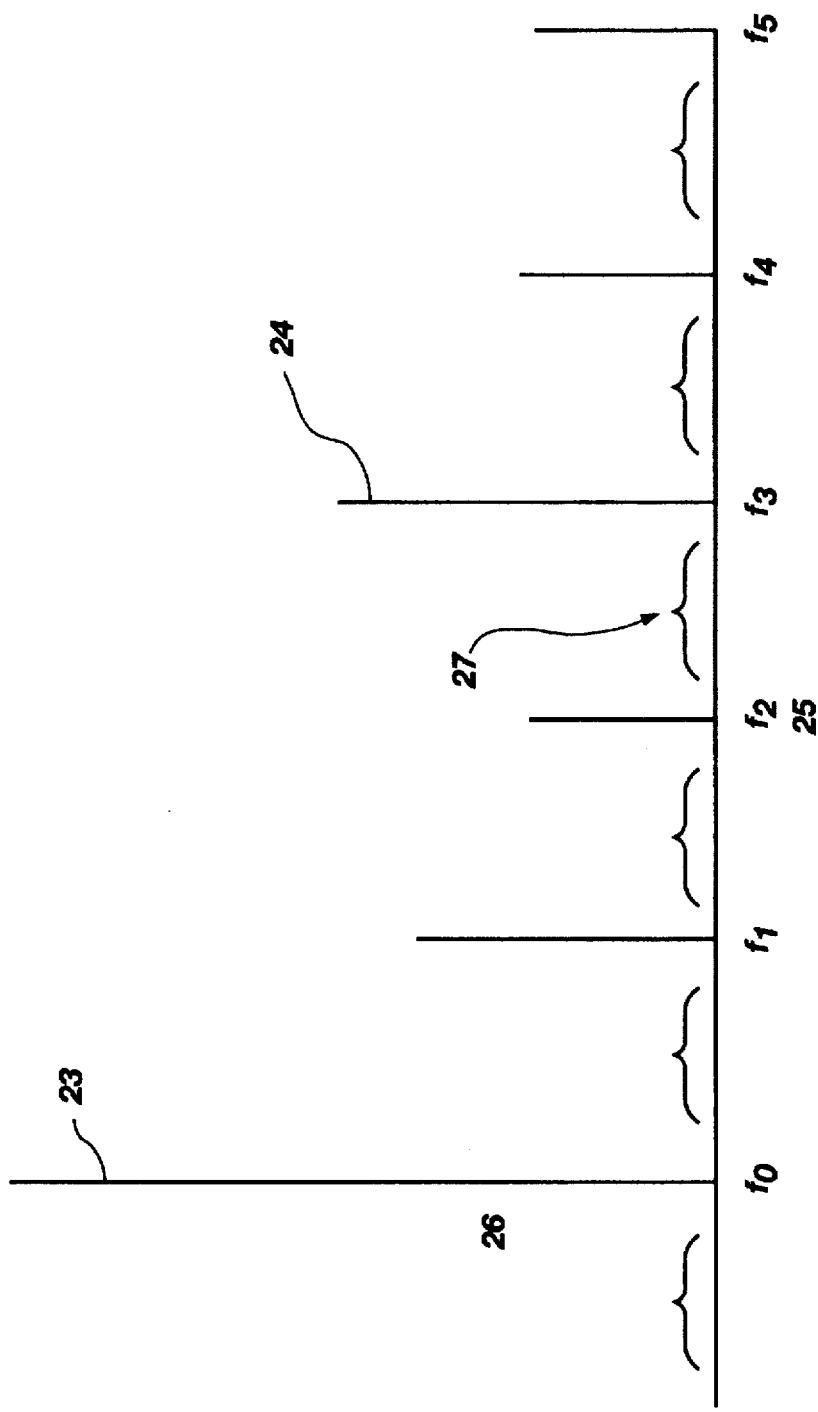
FIG. 2: An illustration of a Fourier spectrum of a synthesized information pulse.

An example of a Fourier spectrum for an information pulse synthesized from a selected fundamental frequency 23 and a finite number of harmonics 24 of the fundamental frequency is illustrated in FIG. 2. This could be an amplitude spectrum or a power spectrum depending on the algorithm used to convert the input digital signal to a synthesized information pulse. Frequency is plotted on the horizontal axis 25 and amplitude or power of the fundamental frequency and the harmonics is plotted on the vertical axis 26. For preferred embodiments, the fundamental frequency is pre-set and constant for the application and therefore, according to the Fourier Theorem, the harmonics will always be at the same frequencies. The only change that will occur from one digital input to the next will be in the amplitude or power of the fundamental frequency and each harmonic.

A receiver will then need only to determine the amplitude and phase or power for the fundamental frequency and the specific harmonics used to synthesize the information pulses and not the spectrum 27 between the harmonics. Therefore, narrow bandpass filters can be used effectively by the receiver to separate the fundamental frequency and harmonic components that make up the wave being transmitted. The information stored in the information pulse is obtained from the amplitude or the power of the fundamental frequency 23 and its harmonics 24 in relation to each other. This is accomplished by determining the amplitude or the power of the fundamental frequency and each of the harmonics individually and utilizing the signal conversion algorithm to reproduce the magnitude of the digital input.

The present invention may also be used in conjunction with the inventions disclosed in the prior related applications. For these embodiments, each information pulse generated by embodiments of the prior related inventions can be synthesized through use of the present invention from a fundamental frequency wave and its harmonics, and then transmitted as provided by the prior related inventions. Each of the signals received by the receiving apparatuses of the prior related inventions then is separated into its fundamental frequency and harmonic components by means of the present invention, and the information pulse is then re-synthesized for further processing as provided by the prior related inventions to reproduce the respective digital inputs. By passing the received pulses through the narrow bandpass filters which are used to separate the received pulses into fundamental frequency and harmonic components, the signal-to-noise ratio is substantially enhanced, thereby enhancing the signal-to-noise ratio of the re-synthesized pulse.

Figure 3:
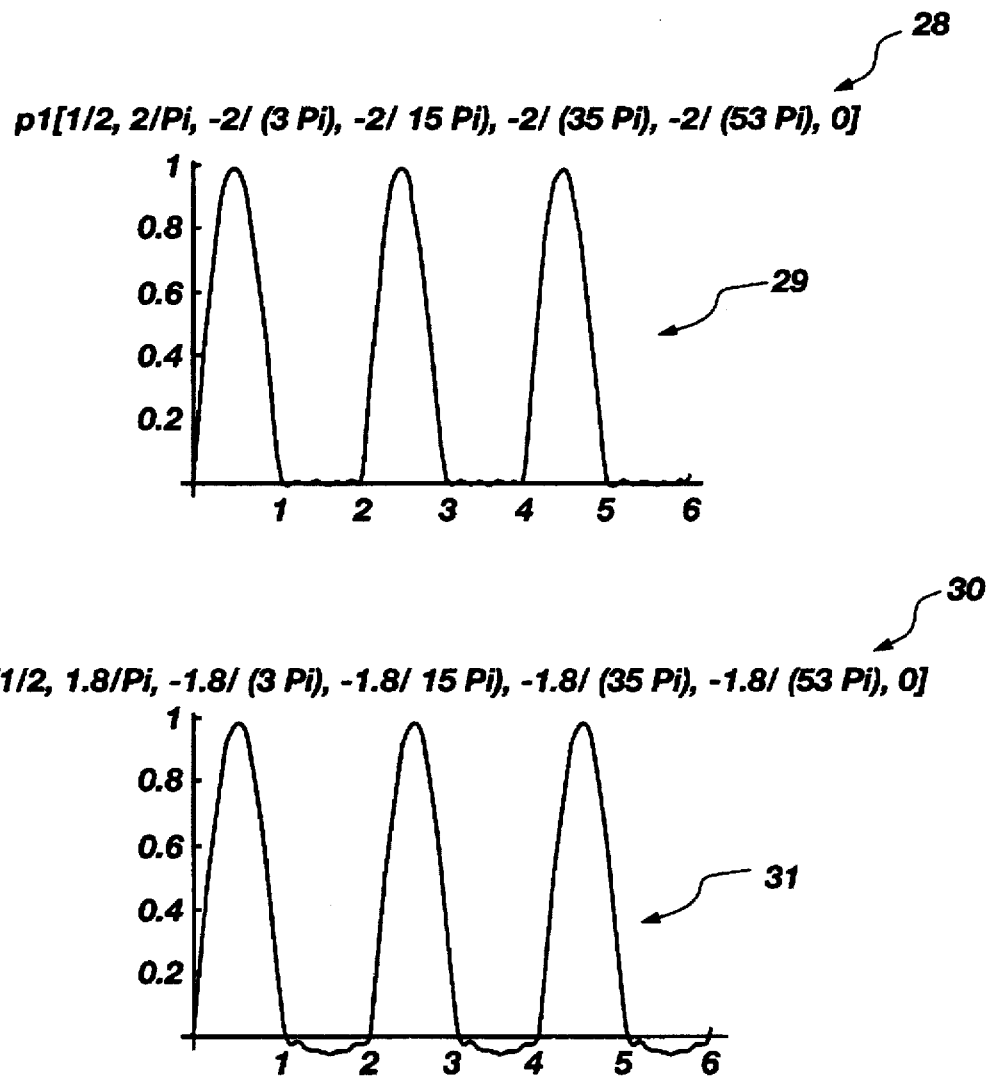
FIG. 3: An illustration of the effect of varying the power level of the harmonics for a synthesized information pulse.

FIG. 3 illustrates how varying the harmonic power levels affects the wave form. The Fourier series represented by the first formula 28 results in the first wave form shown 29. Changing the power in some of the harmonics as in the second Fourier series 30 results in the second wave form shown 31.

Therefore, in preferred embodiments of the present invention, the output signal from the digital to analog signal generator 2 is an analog information pulse 9, the wave form and amplitude of which is determined by an algorithm, and the information pulse is synthesized by the digital to analog signal generator from a pre-selected fundamental frequency wave and its harmonics, based upon the magnitude of the digital input. Under some preferred embodiments, the information pulse is a voltage pulse, but under other preferred embodiments the information pulse may be a power pulse. The amplitude or power of one or more of the harmonics, or even the fundamental frequency wave, may be pre-set at a fixed value for use by the receiving apparatus for calibration.

Under a preferred embodiment for a remote transmission apparatus 1 as shown in FIG. 1, the composite signal circuit 4 may receive continuous transmissions or discrete transmissions of the information pulse, and, by monitoring the synchronization pulses 7 and the control signal from the control receiver 14, passes the information pulse to the transmitter 10 only during its allocated time slot.

Figure 4:
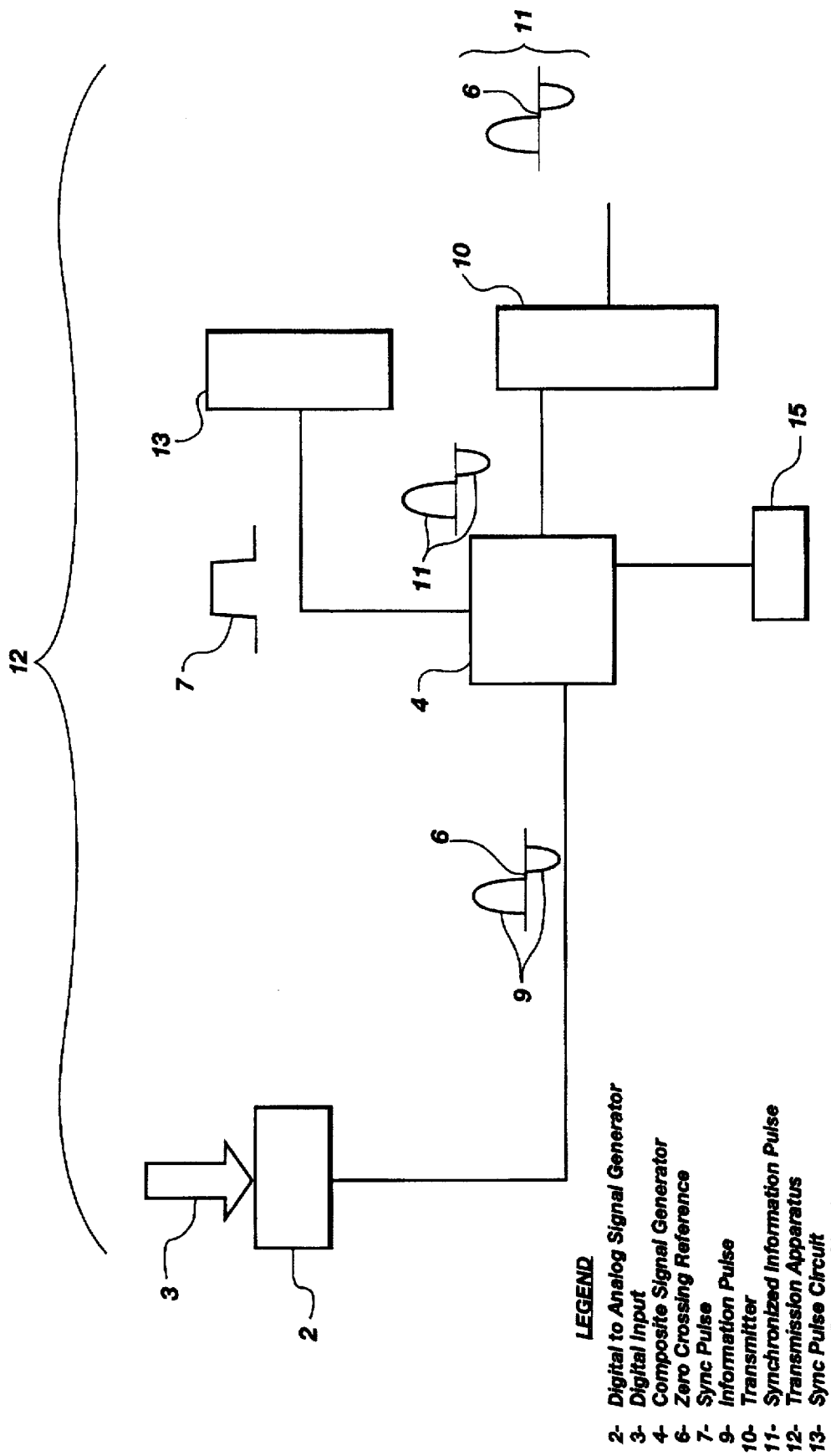
FIG. 4: A schematic of a transmission apparatus of the invention for common transmission.

Referring now to FIG. 4 which shows another preferred embodiment of the transmission apparatus, a common transmission apparatus 12 simultaneously accepts digital signals 3 from one or more sources. A synchronization pulse circuit 13 generates synchronization pulses 7 of a pre-set magnitude, wave form and frequency. The master control circuit 15 allocates each signal source a time slot between successive synchronization pulses. For each cycle of the synchronization pulse, an information pulse 9 is generated for each input signal within its allocated time slot by the digital to analog signal generator 2. The composite signal circuit 4 may receive continuous transmissions or discrete transmissions of the information pulse, and, by monitoring the synchronization pulses 7 and the control signal from the control circuit 15, passes the information pulse to the transmitter 10 only during its allocated time slot. The information pulse for each signal source is transmitted by the common transmission apparatus 12 to the receiving apparatus 16 shown on FIG. 5.

Figure 5:
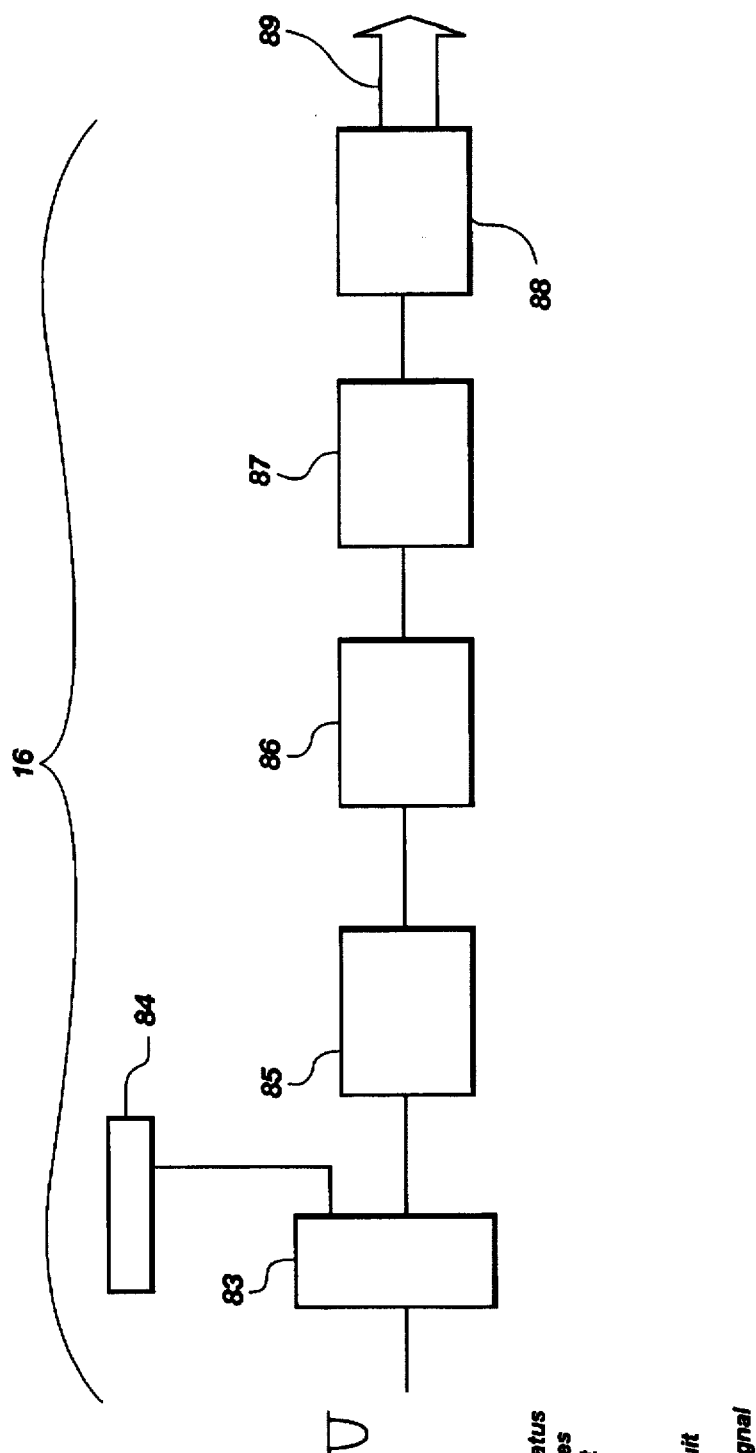
FIG. 5: A schematic of a receiving apparatus of the invention.
Figure 10:
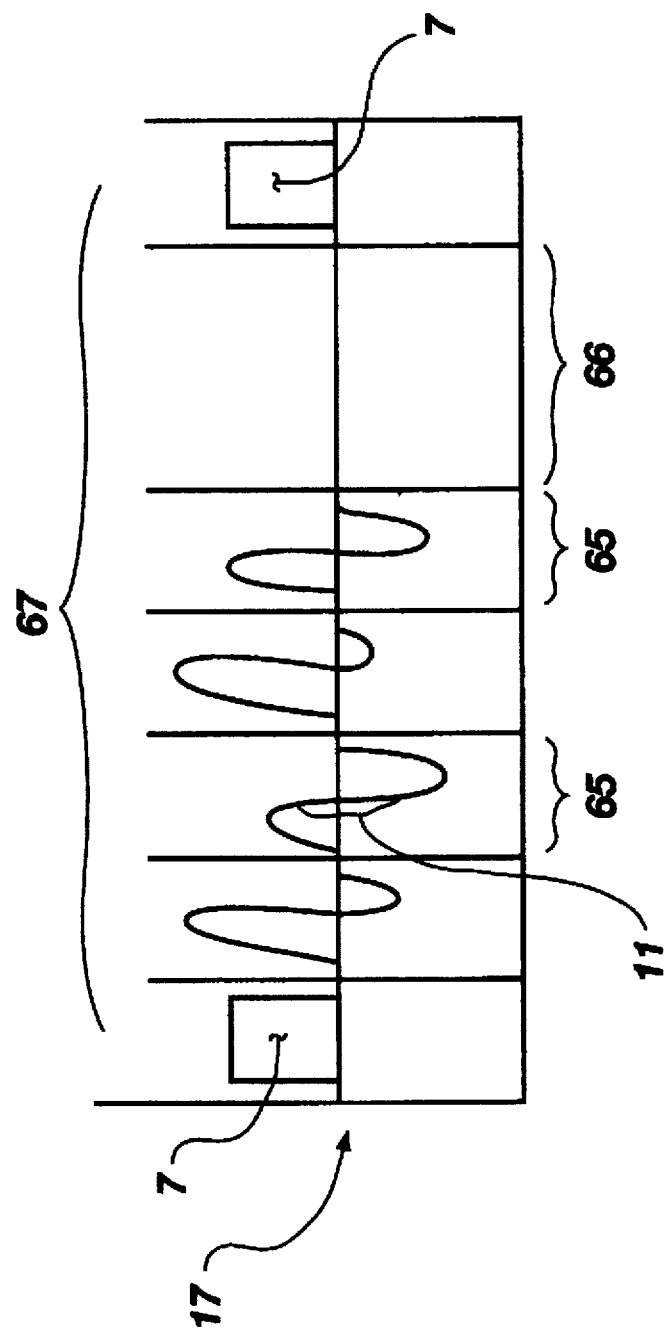
FIG. 10: An illustration of an example of a total transmitted and received signal.

Whether an embodiment of the transmission apparatus providing for the remote and separate transmission of analog information pulses 11 for signal sources as shown in FIG. 1 or an embodiment providing for the transmission of information pulses for signal sources from a common transmission apparatus as shown in FIG. 4, is used, the total signal 17 as illustrated in FIG. 10, is the same for the same source signals. Under the embodiment shown in FIG. 1, the synchronization pulses are transmitted by the master synchronization pulse generator 8, and each of the time slotted information pulses 11 are transmitted from the various remote transmission apparatuses 1. The total signal received by a receiver 16 as shown in FIG. 5 then consists of successive synchronization pulses 7 coming from the master synchronization pulse generator 8 interspersed with the time slotted information pulses coming from the various remote transmitters 10. Under the embodiment shown in FIG. 4, the total signal received by a receiving apparatus 16 is comprised of the successive synchronization pulses interspersed with the time slotted information pulses coming from the common transmitter 10.

Under a preferred embodiment, the synchronization pulses are of a uniform and positive voltage wave form, with a uniform frequency selected as desired. The synchronization pulses can be of any selected wave form and can be of any frequency within the available bandwidth. The synchronization pulses can be of the same frequency as the information pulses or can be of a different frequency, to allow the synchronization pulses to be separately tuned. The synchronization pulses can also include a counter or other identifier to assist in the time slot allocation and synchronization of the information pulses. This can be accomplished by setting the amplitude of one or more of the synchronization pulses during each cycle of the allotted time slots as a function of the count or other identifier for the cycle of the time slots.

The synchronization pulses allow a receiving apparatus 16 to continuously verify the time slots of the incoming signal 17 so that the respective information pulses can be extracted from the correct assigned time slots or channels. The maximum time period between successive synchronization pulses 67 will be dependent upon the nature of the information being transmitted over the various channels. For example, approximately 1,000 television channels can be transmitted with a single signal with this invention as it is limited only by minimum frequency at which successive audio and video signals must be received to produce the desired resolution for video and audio reproduction. Other types of media or signal types have different requirements which will affect the maximum time period between the successive synchronization pulse. The time period between successive synchronization pulses, therefore, would be adjusted depending upon the application.

For embodiments utilizing multiple remote transmitters, depending on the frequency used for the information pulses and the sync pulses and the variation in distances of a receiver from the remote transmitters, a correction may be required in the time slot allocations, to compensate for the travel time of the signals.

Under a preferred embodiment, the information pulse will be synthesized with a sinusoidal waveform. This allows a signal comprised of a fundamental frequency wave and certain of its harmonics, to be transmitted with a narrow bandwidth. However, other embodiments may utilize a variety of waveforms for the information pulse.

Under preferred embodiments, both for the remote transmission apparatus as shown in FIG. 1 and the common transmission apparatus as shown in FIG. 4, the information pulse generated by the digital to analog signal generator has a zero crossing reference 6 between the positive and the negative segments. Under preferred embodiments, this zero crossing reference is a brief zero wave segment between the positive and negative segments, which is used by the receiving apparatus to check the zero point of the received information pulse at this interim segment. The brief zero wave segment makes it easier for the receiver calibration circuit to find the exact zero crossing. This enhances the signal to noise ratio because even if there was some non-symmetrical noise added to the signal, the effect on the zero crossing would be less than for the other wave segments. A zero correction at this interim segment then enhances the effectiveness of the other calibration techniques, which will normally include at least proportional calibration using the amplitude or power of one or more of the harmonics as a reference.

For the common transmission apparatus shown in FIG. 4, the master control circuit 15 monitors and tracks all of the incoming signals, admits signals to the network, and allocates time slots or channels for the respective information pulses for each of the accepted incoming signals. Referring to FIG. 10, the total signal 17 that is transmitted by the transmission apparatus is comprised of synchronization pulses 7 of a selected wave form and frequency and information pulses 11 for each information channel transmitted in allocated time slots 65, whether remote transmission (FIG. 1) or common transmission (FIG. 4) is utilized. Unallocated time space 66 between synchronization pulses is available for subsequent allocation to other signal sources. The time between the respective synchronization pulses 67 is determined by the nature of the signals being transmitted and the total number of channels being transmitted. For the remote transmission apparatus shown in FIG. 1, one master control circuit 15 monitors and tracks all the source signals and allocates time slots or channels for each of the accepted signals and transmits this control information to a control receiver 14 for each remote transmission location and transmission apparatus 1.

Other embodiments may provide for interaction between the master control circuit 15 and the synchronization pulse generator 8 or 13 (FIG. 1 or FIG. 4) so that the cycle period 67 (FIG. 10) of the synchronization pulses is adjusted, based upon the number of channels being transmitted.

Figure 11:
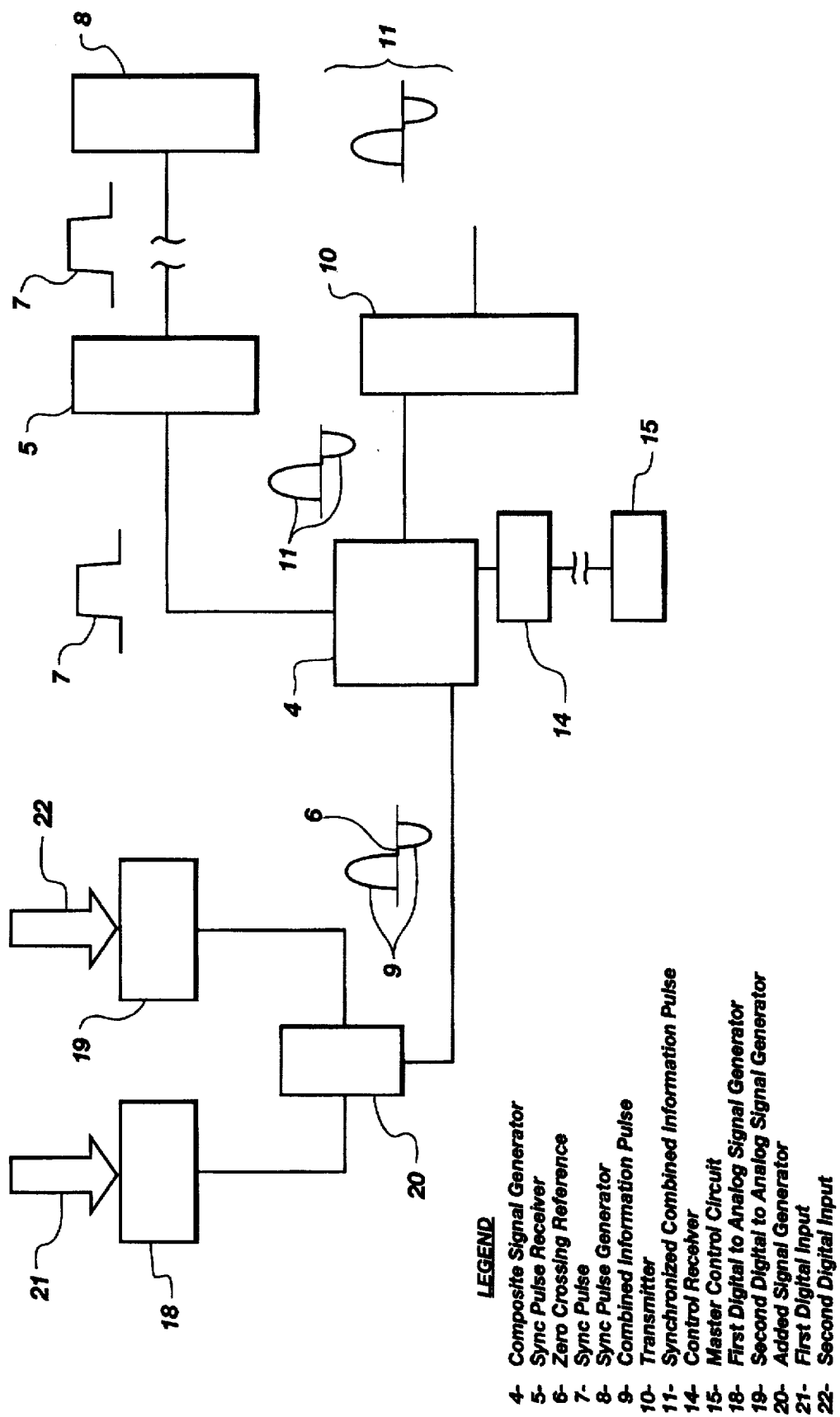
FIG. 11: A schematic of a transmission apparatus of the invention for remote transmission with a circuit for combining two signals.
Figure 12:
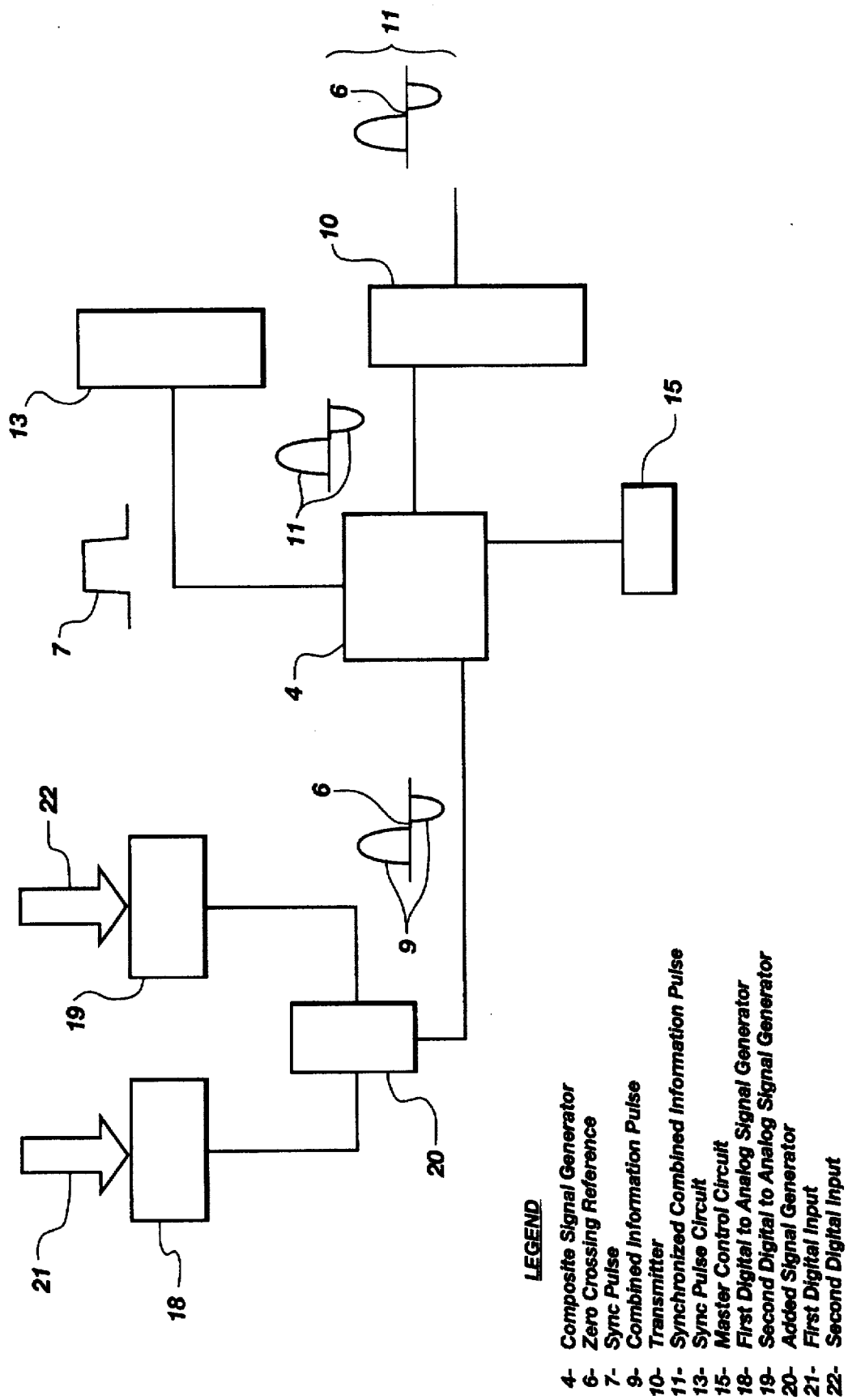
FIG. 12: A schematic of a transmission apparatus of the invention for common transmission with a circuit for combining two signals.

Other embodiments of the invention, whether for remote transmission as shown in FIG. 11 or for common transmission as shown in FIG. 12, provide for further enhancement of the amount of information that can be transmitted by incorporating a first digital to analog convertor 18, a second digital to analog convertor 19, and an added signal generator 20, which allows a first digital byte input 21 and a second digital byte input 22, such as the video and audio signals for a television transmission, to be converted from digital to analog and then added and converted into a single information pulse by the added signal generator 20. The total signal for a given time slot or channel is then a combined signal that can be transmitted as one.

The embodiments shown in FIG. 11 and FIG. 12 could also be used to combine two input signals with one being converted to a positive analog signal and the other to a negative analog signal by the digital to analog convertors 18 & 19.

While for preferred embodiments, the synchronization pulses and the information pulses are voltage pulses, other embodiments may utilize power pulses.

Referring now to FIG. 5, there is indicated therein a general schematic of a preferred embodiment of a receiving apparatus 16. The incoming information pulses 32 and the synchronizing pulses, whether received by antenna as a wireless transmission or otherwise, and whether received from a common transmitter (FIG. 1) or from remote transmitters (FIG.4), pass to the receiving circuit 83. A receiver control circuit 84 monitors the synchronizing pulses and the time slot allocation signals and allows only the signal allocated to each time slot to pass to the filter circuit 85. Pre-amplification may be provided by the receiving circuit or the filter circuit as needed for further processing by the receiving apparatus.

The filter circuit 85 utilizes narrow bandpass filters to extract the fundamental frequency and harmonic components of each information pulse in its time slot. The filters may also be used to filter the synchronizing pulse, particularly if the synchronizing pulse is to be used as a reference for calibration. For embodiments of the invention utilizing multiple frequency signals, the filter circuit provides for the extraction, in each time slot, of the information pulses transmitted at each of the transmission frequencies.

The analog to digital conversion circuit 86 converts each of the components of the analog information pulses to digital. If the synchronizing pulses are to be used for calibration or if synchronizing pulses carry cycle counting or other identifying information, then the synchronizing pulses are also converted to digital. The amplitude and phase of each of the components of synthesized pulses or waves is converted to digital.

The digital signals pass to the calibration circuit 87. Calibration may be accomplished in a number of ways. If a reference signal is transmitted as the fundamental frequency component or one of the harmonic components, then that component is used for calibrating the remaining components. If the relative magnitudes of the fundamental frequency and harmonic components is used to carry the information, then separate calibration is not required. If the synchronizing pulses or separate reference pulses are to be used for reference, then the amplitude of the synchronizing signal or other reference as received during each time slot is compared with the known amplitude at transmission and is used to calibrate the information signals received during the same time slot. This is the case whether the information signal is single or multiple frequency, and whether the information signal is comprised of pulses or waves synthesized from combining a fundamental frequency wave with a finite number of its harmonics or is a simple wave form such as a pure sine wave.

The output signal generator 88 produces the output digital signal 89 through the use of the calibrated digital signals from the calibration circuit. For information signals synthesized from combining a fundamental frequency wave and a finite number of its harmonics, the algorithm used by the transmission apparatus to generate the synthesized information pulses, is used to generate the output digital signal, which will ordinarily be the magnitude of the digital inputs.

Figure 6:
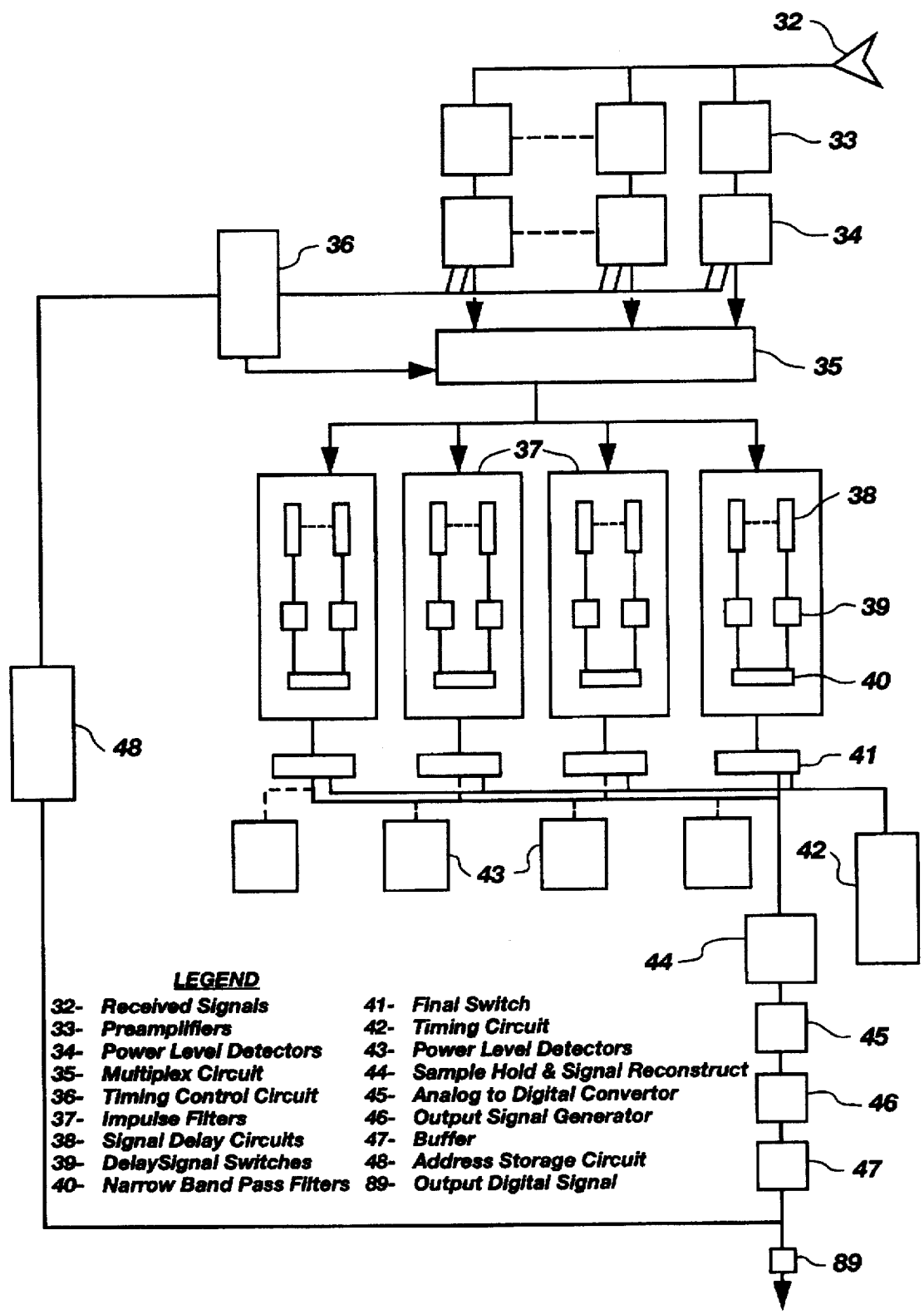
FIG. 6: A schematic of an embodiment of a receiving apparatus of the invention.

Referring now to FIG. 6, there is indicated generally therein a detailed schematic of a preferred embodiment of a receiving apparatus 16. The incoming received signals 32, whether received by antenna as a wireless transmission or otherwise, and whether received from a common transmitter (FIG. 1) or from remote transmitters (FIG.4) must generally be amplified before further processing. The signals are first split to multiple preamplifiers 33 and signal power level detectors 34. The various preamplifiers provide for varying levels of amplification for the incoming signals. The timing control circuit 36 determines the time that the pre-amps will be allowed to receive the signal as well as determining which power level detector to allow the signal to pass through. The combination of the pre-amps, signal power detectors, and the timing control circuit comprises the automatic gain control.

As signals with varying amplitudes and power are received, the variation in signal intensity must be accommodated. To ensure that for each cycle of the time slots, the transmitted signal is received for each channel, it is necessary that each signal's power level be determined and adjusted before it is passed into the demodulation portion of the receiver. In order to accomplish this, each signal is first split to all the pre-amps. The power level detectors select the optimum pre-amplified signal to pass to the next stage. A multiplex circuit 35 allows several inputs but only one output signal for each time slot.

A preferred embodiment includes multi-level impulse filters 37 which are comprised of signal delay circuits 38, delay signal switches 39 and narrow bandpass, high Q filters 40. One set or level of these components is required for the fundamental frequency component and for each of the harmonics. The signal from the signal multiplex circuit 35 is input to each of the impulse filters 37, where it first passes to the delay circuits 38. The delay circuits together comprise a multiple stage delay. The delay signal switches 39 allow one information pulse cycle through beginning at the zero crossing of the cycle. As a single information pulse goes to the delay circuits, the delay circuits 38 makes the single cycle look like several cycles to the narrow bandpass, high Q filters 40. This allows each filter to ramp up to its optimum power level before the signal is passed to the next stage. After the signal has passed through the last delay circuit 38, the final switch 41 allows only the last cycle to pass through to the next stage of demodulation. The timing circuit 42 sets up the proper timing to allow the proper cycle through the impulse filter stage 37. Preferred embodiments may also include power level detectors 43 to decipher the power levels of the fundamental frequency and each harmonic.

The impulse filters uses the wave energy. The wave energy wave energy. The wave energy that is stored in the delay circuits is transferred to the high Q bandpass filter in steps of one cycle separation. To the filter this appears as a continuous wave. Because of the time delay, the filter responds as though the single cycle appears as a continuous, constant, multiple cycle wave. The delay circuit stores the energy of the wave for the duration of the delay circuit cycle. Any device that has the capacity to store wave energy for the required time period could be substituted for the delay circuits.

In preferred embodiments of the receiving circuit, there are a plurality of impulse filters 37, one for the fundamental frequency and one for each harmonic that is to be recovered. Some embodiments provide for one impulse filter for each pre-amp. In the optional configuration shown in FIG. 7, there is only a delay circuit 38 prior to each harmonic filter 40. The impulse filters provide for a narrow bandwidth and, thus, a lower signal noise. This means that a higher signal to noise ratio is possible.

The impulse filters and delay circuits also allow the use of one frequency for a reference or calibration signal and one or more additional frequencies for information transfer. The reference frequency signal can provide for a single cycle or a multiple cycle reference per time slot, depending upon the application, and would be at a pre-set amplitude or power level. The information signal amplitude or power level can then simply be calibrated at each time slot by comparison of the reference signal as transmitted with the reference signal as received. For some preferred embodiments, for every impulse filter, except for the reference frequency's impulse filter, some unique identifier would be sent to the receiver. In the lower frequencies, such as those used in telephone, the number of bytes per second that could be transmitted would be equal to the bandwidth of the bandpass filters used. If for example, a filter of ten hertz could be used, then every bank of frequencies of just ten hertz would produce a byte per cycle.

Referring again to FIG. 6, a sample hold circuit and a signal reconstruct circuit are part of the same circuit 44. This circuit reconstructs the fundamental frequency and harmonic components from the harmonic impulse filter 37 and then holds the most positive portion and the most negative portion of the cycle for each component. For some preferred embodiments, the separated fundamental frequency and each of the harmonics components are converted to digital by an analog to digital convertor 45 and the digital input is reproduced in the output signal generator 46 by reverse use of the signal conversion algorithm. For other embodiments, including those embodiments used in conjunction with the prior related inventions, the composite wave is re-synthesized by the sample hold and signal reconstruct circuit 44. The maximum positive peak and the maximum negative peak values of the positive and negative portions of the re-synthesized composite signal, or other features of the re-synthesized signal as desired, are retained by the sample hold circuit 44. These amplitudes may then be converted to digital by the analog to digital convertor 45 and the output signal generator 46 reproduces the input digital signal for dissemination. A buffer 47 may also be used to transmit the reproduced digital signal for one or more selected time slot channel to a digital to analog convertor for sound or video reproductions, or may make the reproduced digital signal for one or more selected time slot channels directly available for computers or other digital applications.

An address storage circuit 48 stores the timing address for the receiver. It is controlled by an internal oscillator and the sync pulse or other control impulse from the transmitter to maintain the synchronization of the receiver with the common or remote transmitters and the other receivers. The timing control circuit 36 is controlled by the address storage circuit 48 so that only the correct signal is allowed through the system during the time slot allotted to that signal.

Figure 7:
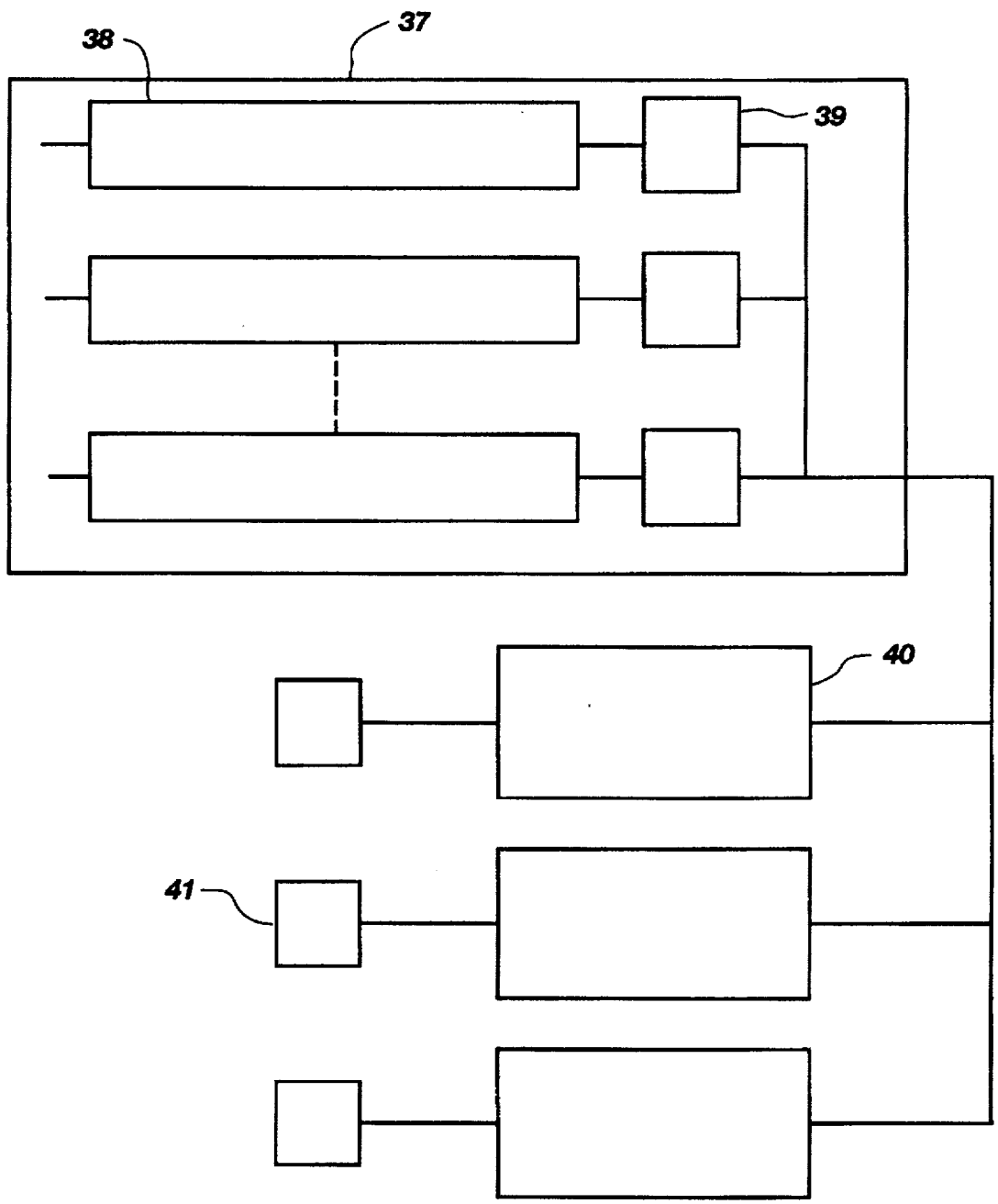
FIG. 7: A schematic of an alternative embodiment of demodulation components of a receiving apparatus of the invention.

The demodulation circuit illustrated in FIG. 7 is another embodiment of a component of the present invention which provides for the amplitude or power level of the fundamental frequency wave and each harmonic to be determined separately and allows the receiver to identify any type of wave form. Again the signal conversion algorithm is used with the amplitude or power extracted for the fundamental frequency and its harmonics to reproduce the digital input.

To reduce the bandwidth needed for the transmission channels a harmonic of separate frequency demodulator is used. This harmonic or separate frequency demodulator consists of a very narrow bandpass impulse filter. When a signal is transmitted with the amplitude of the positive portion of the wave being different from the amplitude of the negative portion of the wave, harmonics are generated. These harmonics vary in amplitude as a function of the type of wave that is transmitted. However, as long as the frequency of the signal does not change, the harmonic positions do not change. Instead of having the bandwidth wide enough to capture all of the harmonics in the signal, it is only necessary to pass the selected harmonics. Therefore, very narrow filters are used to allow only the fundamental frequency and the selected harmonics to pass. This allows the use of a very narrow bandwidth in comparison to the bandwidth that would be required to allow all the harmonics to pass in a typical bandpass filter.

Figure 8:
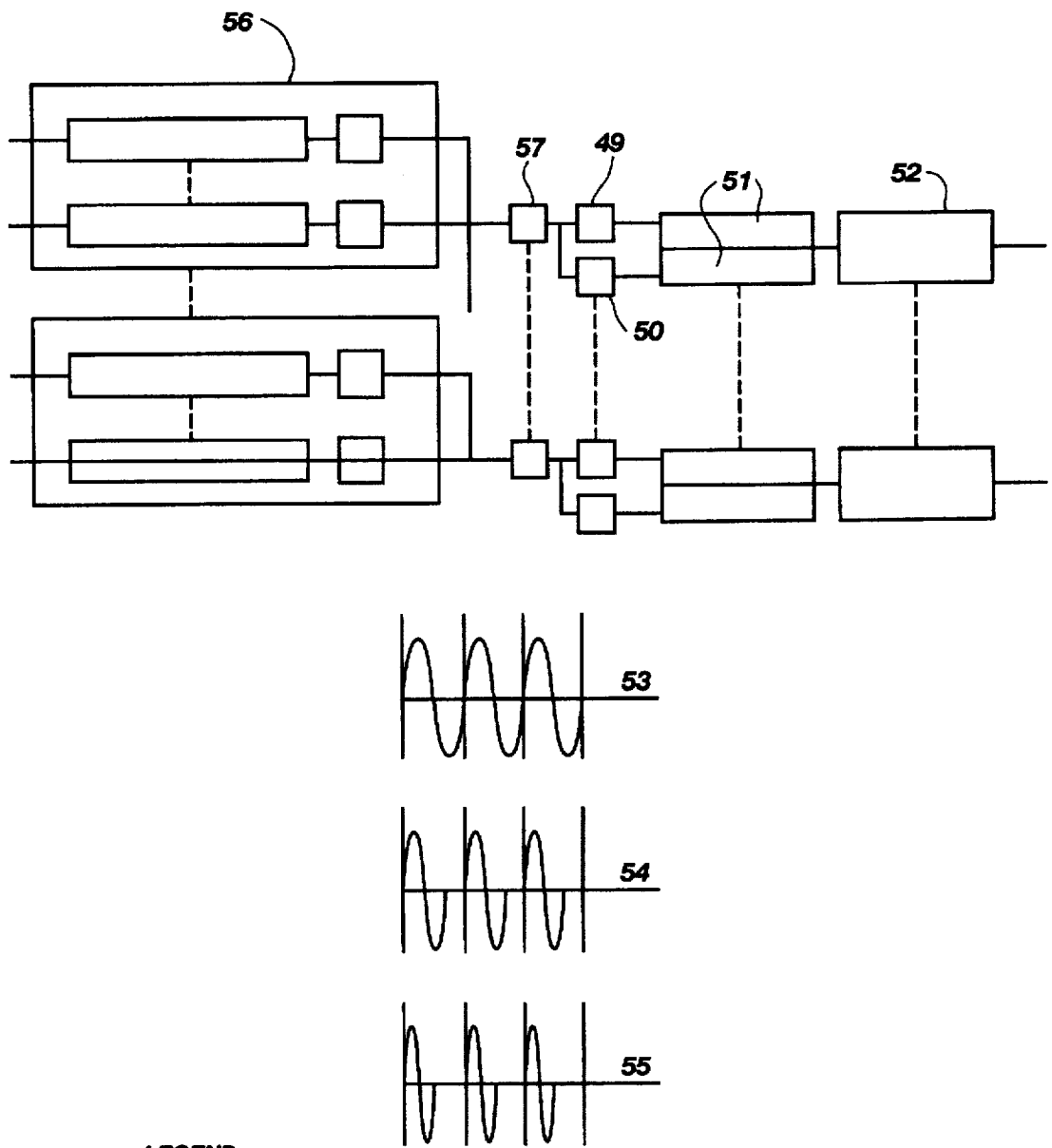
FIG. 8: A schematic of an alternative embodiment of demodulation components of a receiving apparatus of the invention.

An optional embodiment for some of the demodulation components of the present invention is shown in FIG. 8. Signals from the signal multiplex circuit 35 as shown on FIG. 5 are input to delay circuits 56 which function as described for the delay circuits shown on FIG. 6. From the delay circuits, the signals pass to narrow bandpass, high Q filters 57, which extract the fundamental frequency and harmonics components and enhance the signal to noise ratio of the signal. The composite signal is then re-synthesized and transmitted to a positive peak detector 49 and negative peak detector 50 which extract and hold the positive and negative peak values respectively of the re-synthesized composite signal. The peak values are next changed from analog to digital by an analog to digital convertor 51.

For this embodiment a reference signal 53, which is preferably a sine wave of a fixed power or peak to peak amplitude with equal positive and negative segments, is transmitted simultaneously with an information signal 54 which is also preferably a sine wave but of a different frequency than that of the reference signal or of any other information signals 55. Each of these signals 53, 54, and 55 are of a single cycle in duration. The information signals 54 and 55 vary with the digital input. This embodiment provides for a further enhancement of the amount of data that can be transmitted by multiplying the number of channels of data that can be transmitted simultaneously. The number of sets of components of this embodiment determines the extent of the enhancement of the data transmission capacity provided by this embodiment. Each set of transmission channels are transmitted at a different frequency.

The reference signal 53 as received in each time slot is used by the calibration circuit 52 to calibrate the information signals of the various frequencies received in the same time slot. The effectiveness of the calibration will decrease somewhat as the difference between the frequency of the reference signal and the frequency of the information signal increases.

The delay circuits create a continuous wave which passes to the high Q filters 57. Each of the filters are tuned to its respective frequencies. Only the last cycle of the delay network is allowed to pass to the peak detectors 49 and 50. The time slot allocation is the same for this embodiment as for other embodiments of the present invention.

Figure 9:
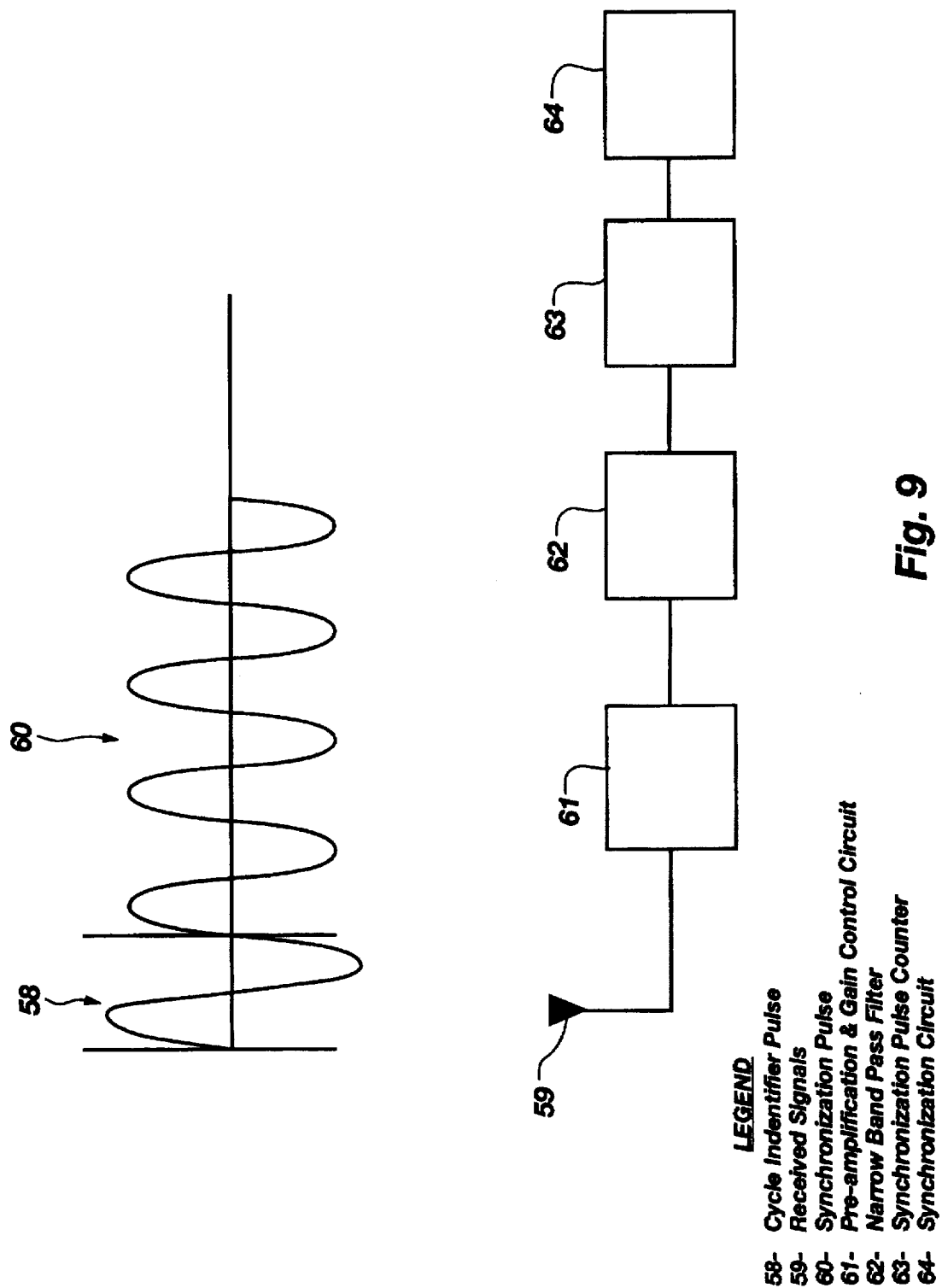
FIG. 9: A schematic of an alternative embodiment of synchronization pulse generation components of the invention.

A schematic of an optional synchronization circuit embodiment is shown in FIG. 9. The sync pulses 60 are transmitted continuously in a selected frequency with a selected amplitude. For this embodiment the sync pulses are also used as a reference as utilized by the demodulation components embodiment shown in FIG. 8. For some embodiments one of the sync pulses 58 for each cycle of the time slot allocations is transmitted with a different amplitude which is an identifier for the specific sync cycle. This actual sync count, is demodulated in the same manner as for an information pulse. This would give the remote transmitters and receivers an accurate time reference to further enhance synchronization. A pre-amplification and automatic gain control circuit 61 accepts the received signals 59 sets the sync pulses to a desired amplitude or power level. A narrow bandpass, high Q filter 62 limits the sync pulse to a narrow frequency spectrum. A sync pulse counter 63 is used to generate a time slot allocation or sync cycle identification number which is used for the sync cycle identifier 58. For this embodiment the synchronizing pulses 60 are transmitted continuously to continuously delineate the information pulse time slots and, therefore, to enhance the synchronization and to provide a reference for calibration in each time slot. This embodiment requires that the sync pulses are transmitted at a different frequency than the information pulses, since there is no dead time between the sync pulses. The sync cycle identifier pulse 58 is used by the sync circuit 64 to maintain the transmitter and receiver in sync with all other transmitters and receivers.

Further embodiments of the present invention also utilize a repetitive synchronizing wave of a pre-set wave form and frequency, a synchronizing wave being transmitted in each time slot. A plurality of information signal waves are transmitted at different frequencies in each time slot. One version provides that the amplitude or power level of each information signal wave in each time slot is a function of the magnitude of the digital input signal assigned to that time slot and frequency. The receiving apparatus calibrates the information signals by comparing the amplitude of the synchronizing wave in each time slot as received with the known amplitude of the synchronizing wave as transmitted. Another version provides that the ratio of the amplitude of each of the plurality of information signal waves in each time slot to the amplitude of the synchronizing wave in the time slot is a function of the magnitude of the corresponding source digital signal. By using the ratio of the signals, calibration is automatic since signal attenuation, noise and interference will affect the synchronization wave and the information waves proportionally, more or less. However, the closer the frequencies of the synchronization wave and the information signal waves are, the better the calibration will be.

The preferred wave form for these multiple frequency embodiments is a pure sine wave, both for the information signal waves and the synchronization wave. This kind of wave produces no harmonic content if the wave passes through a filter which has the capacity to filter out a single cycle. For these embodiments only the fundamental frequency would be filtered. This wave form allows the bandwidth of the narrow bandpass filters to be minimized.

The receiver embodiment shown in FIG. 6 and the receiver component embodiments shown in FIG. 7 and FIG. 8 are readily adaptable to the multiple frequency, uniform wave embodiments described above. One level of the impulse filters 37 is used to determine the amplitude or power level of the synchronization wave and each of the other levels of the impulse filters are used to determine the amplitude or power level of the multiple frequency information signals.

Figure 14:
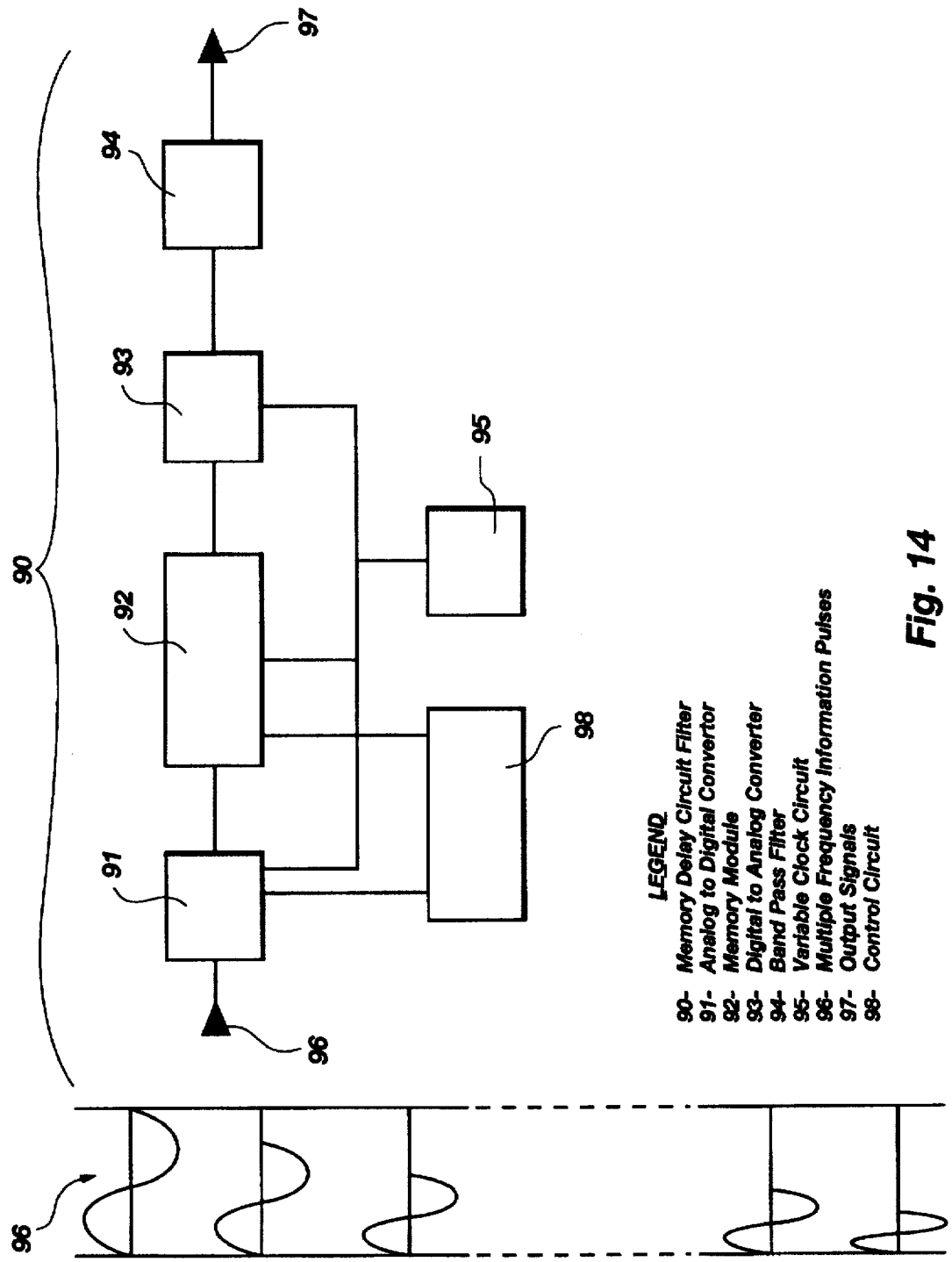
FIG. 14: A schematic of an embodiment of a memory delay circuit filter for use with the receiving apparatus of the invention.

One further preferred embodiment of an impulse filter that can be used to separate multiple frequency analog information pulses received simultaneously in allocated time slots is shown in FIG. 14. This embodiment of an impulse filter is referred to as a memory delay circuit filter. The memory delay circuit filter 90 is comprised of an analog to digital converter 91, a memory module 92, a digital to analog convertor 93, a filter 94, and a variable clock circuit 95.

Multiple frequency information signals 96 are input to the digital to analog convertor 91. On each clock cycle the output from the analog to digital converter is stored in the memory module 92. A pre-set number of cycles for each information pulse frequency are stored in the memory module and then the last cycle for each frequency is transferred to the digital to analog converter in a single cycle interval. After the cycle transfer is complete, the memory storage process is shifted by one cycle and a new cycle is stored for each frequency. This retains the filter in a ramped up condition at all times and insures the effectiveness of the filter. The pre-set number of the cycles is determined based upon the frequency range of the information pulses and the characteristics of the filter. The last cycle through the filter for each frequency in each time slot is then passed to the digital to analog converter 93.

A control circuit 98 receives the time slot allocations and assigned frequencies for each of the simultaneous signals and controls the signals which are allowed to pass the analog to digital converter and be stored by the memory module.

The clock circuit 95 determines the frequency that will be filtered. When the wave forms are stored in memory, the plurality of signals, each at a distinct frequency, are combined. In order to separate the combined signal into its various frequency components within each time slot, the clock circuit is adjusted to output the data at the proper clock rate to match the frequency of the filter. The frequency of the output wave forms 97 can be changed by the rate at which they are transferred to the digital to analog convertor. The advantage of having the clock variable is that it allows the use of the single filter to filter each of the plurality of information pulses of distinct frequencies. By changing the clock circuit frequency, wave forms of different frequencies will match the pass band of the filter. This substantially reduces the number of filters required.

Another advantage of using this type of delay circuit is that the frequencies of the input signals can be altered. This makes it possible to transfer the data to the digital to analog convertor from the memory module more rapidly or less rapidly than the data was transferred to the memory module. This offers a major advantage for multiple frequency, single cycle applications because fewer filter circuits and fewer delay circuits are needed to separate the multiple frequency signals. Fewer delay circuits are needed because the rate of taking the information off the memory module can be many times faster than the rate at which the information is stored. Any number of delay memory impulse filters can be used, depending on the number of frequencies being used simultaneously, the frequency range of the plurality of signals, and the time slot periods, i.e. depending on the rate information is being received.

The input information signals are each converted to digital by the analog to digital convertor and the digitized wave form is stored in multiple memory locations in the memory module. The clock circuit directs each segment of the wave form into separate addresses in the memory module. After the wave forms have been stored, the memory module is converted to a read memory mode and the wave segments are read out to the digital to analog convertor at a rate that would match the desired wave form frequency to that of the pass band of the filter. The clock frequency would then be changed for the next desired wave form.

Figure 15:
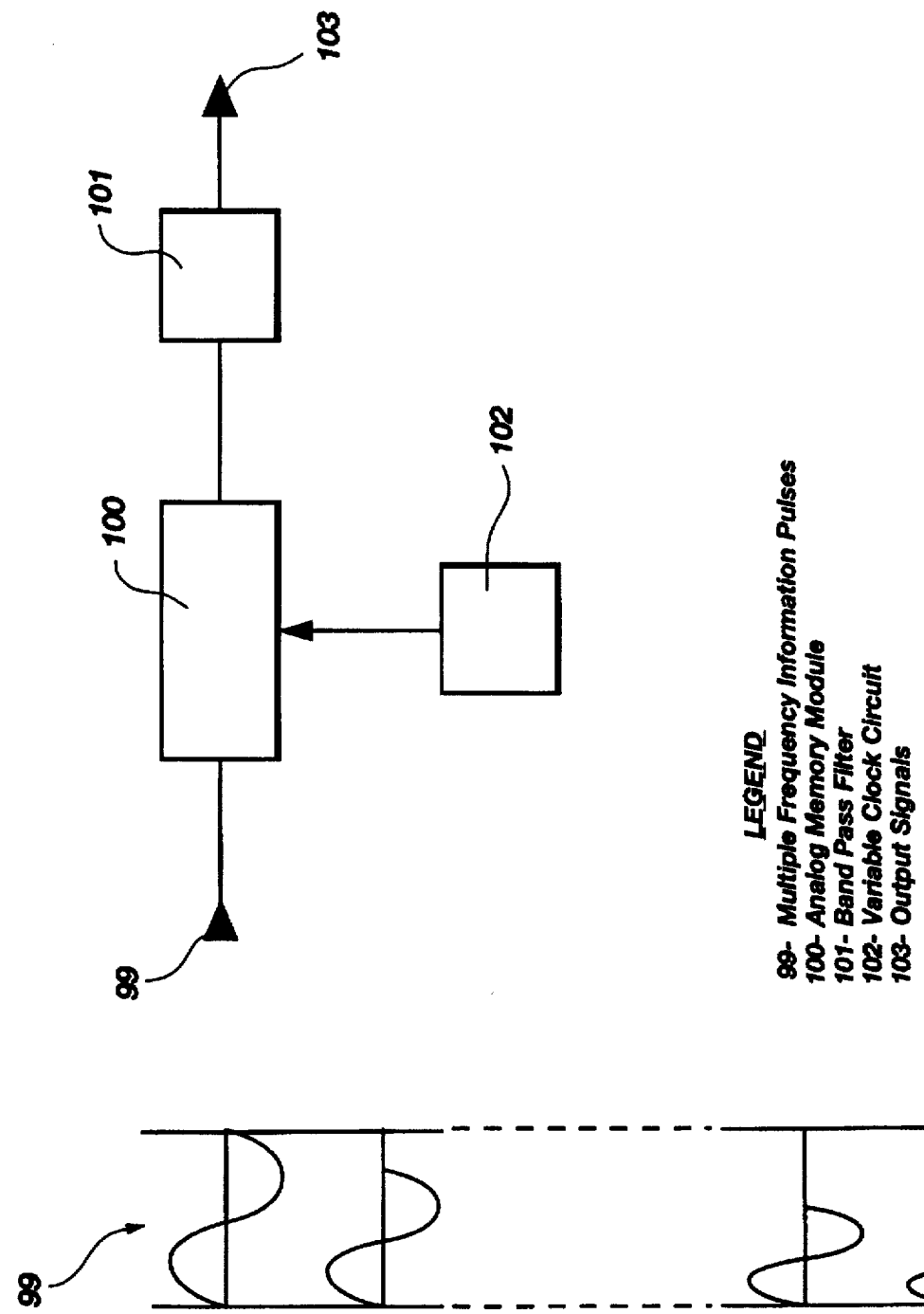
FIG. 15: A schematic of a further embodiment of a memory delay circuit filter for use with the receiving apparatus of the invention.

Another embodiment of the memory delay circuit is shown in FIG. 15. This embodiment functions the same as the embodiment shown in FIG. 14, except that instead of the waveforms being converted to digital and then being stored as digital in the memory, for this embodiment the analog wave forms 99 are stored directly in memory 100. After one complete wave form or time slot is clocked out, the process is repeated for the same wave form until the filter is fully ramped up. At that time the last wave form or time slot cycle is passed to the filter 101. When the stored wave forms are released from memory, as described above for the embodiment shown in described in FIG. 14, for this embodiment they go directly to the filter 101. Also, as described for the embodiment shown in FIG. 14, the clock circuit 102 controls how fast the input wave forms 99 are written to the memory module and controls the frequency of the output wave forms 103. It is used to match the frequency of each of the output wave forms with the frequency pass band of the filter.

For the multiple frequency embodiments, the master control circuit 15 (FIG. 1 and FIG. 4), whether for the single transmission location embodiments or the multiple transmission location embodiments, must allocate the incoming signals to a time slot and a transmission frequency. The digital to analog signal generators 2 generate an analog wave at an assigned frequency with an amplitude or power level during the assigned time slot for each signal which is a function of the magnitude of the digital input. The composite signal generator 4 combines the synchronizing wave and the multiple frequency information signal waves which are transmitted at the respective frequencies by the transmitter 10. This is also true for the embodiments shown in FIG. 11 and FIG. 12.

A preferred embodiment of the receiving apparatus of the present invention uses a special flash analog to digital circuit developed for the present invention. The circuit consists of several sets of flash analog digital circuits. The flash consists of two arrays. The first array consists of ten flash circuits vertically and six horizontal for sixty circuits in all. The first set of ten is the most significant number, with six being the least significant. This allows it to measure a number as large as 999,999, but, however, larger arrays can be used for any size number.

Under a preferred embodiment of the invention, a master control circuit 15 (FIG. 1 or FIG. 4) monitors a multi-media network to determine the time slot to be allocated to the various incoming signals. A signal source intended for use with the network would first address the master control circuit 15 to request access to the network. The main control circuit then allocates a time slot that is not being used.

Referring again to FIG. 1, under a preferred embodiment of the invention, if an acceptable initiating signal is received by the master control circuit 15, the incoming signal is allocated an unused time slot channel. Successive cycles of the time slot then carry the latest information pulse for the source. The converted analog signals for each channel are updated with each synchronization cycle.

The receiving apparatus 16 (FIG. 5 or FIG. 6) can be deployed at a single location with information dissemination occurring from the single location or can be deployed at a plurality of locations with users tuning in to the desired signals.

Under a preferred embodiment of the present invention, when it is desired for a transmitter to address a receiver, a channel is opened by signaling the main control circuit. The transmitter sends its address along with the address of the receiver in an information pulse in the time slot that the control circuit uses to allocate time slots. The control circuit first determines if the address is already busy to capacity. If so, a busy message is returned. If not, it allocates a time slot for transmitting and a time slot for receiving. The control circuit then drops out as far as control functions are concerned, so long as the transmission continues. The transmitter then transmits the address number over the address time slot. When the receiver first answers, the transmitter also sends the address for the receiver to receive and the time slot for the transmission. The address for the receiver is stored in a control circuit counter. This counter is kept in sync with the control circuit through the sync pulse and a local oscillator. The local oscillator is of the same frequency as the oscillator in the control circuit and is used to count the number of time slots until the allocated time slots arrive. Once the allocated time slot is sensed the information signal is then transmitted in the allocated time slot.

When transmission is completed, the transmitter then de-allocates the address time slot. This makes the time slot available for use by another transmitter. The receiver communicates with the transmitter even if no data transmission occurs. For example, if a call is made to a cellular phone number, the receiver receives the call even if the phone call is not answered. As soon as the receiver acknowledges that it receives its address it then sends back a reply. Once the transmitter has received the reply the transmitter de-allocates the control system time slot. Then the receiver continues to indicate that the receiver is ready for a transmission. An example of such an indication would be a phone ringing sound for a cellular phone call.

Under a preferred embodiment, depending upon the type of signal source of the respective channels, the maximum time period 67 (FIG. 10) between successive synchronization pulses is determined by the minimum frequency of updates of the signal sources that will permit an acceptably accurate reproduction of the input digital signal. For data transmission applications which require precise reproduction of transmitted data, the time period between synchronization pulses must be at least as short as the frequency of the change of the digital source signal.

Figure 13:
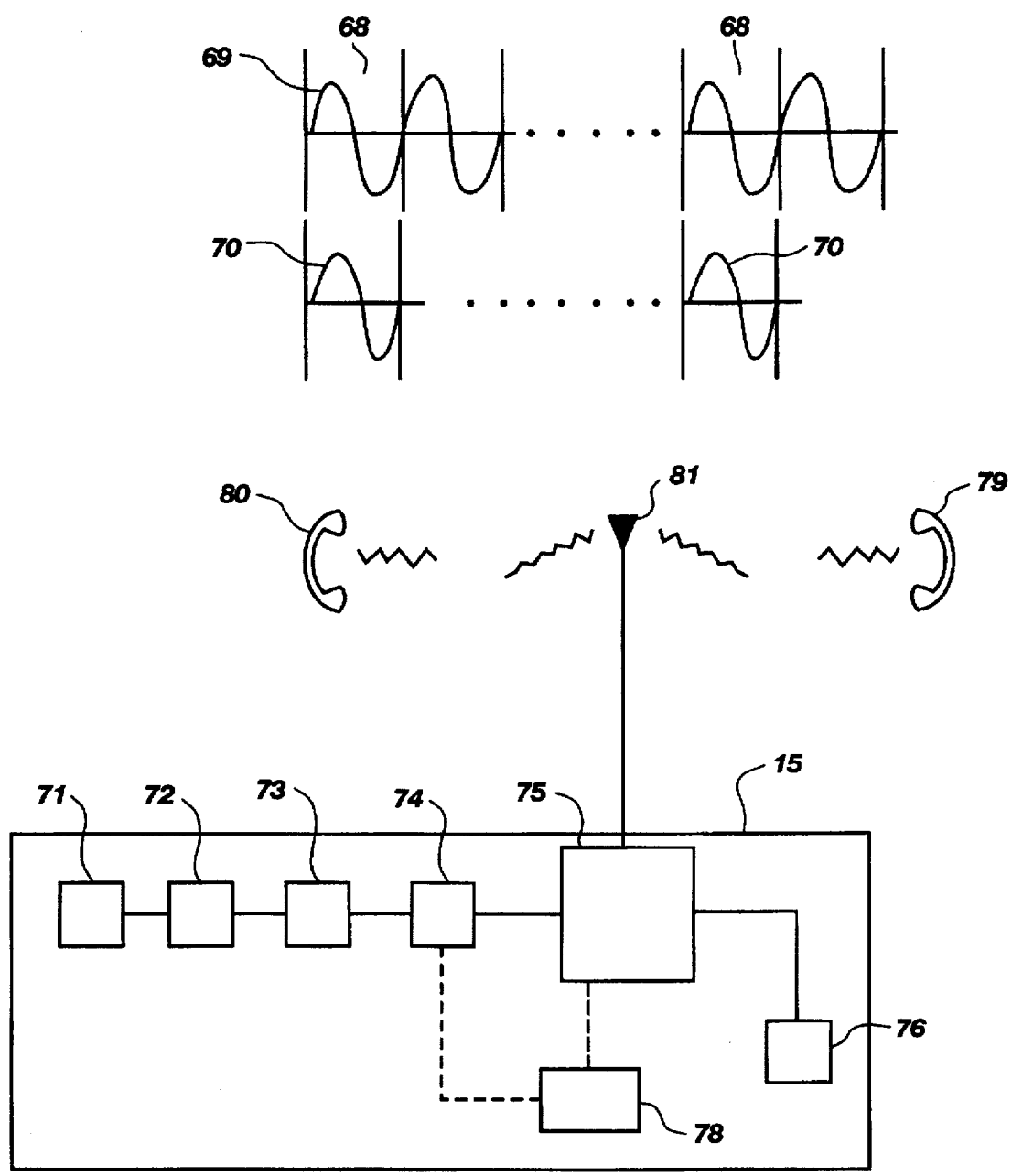
FIG. 13: A schematic of an embodiment of a master control circuit.

An embodiment of the control circuit 15 is shown in FIG. 13. As described above, the control circuit is used to keep all the transmitters and receivers in sync. The second function is to allocate time channels 68 for transmitters to transmit information and for receivers to receive information and to keep track of all channel allocations 68. A channel allocation storage circuit 76 is used to store all of the channel allocations that are currently in use. This circuit is also used to keep track of empty channels that can be allocated if requested.

For this embodiment a sync pulse 69 is transmitted in an allocated time slot 68. As for other embodiments these sync pulses are used to keep the transmitters and receivers in sync. The control circuit 15 preferably maintains at least two channels available for the purpose of transmitting the channel allocations to the respective transmitters and receivers. The channel allocations as stored by the channel allocation storage circuit 76 are updated as the allocations are changed. For example, when a wireless phone 79 user desires to make a call to another wireless phone 80 user, the call first has to be allocated a time slot or channel 68. This is initiated by the wireless phone 79 transmitting a control signal 81 which includes its own address and the address of the desired receiving wireless phone 80 to the control circuit 15. If the address is not in use, the control circuit then transmits a control signal 81 to the initiating phone the channel allocation for each of the phones to transmit and receive. The control circuit then transmits the same time slot allocation information to the receiving phone and stores this information in the address allocation storage circuit 76. For this embodiment, the transmitter and receiver portions of the control circuit have the same components except for the channel allocation and allocated channel storage, which are confined to the transmitter portion.

The transmitter portion of the control circuit 15 is composed of an analog to digital convertor 71, a wave shaper 72, a wave form storage circuit 73, the wave form transmission timing circuit 74, and the wave form transmitter 75. An optional filter 78 may be used to limit the number of harmonics being transmitted. The fundamental frequency wave and the harmonics are timed in the wave shaper 72 so that all of the components of the synthesized wave are transmitted in the same time slot and at the desired amplitude or power level. The wave form transmission timing circuit passes only one cycle for each frequency component.

This embodiment of the control circuit may also be used with embodiments of the invention which transmit a continuous synchronization and reference signal at one frequency and time slotted information pulses at one or more different frequencies.

An embodiment of the invention provides an apparatus and method that would allow substantially faster computer networks. Substantially more computers could be added to any given network without degrading the network's speed. In computer networking the present invention will speed up the data transfer rates and make computer networking more efficient. It will also allow monitors, hard drives, printers and other devices at separate addresses all to be connected together by a single link. This link could be wire, fiber optics, or wireless communication, with each component allocated a time slot channel.

Another embodiment of the invention provides for enhancement of interactive robotics. Each component of a robotics device would be controlled by a single signal with each component accessing a time slot channel. This would make it possible for work to be accomplished in a hazardous area without exposing the operator to physical risk associated with the environment and wearing a suit as designed with sensors to detect movement, touch and sight, and then transmit these movements or essential perceptions to the robot. The robot would then transmit back what it was doing, and what it was sensing. The operator in the suit would then feel what the robot was feeling, what it was seeing and what it was doing instantaneously.

Another embodiment of the apparatus and method provides for the transmission of voice data to specific addresses based upon the time slot channel allocated.

Another embodiment of the invention provides for the simultaneous transmission of a large number of video recordings. Thousands of video recordings can be transmitted simultaneously allowing users to make a selection of any of the videos at any time.

Another embodiment provides for radio and television signal transmission. The present invention greatly increases the channel capacity for the band width allowed. Furthermore, this embodiment of the invention allows the routing of specific channels to specific locations. This allows users to access a tremendous video library from their homes. It, likewise, allows users to access books at public and private libraries. It allows students to complete school work at home and to interact with their instructors as well as other students. This allows more channels for radio, televisions and cellular telephones. Furthermore, not only would the number of channels be increased, but channels would be of digital quality.

An embodiment of the invention enhances the operation of video recorders by allowing them to operate on a digital format. This embodiment also allows the replacement of the revolving head with a fixed head, which makes them more reliable and more compact. Likewise, embodiments of the invention as applied to audio recorders allow audio recorders to be made digital.

Another embodiment of the invention provides for the expansion of the capacity of cellular phone networks by assigning each call to an unallocated time slot for simultaneous transmission and then deleting the call from the network upon completion of the call, making the channel available for other users and other callers.

Under preferred embodiments of the invention, the synthesized information pulses would not be modulated onto a carrier wave. However, the present invention could be used to modulate a carrier wave. In fact, under other embodiments of the invention, the information pulses could be modulated onto an FM, PM, or PWM carrier wave. For example, the positive and negative information pulse segments could be superimposed upon the peak for the carrier wave. This would allow the information pulses to be removed and the information recovered without affecting the information being transmitted by the other modulation methods. After the pulses are recovered, the positive and negative peaks could then be analyzed in the same manner as is provided for the preferred embodiments described above. The process of adding the pulses to the respective carriers uses the process of finding the high or the low points of each cycle and superimposing the information pulses, if desired, to the selected points. Under such embodiments, a synchronization pulse would not ordinarily be used as the channel identification would arise from carrier wave identification.

An embodiment of the present invention provides for the substantial increase in the capacity of existing telephone systems. The simultaneous transmission of numerous calls from a single signal could greatly increase the capacity of existing facilities. Alternatively switching circuits could be much smaller and would be able to provide more reliable service.

Another embodiment of the invention provides for home stereos to transmit specific information to specific speakers. For example, one speaker could be for drums, one for the piano, one for brass instruments, one for strings. One could have the whole orchestra in the living room. Furthermore, the components could be connected by a single wire or the central unit could be entirely wireless.

Another embodiment of the present invention provides for shelf tags in grocery stores. Each electronic grocery store shelf price tag has its own address for each item allowing for instantaneous update of item and price changes. Each product has its own time slot and the transmission can be wireless, allowing complete freedom of location for the shelf tags.

The list of items that could be improved by using this apparatus is, as persons skilled in the art will recognize, enormous.

Other embodiments of the invention and other variations and modifications of the embodiments described above will be obvious to a person skilled in the art. Therefore, the foregoing is intended to be merely illustrative of the invention and the invention is limited only by the following claims.

What is claimed is:

1. An apparatus for digital information transfer comprising:
   a) means for allocating one or more source digital signals to unique, repetitive time slots;
   b) means for generating an analog information wave for each said source digital signal, each said information wave being synthesized by combining a fundamental frequency wave of a pre-selected wave form and a pre-selected number of harmonics of the fundamental frequency wave, the amplitude and phase of the fundamental frequency wave and the amplitude and phase of each of the harmonics of the synthesized wave being a function of the magnitude of the corresponding source digital signal as measured during the allocated time slot for the signal;
   c) means for transmitting each of the analog information waves within its allocated time slot;
   d) means for receiving each of the analog information waves within its allocated time slot;
   e) means for extracting the fundamental frequency wave and each of the harmonics of each analog information wave received during its allocated time slot; and
   f) means for generating an output digital signal for each information wave received during its allocated time slot, said output digital signal having a digital magnitude which is a function of the amplitude and phase of the extracted fundamental frequency wave and the amplitude and phase of the extracted harmonics of the corresponding received information wave.

2. An apparatus as claimed in claim 1 further comprising:
   a) means for transmitting one or more additional harmonics as reference components with fixed reference amplitudes and phases; and
   b) means for calibrating the extracted fundamental frequency wave and extracted harmonics of each received information wave, by comparison of the amplitudes of the reference components as transmitted and the amplitudes of the reference components as received.

3. An apparatus as claimed in claim 1 wherein the means for generating said analog information waves for said source digital signals and the means for transmitting the information waves within the allocated time slots are deployed at a plurality of transmission locations.

4. An apparatus as claimed in claim 1 wherein the means for receiving the information waves within the allocated time slots, the means for extracting the fundamental frequency and harmonics for the analog information waves received during the allocated time slots, and the means for generating output digital signals with digital magnitudes which are a function of the amplitudes and phases of said extracted fundamental frequency and harmonics for the information waves received are deployed at a plurality of receiving locations.

5. An apparatus as claimed in claim 1 wherein the means for generating analog information waves generates an information wave for each said source digital signal with the amplitude and phase of the fundamental frequency wave being fixed and the relative amplitudes of each of the harmonics in comparison to the amplitude of the fundamental frequency wave and the phases of each of the harmonics being a function of the magnitude of the corresponding source digital signal as measured during the allocated time slot for the signal, and the means for generating output digital signals generates output digital signals having magnitudes which are a function of the relative amplitudes of the extracted harmonics in comparison to the amplitude of the extracted fundamental frequency wave and of the phases of the extracted of the corresponding received information waves.

6. An apparatus as claimed in claim 1 wherein the means for allocating one or more source digital signals to unique, repetitive time slots includes a means for generating repetitive synchronization waves of a pre-selected uniform wave form and frequency, said frequency being distinct from the frequency of the information waves and a synchronization wave being generated in each time slot allocated for the information waves.

7. An apparatus as claimed in claim 1 wherein the means for allocating one or more source digital signals to unique, repetitive time slots includes a means for generating repetitive synchronization waves of a pre-selected frequency, said frequency being distinct from the frequency of the information waves, and a synchronization wave being generated in each time slot allocated for the information waves, the amplitude of said synchronization wave being a function of an identifier for the synchronization wave.

8. An apparatus as claimed in claim 1 wherein the means for allocating one or more source digital signals to unique, repetitive time slots includes a means for generating repetitive synchronization waves of a pre-selected uniform wave form and frequency, said frequency being distinct from the frequency of the information waves and a synchronization wave being generated in each time slot allocated for the information waves, and wherein the means for extracting the fundamental frequency wave and each of the harmonics of each analog information wave received during its allocated time slot includes a means for calibrating each information wave received by comparison of the amplitude of the synchronization wave as received during the time slot for the information wave with the known amplitude of the synchronization wave as transmitted.

9. An apparatus as claimed in claim 1 wherein the means for allocating one or more source digital signals to unique, repetitive time slots, includes a means for allocating a plurality of source digital signals to each time slot, and wherein the means for generating an analog information wave for each said source digital signal includes a means for generating an information wave with a distinct pre-selected frequency for each of the plurality of source digital signals allocated to each time slot, and wherein the means for transmitting each of the analog information waves within its allocated time slot includes a means for transmitting the plurality of information waves allocated to each time slot at distinct frequencies, and wherein the means for receiving each of the analog information waves within its allocated time slot includes a means for receiving the plurality of information waves allocated to each time slot at the pre-selected frequencies, and wherein the means for extracting the fundamental frequency wave and each of the harmonics of each analog information wave received during its allocated time slot includes a means for extracting fundamental frequency waves and harmonics for each of the plurality of information waves received at the pre-selected frequencies, and wherein the means for generating an output digital signal for each information wave received during its allocated time slot includes a means for generating an output digital signal for each of the plurality of information waves received during each time slot.

10. An apparatus as claimed in claim 1 wherein the means for generating an analog information wave for each said source digital signal further includes a means for simultaneously generating and adding analog signals for two or more source signals for a single information wave.

11. An apparatus as claimed in claim 1 wherein each analog information wave generated has a positive segment and a negative segment and wherein the means for generating an analog information wave further provides for generating a zero wave segment between the positive and negative segments of each information wave, and the means for extracting the fundamental frequency wave and the harmonics for each analog information wave received during its allocated time slot further provides for a zero correction of the zero wave segment, thereby interposing an interim zero correction on the extracted fundamental frequency and harmonics.

12. An apparatus for digital information transfer comprising:
 a) means for generating synchronizing waves of pre-set wave form and frequency;
 b) means for allocating one or more source digital signals to unique time slots between successive synchronizing waves;
 c) means for generating an analog information wave for each said source digital signal, each said information wave being synthesized by combining a fundamental frequency wave of a pre-selected wave form and a pre-selected number of harmonics of the fundamental frequency wave, the amplitude and phase of the fundamental frequency wave and the amplitude and phase of each of the harmonics of the synthesized wave being a function of the magnitude of the corresponding source digital signal as measured during the allocated time slot for the signal;
 d) means for transmitting the information wave for each source digital signal within its allocated time slot;
 e) means for receiving the information wave for each source digital signal during the allocated time slot for the source digital signal as referenced to successive synchronizing waves;
 f) means for extracting the fundamental frequency wave and each of the harmonics of each analog information wave received during its allocated time slot; and
 g) means for generating an output digital signal for each information wave received during its allocated time slot, said output digital signal having a digital magnitude which is a function of the amplitude and phase of the extracted fundamental frequency wave and the amplitude and phase of the extracted harmonics of the corresponding received information wave.

13. An apparatus as claimed in claim 12 further comprising:
 a) means for transmitting one or more additional harmonics as reference components with fixed reference amplitudes and phases; and
 b) means for calibrating the extracted fundamental frequency wave and extracted harmonics of each received information wave, by comparison of the amplitudes of the reference components as transmitted and the amplitudes of the reference components as received.

14. An apparatus as claimed in claim 12 wherein the means for generating an analog information wave for each source digital signal and the means for transmitting the information wave for each source digital signal within its allocated time slot are deployed at a plurality of transmission locations.

15. An apparatus as claimed in claim 12 wherein the means for receiving the information waves within the allocated time slots, the means for extracting the fundamental frequency and harmonics for the analog information waves received during the allocated time slots, and the means for generating output digital signals with digital magnitudes which are a function of the amplitudes and phases of said extracted fundamental frequency and harmonics for the information waves received are deployed at a plurality of receiving locations.

16. An apparatus as claimed in claim 12 wherein the means for generating analog information waves generates an information wave for each said source digital signal with the amplitude and phase of the fundamental frequency wave being fixed and the relative amplitudes of each of the harmonics in comparison to the amplitude of the fundamental frequency wave and the phases of each of the harmonics being a function of the magnitude of the corresponding source digital signal as measured during the allocated time slot for the signal, and wherein the means for generating output digital signals generates output digital signals having magnitudes which are a function of the relative amplitudes of the extracted harmonics in comparison to the amplitude of the extracted fundamental frequency wave and of the phases of the extracted harmonics of the corresponding received information waves.

17. An apparatus as claimed in claim 12 wherein the means for generating synchronizing waves generates synchronizing waves with a frequency which is distinct from the frequency of the information waves and generates a synchronizing wave in each time slot allocated for the information waves.

18. An apparatus as claimed in claim 12 wherein the means for generating synchronizing waves generates synchronizing waves with a frequency which is distinct from the frequency of the information waves and generates a synchronizing wave in each time slot allocated for the information waves, the amplitude of said synchronizing wave being a function of an identifier for the synchronization wave.

19. An apparatus as claimed in claim 12 wherein the means for generating synchronizing waves generates synchronizing waves with a frequency which is distinct from the frequency of the information waves and generates a synchronizing wave in each time slot allocated for the information waves, and wherein the means for extracting the fundamental frequency wave and each of the harmonics of each analog information wave received during its allocated time slot includes a means for calibrating each information wave received by comparison of the amplitude of the synchronization wave as received during the time slot for the information wave with the known amplitude of the synchronization wave as transmitted.

20. An apparatus as claimed in claim 12 wherein the means for allocating one or more source digital signals to unique, repetitive time slots, includes a means for allocating a plurality of source digital signals to each time slot, and wherein the means for generating an analog information wave for each said source digital signal includes a means for generating an information wave with a distinct pre-selected frequency for each of the plurality of source digital signals allocated to each time slot, and wherein the means for transmitting each of the analog information waves within its allocated time slot includes a means for transmitting the plurality of information waves allocated to each time slot at distinct frequencies, and wherein the means for receiving each of the analog information waves within its allocated time slot includes a means for receiving the plurality of information waves allocated to each time slot at the pre-selected frequencies, and wherein the means for extracting the fundamental frequency wave and each of the harmonics of each analog information wave received during its allocated time slot includes a means for extracting fundamental frequency waves and harmonics for each of the plurality of information waves received at the pre-selected frequencies, and wherein the means for generating an output digital signal for each information wave received during its allocated time slot includes a means for generating an output digital signal for each of the plurality of information waves received during each time slot.

21. An apparatus as claimed in claim 12 wherein the means for generating an analog information wave for each source digital signal further includes a means for simultaneously inputting two or more source digital signals, generating an analog information signal for each source digital signal, and combining the analog information signals of said two or more source digital signals for a single information wave.

22. An apparatus as claimed in claim 12 wherein each analog information wave generated has a positive segment and a negative segment and wherein the means for generating an analog information wave further provides for generating a zero wave segment between the positive and negative segments of each information wave, and the means for extracting the fundamental frequency wave and the harmonics for each analog information wave received during its allocated time slot further provides for a zero correction of the zero wave segment, thereby interposing an interim zero correction on the extracted fundamental frequency and harmonics.

23. An apparatus for digital information transfer comprising:
   a) a synchronization wave generation circuit;
   b) a circuit for allocating one or more source digital signals to unique time slots between successive synchronizing waves;
   c) one or more digital to analog signal generators for generating an analog information wave for each source digital signal, which information wave is synthesized by combining a fundamental frequency wave of a pre-selected wave form and a pre-selected number of harmonics of the fundamental frequency wave, the amplitude and phase of the fundamental frequency wave and the amplitude and phase of each of the harmonics of the synthesized wave being a function of the magnitude of the corresponding source digital signal as measured during the allocated time slot for the signal;
   d) one or more transmitters for transmitting the information wave for each source digital signal within its allocated time slot;
   e) one or more receivers for receiving the information wave for each source digital signal within the allocated time slot for the source digital signal as referenced to successive synchronization waves;
   f) one or more circuits for extracting the fundamental frequency wave and each of the harmonics of each analog information wave received during its allocated time slot; and
   g) one or more circuits for generating an output digital signal for each information wave received during its allocated time slot, said output digital signal having a digital magnitude which is a function of the amplitude and phase of the extracted fundamental frequency wave and the amplitude and phase of the extracted harmonics of the corresponding received information wave.

24. An apparatus as claimed in claim 23 further comprising:
   a) circuits for transmitting one or more additional harmonics as reference components with fixed reference amplitudes and phases; and
   b) circuits for calibrating the extracted fundamental frequency wave and extracted harmonics of each received information wave, by comparison of the amplitudes of the reference components as transmitted and the amplitudes of the reference components as received.

25. An apparatus as claimed in claim 23 wherein the digital to analog signal generators for generating an analog information wave for each source digital signal within its allocated time slot and the transmitters for transmitting the information wave for each source digital signal within its allocated time slot are deployed at a plurality of transmission locations.

26. An apparatus as claimed in claim 23 wherein the receivers, the circuits for extracting the fundamental frequency wave and each of the harmonics of each analog information wave received during its allocated time slot, and the circuits for generating an output digital signal for each information wave received during its allocated time slot are deployed at a plurality of receiving locations.

27. An apparatus as claimed in claim 23 wherein the digital to analog signal generators generate an information wave for each said source digital signal with the amplitude and phase of the fundamental frequency wave being fixed and the relative amplitudes of each of the harmonics in comparison to the amplitude of the fundamental frequency wave and the phases of each of the harmonics being a function of the magnitude of the corresponding source digital signal as measured during the allocated time slot for the signal, and wherein the circuits for generating output digital signals generate output digital signals having magnitudes which are a function of the relative amplitudes of the extracted harmonics in comparison to the amplitude of the extracted fundamental frequency wave and of the phases of the extracted harmonics of the corresponding received information waves.

28. An apparatus as claimed in claim 23 wherein the circuit for generating synchronizing waves generates synchronizing waves with a frequency which is distinct from the frequency of the information waves and generates a synchronizing wave in each time slot allocated for the information waves.

29. An apparatus as claimed in claim 23 wherein the circuit for generating synchronizing waves generates synchronizing waves with a frequency which is distinct from the frequency of the information waves and generates a synchronizing wave in each time slot allocated for the information waves, the amplitude of said synchronization wave being a function of an identifier for the synchronization wave.

30. An apparatus as claimed in claim 23 wherein the circuit for generating synchronizing waves generates synchronizing waves with a frequency which is distinct from the frequency of the information waves and generates a synchronizing wave in each time slot allocated for the information waves, and wherein the circuits for extracting the fundamental frequency wave and each of the harmonics of each analog information wave received during its allocated time slot further provide for the calibration of each information wave received by comparison of the amplitude of the synchronizing wave as received during the time slot for the information wave with the known amplitude of the synchronizing wave as transmitted.

31. An apparatus as claimed in claim 23 wherein the circuit for allocating one or more source digital signals to unique time slots between successive synchronizing waves provides for the allocation of a plurality of source digital signals to each time slot, and wherein the analog signal generators for generating an analog information wave for each source digital signal generate an information wave with a distinct pre-selected frequency for each of the plurality of source digital signals allocated to each time slot, and wherein the transmitters for transmitting the information wave for each source digital signal within its allocated time slot transmit the plurality of information waves allocated to each time slot at distinct frequencies, and wherein the receivers for receiving the information wave for each source digital signal within the allocated time slot for the source digital signal as referenced to successive synchronization waves receive the plurality of information waves allocated to each time slot at the pre-selected frequencies, and wherein the circuits for extracting the fundamental frequency wave and each of the harmonics of each analog information wave received during its allocated time slot extract fundamental frequency waves and harmonics for each of the plurality of information waves received at the pre-selected frequencies, and wherein the circuits for generating an output digital signal for each information wave received during its allocated time slot generate an output digital signal for each of the plurality of information waves received during each time slot.

32. An apparatus as claimed in claim 23 further including one or more additional digital to analog signal generators to permit the simultaneous input of two or more source digital signals and including a circuit for combining the analog signals for said two or more source digital signals for a single analog information wave.

33. An apparatus as claimed in claim 23 wherein each analog information wave generated has a positive segment and a negative segment and wherein the digital to analog signal generator for generating an analog information wave further provides for generating a zero wave segment between the positive and negative segments of each information wave, and the circuit for extracting the fundamental frequency wave and the harmonics for each analog information wave received during its allocated time slot further provides for a zero correction of the zero wave segment, thereby interposing an interim zero correction on the extracted fundamental frequency and harmonics.

34. An apparatus for digital information transfer comprising:
  a) means for generating synchronizing waves of pre-set wave form and frequency;
  b) means for transmitting said synchronizing waves to one or more remote transmission locations;
  c) means for receiving said synchronizing waves at each remote transmission location;
  d) means for allocating one or more source digital signals at each remote transmission location to unique time slots between successive synchronizing waves;
  e) means for generating an analog information wave for each said source digital signal at each remote transmission location, each said information wave being synthesized by combining a fundamental frequency wave of a pre-selected wave form and a pre-selected number of harmonics of the fundamental frequency wave, the amplitude and phase of the fundamental frequency wave and the amplitude and phase of each of the harmonics of the synthesized wave being a function of the magnitude of the corresponding source digital signal as measured during the allocated time slot for the signal;
  f) means for transmitting the information wave for each source digital signal from each remote transmission location;
  g) means for receiving, at one or more locations, the information wave for each source digital signal transmitted from each remote transmission location, the information wave being received within its allocated time slot as referenced to successive synchronization waves;

h) means for extracting the fundamental frequency wave and each of the harmonics of each analog information wave received during its allocated time slot at one or more locations; and i) means for generating an output digital signal for each information wave received during its allocated time slot, said output digital signal having a digital magnitude which is a function of the amplitude and phase of the extracted fundamental frequency wave and the amplitude and phase of the extracted harmonics of the corresponding received information wave.

35. An apparatus as claimed in claim 34 further comprising:

a) means for transmitting, at each remote transmission locating, one or more additional harmonics as reference components with fixed reference amplitudes and phases; and b) means for calibrating, at one or more locations, the extracted fundamental frequency wave and extracted harmonics of each received information wave, by comparison of the amplitudes of the reference components as transmitted and the amplitudes of the reference components as received.

36. An apparatus as claimed in claim 34 wherein the means for generating analog information waves generates an information wave for each said source digital signal with the amplitude and phase of the fundamental frequency wave being fixed and the relative amplitudes of each of the harmonics in comparison to the amplitude of the fundamental frequency wave and the phases of each of the harmonics being a function of the magnitude of the corresponding source digital signal as measured during the allocated time slot for the signal, and wherein the means for generating output digital signals generates output digital signals having magnitudes which are a function of the relative amplitudes of each of the extracted harmonics in comparison to the amplitude of the extracted fundamental frequency wave and of the phases of each of the extracted harmonics of the corresponding received information waves.

37. An apparatus as claimed in claim 34 wherein the means for generating synchronizing waves generates synchronizing waves with a frequency which is distinct from the frequency of the information waves and generates a synchronizing wave in each time slot allocated for the information waves.

38. An apparatus as claimed in claim 34 wherein the means for generating synchronizing waves generates synchronizing waves with a frequency which is distinct from the frequency of the information waves and generates a synchronizing wave in each time slot allocated for the information waves, the amplitude of the synchronizing wave being a function of an identifier for the synchronizing wave.

39. An apparatus as claimed in claim 34 wherein the means for generating synchronizing waves generates synchronizing waves with a frequency which is distinct from the frequency of the information waves and generates a synchronizing wave in each time slot allocated for the information waves, and wherein the means for extracting the fundamental frequency wave and each of the harmonics of each analog information wave received during its allocated time slot includes a means for calibrating the each information wave received by comparison of the amplitude of the synchronization wave as received during the time slot for the information wave with the known amplitude of the synchronization wave as transmitted.

40. An apparatus as claimed in claim 34 wherein the means for allocating one or more source digital signals to unique, repetitive time slots, includes a means for allocating a plurality of source digital signals to each time slot, and wherein the means for generating an analog information wave for each said source digital signal includes a means for generating an information wave with a distinct pre-selected frequency for each of the plurality of source digital signals allocated to each time slot, and wherein the means for transmitting each of the analog information waves within its allocated time slot from each remote transmission location includes a means for transmitting the plurality of information waves allocated to each time slot at distinct frequencies, and wherein the means for receiving each of the analog information waves within its allocated time slot at one or more locations includes a means for receiving the plurality of information waves allocated to each time slot at the pre-selected frequencies, and wherein the means for extracting the fundamental frequency wave and each of the harmonics of each analog information wave received during its allocated time slot includes a means for extracting fundamental frequency waves and harmonics for each of the plurality of information waves received at the pre-selected frequencies, and wherein the means for generating an output digital signal for each information wave received during its allocated time slot includes a means for generating an output digital signal for each of the plurality of information waves received during each time slot.

41. An apparatus as claimed in claim 34 wherein the means for generating an analog information signal for each source digital signal further includes a means for simultaneously imputing two or more source digital signals, generating an analog information signal for each source digital signal, and combining the analog signals for a single information wave.

42. An apparatus as claimed in claim 34 wherein each analog information wave generated has a positive segment and a negative segment and wherein the means for generating an analog information wave further provides for generating a zero wave segment between the positive and negative segments of each information wave, and the means for extracting the fundamental frequency wave and the harmonics for each analog information wave received during its allocated time slot further provides for a zero correction of the zero wave segment, thereby interposing an interim zero correction on the extracted fundamental frequency and harmonics.

43. An apparatus for digital information transfer comprising:

a) means for allocating one or more source digital signals to unique, repetitive time slots;

b) means for generating an analog information wave for each said source digital signal, each said information wave being synthesized by combining a fundamental frequency wave of a pre-selected wave form and a pre-selected number of harmonics of the fundamental frequency wave, the amplitude and phase of the fundamental frequency wave being fixed and the relative amplitudes of each of the harmonics of the synthesized wave and the phases of each of the harmonics being a function of the magnitude of the corresponding source digital signal as measured during the allocated time slot for the signal;

c) means for transmitting each of the analog information waves within its allocated time slot;

d) means for receiving each of the analog information waves within its allocated time slot;

e) means for extracting the fundamental frequency wave and each of the harmonics of each analog information wave received during its allocated time slot; and f) means for generating an output digital signal for each information wave received during its allocated time slot, said output digital signal having a digital magnitude which is a function of the relative amplitudes of each of the extracted harmonics in comparison to the amplitude of the extracted fundamental frequency wave and of the phases of each of the extracted harmonics of the corresponding received information wave.

44. An apparatus as claimed in claim 43 further comprising:
   a) means for transmitting one or more additional harmonics as reference components with fixed reference amplitudes and phases; and
   b) means for calibrating the extracted fundamental frequency wave and extracted harmonics of each received information wave, by comparison of the amplitudes of the reference components as transmitted and the amplitudes of the reference components as received.

45. An apparatus as claimed in claim 43 wherein the means for allocating one or more source digital signals to unique, repetitive time slots includes a means for generating repetitive synchronization waves of a pre-selected uniform wave form and frequency, said frequency being distinct from the frequency of the information waves and a synchronization wave being generated in each time slot allocated for the information waves.

46. An apparatus as claimed in claim 43 wherein the means for allocating one or more source digital signals to unique, repetitive time slots includes a means for generating repetitive synchronization waves of a pre-selected frequency, said frequency being distinct from the frequency of the information waves, and a synchronization wave being generated in each time slot allocated for the information waves, the amplitude of said synchronization wave being a function of an identifier for the synchronization wave.

47. An apparatus as claimed in claim 43 wherein the means for allocating one or more source digital signals to unique, repetitive time slots includes a means for generating repetitive synchronization waves of a pre-selected uniform wave form and frequency, said frequency being distinct from the frequency of the information waves and a synchronization wave being generated in each time slot allocated for the information waves, and wherein the means for extracting the fundamental frequency wave and each of the harmonics of each analog information wave received during its allocated time slot includes a means for calibrating each information wave received by comparison of the amplitude of the synchronization wave as received during the time slot for the information wave with the known amplitude of the synchronization wave as transmitted.

48. An apparatus as claimed in claim 43 wherein the means for allocating one or more source digital signals to unique, repetitive time slots, includes a means for allocating a plurality of source digital signals to each time slot, and wherein the means for generating an analog information wave for each said source digital signal includes a means for generating an information wave with a distinct pre-selected frequency for each of the plurality of source digital signals allocated to each time slot, and wherein the means for transmitting each of the analog information waves within its allocated time slot includes a means for transmitting the plurality of information waves allocated to each time slot at distinct frequencies, and wherein the means for receiving each of the analog information waves within its allocated time slot includes a means for receiving the plurality of information waves allocated to each time slot at the pre-selected frequencies, and wherein the means for extracting the fundamental frequency wave and each of the harmonics of each analog information wave received during its allocated time slot includes a means for extracting fundamental frequency waves and harmonics for each of the plurality of information waves received at the pre-selected frequencies, and wherein the means for generating an output digital signal for each information wave received during its allocated time slot includes a means for generating an output digital signal for each of the plurality of information waves received during each time slot.

49. An apparatus as claimed in claim 43 wherein the means for generating an analog information signal for each source digital signal further includes a means for simultaneously imputing two or more source digital signals, generating an analog information signal for each source digital signal, and combining the analog signals for a single information wave.

50. An apparatus as claimed in claim 43 wherein each analog information wave generated has a positive segment and a negative segment and wherein the means for generating an analog information wave further provides for generating a zero wave segment between the positive and negative segments of each information wave, and the means for extracting the fundamental frequency wave and the harmonics for each analog information wave received during its allocated time slot further provides for a zero correction of the zero wave segment, thereby interposing an interim zero correction on the extracted fundamental frequency and harmonics.

51. An apparatus as claimed in claim 43 wherein the means for generating said analog information waves for said source digital signals and the means for transmitting the information waves within the allocated time slots are deployed at a plurality of transmission locations.

52. An apparatus as claimed in claim 43 wherein the means for receiving the information waves within the allocated time slots, the means for extracting the fundamental frequency wave and harmonics for the analog information waves received during the allocated time slots, and the means for generating output digital signals with digital magnitudes which are a function of the relative amplitudes of each of the extracted harmonics in comparison to the amplitude of the extracted fundamental frequency wave and of the phases of each of the extracted harmonics of the corresponding received information waves are deployed at a plurality of receiving locations.

53. A method for digital information transfer comprising the steps of:
   a) allocating one or more source digital signals to unique, repetitive time slots;
   b) generating an analog information wave for each said source digital signal, each said information wave being synthesized by combining a fundamental frequency wave of a pre-selected wave form and a pre-selected number of harmonics of the fundamental frequency wave, the amplitude and phase of the fundamental frequency wave and the amplitude and phase of each of the harmonics of the synthesized wave being a function of the magnitude of the corresponding source digital signal as measured during the allocated time slot for the signal;
   c) transmitting each of the analog information waves within its allocated time slot;
   d) receiving each of the analog information waves within its allocated time slot;
   e) extracting the fundamental frequency wave and each of the harmonics of each analog information wave received during its allocated time slot; and f) generating an output digital signal for each information wave received during its allocated time slot, said output digital signal having a digital magnitude which is a function of the amplitude and phase of the extracted fundamental frequency wave and the amplitude and phase of the extracted harmonics of the corresponding received information wave.

54. Method as claimed in claim 53 further comprising the steps of:
   a) transmitting one or more additional harmonics as reference components with fixed reference amplitudes and phases; and
   b) calibrating the extracted fundamental frequency wave and extracted harmonics of each received information wave, by comparison of the amplitudes of the reference components as transmitted and the amplitudes of the reference components as received.

55. Method as claimed in claim 53 wherein the steps of generating said analog information waves for said source digital signals and transmitting the information waves within the allocated time slots are performed at a plurality of transmission locations.

56. Method as claimed in claim 53 wherein the steps of receiving the information waves within the allocated time slots, extracting the fundamental frequency and harmonics for the analog information waves received during the allocated time slots, and generating output digital signals with digital magnitudes which are a function of the amplitudes and phases of said extracted fundamental frequency and harmonics for the information waves received are performed at a plurality of receiving locations.

57. Method as claimed in claim 53 wherein the step of generating analog information waves generates an information wave for each said source digital signal with the amplitude and phase of the fundamental frequency wave being fixed and the relative amplitudes of each of the harmonics in comparison to the amplitude of the fundamental frequency wave and the phases of each of the harmonics being a function of the magnitude of the corresponding source digital signal as measured during the allocated time slot for the signal, and wherein the step of generating output digital signals generates output digital signals having magnitudes which are a function of the relative amplitudes of each of the extracted harmonics in comparison to the amplitude of the extracted fundamental frequency wave and of the phases of each of the extracted harmonics of the corresponding received information waves.

58. Method as claimed in claim 53 wherein the step of allocating one or more source digital signals to unique, repetitive time slots includes generating repetitive synchronization waves of a pre-selected uniform wave form and frequency, said frequency being distinct from the frequency of the information waves and a synchronization wave being generated in each time slot allocated for the information waves.

59. Method as claimed in claim 53 wherein the step of allocating one or more source digital signals to unique, repetitive time slots includes generating repetitive synchronization waves of a pre-selected frequency, said frequency being distinct from the frequency of the information waves, and a synchronization wave being generated in each time slot allocated for the information waves, the amplitude of said synchronization wave being a function of an identifier for the synchronization wave.

60. Method as claimed in claim 53 wherein the step of allocating one or more source digital signals to unique, repetitive time slots includes generating repetitive synchronization waves of a pre-selected uniform wave form and frequency, said frequency being distinct from the frequency of the information waves and a synchronization wave being generated in each time slot allocated for the information waves, and wherein the step of extracting the fundamental frequency wave and each of the harmonics of each analog information wave received during its allocated time slot includes calibrating each information wave received by comparison of the amplitude of the synchronization wave as received during the time slot for the information wave with the known amplitude of the synchronization wave as transmitted.

61. Method as claimed in claim 53 wherein the step of allocating one or more source digital signals to unique, repetitive time slots, includes allocating a plurality of source digital signals to each time slot, and wherein the step of generating an analog information wave for each said source digital signal includes generating an information wave with a distinct pre-selected frequency for each of the plurality of source digital signals allocated to each time slot, and wherein the step of transmitting each of the analog information waves within its allocated time slot includes transmitting the plurality of information waves allocated to each time slot at distinct frequencies, and wherein the step of receiving each of the analog information waves within its allocated time slot includes receiving the plurality of information waves allocated to each time slot at the pre-selected frequencies, and wherein the step of extracting the fundamental frequency wave and each of the harmonics of each analog information wave received during its allocated time slot includes extracting fundamental frequency waves and harmonics for each of the plurality of information waves received at the pre-selected frequencies, and wherein the step of generating an output digital signal for each information wave received during its allocated time slot includes generating an output digital signal for each of the plurality of information waves received during each time slot.

62. Method claimed in claim 53 wherein the step of generating an analog information wave for each said source digital signal further includes a step of simultaneously generating and adding analog signals for two or more source signals for a single information wave.

63. Method as claimed in claim 53 wherein each analog information wave generated has a positive segment and a negative segment and wherein the step of generating an analog information wave further includes generating a zero wave segment between the positive and negative segments of each information wave, and the step of extracting the fundamental frequency wave and the harmonics for each analog information wave received during its allocated time slot further includes making a zero correction of the zero wave segment, thereby interposing an interim zero correction on the extracted fundamental frequency and harmonics.

64. A method of digital information transfer comprising the steps of:
   a) generating synchronizing waves of pre-set wave form and frequency;
   b) allocating one or more source digital signals to unique time slots between successive synchronizing waves;
   c) generating an analog information wave for each said source digital signal, each said information wave being synthesized by combining a fundamental frequency wave of a pre-selected wave form and a pre-selected number of harmonics of the fundamental frequency wave, the amplitude and phase of the fundamental frequency wave and the amplitude and phase of each of the harmonics of the synthesized wave being a function of the magnitude of the corresponding source digital signal as measured during the allocated time slot for the signal;

d) transmitting the information wave for each source digital signal within its allocated time slot;

e) receiving the information wave for each source digital signal during the allocated time slot for the source digital signal as referenced to successive synchronizing waves;

f) extracting the fundamental frequency wave and each of the harmonics of each analog information wave received during its allocated time slot; and g) generating an output digital signal for each information wave received during its allocated time slot, said output digital signal having a digital magnitude which is a function of the amplitude and phase of the extracted fundamental frequency wave and the amplitude and phase of the extracted harmonics of the corresponding received information wave.

65. Method as claimed in claim 64 further comprising the steps of:

a) transmitting one or more additional harmonics as reference components with fixed reference amplitudes and phases; and b) calibrating the extracted fundamental frequency wave and extracted harmonics of each received information wave, by comparison of the amplitudes of the reference components as transmitted and the amplitudes of the reference components as received.

66. Method as claimed in claim 64 wherein the steps of generating an analog information wave for each source digital signal and transmitting the information wave for each source digital signal within its allocated time slot are performed at a plurality of transmission locations.

67. Method as claimed in claim 64 wherein the steps of receiving the information waves within the allocated time slots, extracting the fundamental frequency and harmonics for the analog information waves received during the allocated time slots, and generating output digital signals with digital magnitudes which are a function of the amplitudes and phases of said extracted fundamental frequency and harmonics for the information waves received are performed at a plurality of receiving locations.

68. Method as claimed in claim 64 wherein the step of generating analog information waves generates an information wave for each said source digital signal with the amplitude and phase of the fundamental frequency wave being fixed and the relative amplitudes of each of the harmonics in comparison to the amplitude of the fundamental frequency wave and the phases of each of the harmonics being a function of the magnitude of the corresponding source digital signal as measured during the allocated time slot for the signal, and wherein the step of generating output digital signals generates output digital signals having magnitudes which are a function of the relative amplitudes of the extracted harmonics in comparison to the amplitude of the extracted fundamental frequency wave and of the phases of the extracted harmonics of the corresponding received information waves.

69. Method as claimed in claim 64 wherein the step of generating synchronizing waves generates synchronizing waves with a frequency which is distinct from the frequency of the information waves and generates a synchronizing wave in each time slot allocated for the information waves.

70. Method as claimed in claim 64 wherein the step of generating synchronizing waves generates synchronizing waves with a frequency which is distinct from the frequency of the information waves and generates a synchronizing wave in each time slot allocated for the information waves, the amplitude of said synchronizing wave being a function of an identifier for the synchronizing wave.

71. Method as claimed in claim 64 wherein the step of generating synchronizing waves generates synchronizing waves with a frequency which is distinct from the frequency of the information waves and generates a synchronizing wave in each time slot allocated for the information waves, and wherein the step of extracting the fundamental frequency wave and each of the harmonics of each analog information wave received during its allocated time slot includes calibrating each information wave received by comparison of the amplitude of the synchronization wave as received during the time slot for the information wave with the known amplitude of the synchronization wave as transmitted.

72. Method as claimed in claim 64 wherein the step of allocating one or more source digital signals to unique, repetitive time slots, includes allocating a plurality of source digital signals to each time slot, and wherein the step of generating an analog information wave for each said source digital signal includes generating an information wave with a distinct pre-selected frequency for each of the plurality of source digital signals allocated to each time slot, and wherein the step of transmitting each of the analog information waves within its allocated time slot includes transmitting the plurality of information waves allocated to each time slot at distinct frequencies, and wherein the step of receiving each of the analog information waves within its allocated time slot includes receiving the plurality of information waves allocated to each time slot at the pre-selected frequencies, and wherein the step of extracting the fundamental frequency wave and each of the harmonics of each analog information wave received during its allocated time slot includes extracting fundamental frequency waves and harmonics for each of the plurality of information waves received at the pre-selected frequencies, and wherein the step of generating an output digital signal for each information wave received during its allocated time slot includes generating an output digital signal for each of the plurality of information waves received during each time slot.

73. Method claimed in claim 64 wherein the step of generating an analog information wave for each source digital signal further includes a step of simultaneously imputing two or more source digital signals, generating an analog information signal for each source digital signal, and combining the analog information signals of said two or more source digital signals for a single information wave.

74. Method as claimed in claim 64 wherein each analog information wave generated has a positive segment and a negative segment and wherein the step of generating an analog information wave further includes generating a zero wave segment between the positive and negative segments of each information wave, and the step of extracting the fundamental frequency wave and the harmonics for each analog information wave received during its allocated time slot further includes making a zero correction of the zero wave segment, thereby interposing an interim zero correction on the extracted fundamental frequency and harmonics.

75. A method of digital information transfer comprising the steps of:

a) generating synchronizing waves of pre-set wave form and frequency;

b) transmitting said synchronizing waves to one or more remote transmission locations;

c) receiving said synchronizing waves at each remote transmission location;

d) allocating one or more source digital signals at each remote transmission location to unique time slots between successive synchronizing waves;

e) generating an analog information wave for each said source digital signal at each remote transmission location, each said information wave being synthesized by combining a fundamental frequency wave of a pre-selected wave form and a pre-selected number of harmonics of the fundamental frequency wave, the amplitude and phase of the fundamental frequency wave and the amplitude and phase of each of the harmonics of the synthesized wave being a function of the magnitude of the corresponding source digital signal as measured during the allocated time slot for the signal;

f) transmitting the information wave for each source digital signal from each remote transmission location;

g) receiving, at one or more locations, the information wave for each source digital signal transmitted from each remote transmission location, the information wave being received within its allocated time slot as referenced to successive synchronization waves;

h) extracting the fundamental frequency wave and each of the harmonics of each analog information wave received during its allocated time slot at one or more locations; and i) generating an output digital signal for each information wave received during its allocated time slot, said output digital signal having a digital magnitude which is a function of the amplitude and phase of the extracted fundamental frequency wave and the amplitude and phase of the extracted harmonics of the corresponding received information wave.

76. Method as claimed in claim 75 further comprising the steps of:

a) transmitting, at each remote transmission location, one or more additional harmonics as reference components with fixed reference amplitudes and phases; and b) calibrating, at one or more locations, the extracted fundamental frequency wave and extracted harmonics of each received information wave, by comparison of the amplitudes of the reference components as transmitted and the amplitudes of the reference components as received.

77. Method as claimed in claim 75 wherein the step of generating analog information waves generates an information wave for each said source digital signal with the amplitude and phase of the fundamental frequency wave being fixed and the relative amplitudes of each of the harmonics in comparison to the amplitude of the fundamental frequency wave and the phases of each of the harmonics being a function of the magnitude of the corresponding source digital signal as measured during the allocated time slot for the signal, and wherein the step of generating output digital signals generates output digital signals having magnitudes which are a function of the relative amplitudes of each of the extracted harmonics in comparison to the amplitude of the extracted fundamental frequency wave and of the phases of each of the extracted harmonics of the corresponding received information waves.

78. Method as claimed in claim 75 wherein the step of generating synchronizing waves generates synchronizing waves with a frequency which is distinct from the frequency of the information waves and generates a synchronizing wave in each time slot allocated for the information waves.

79. Method as claimed in claim 75 wherein the step of generating synchronizing waves generates synchronizing waves with a frequency which is distinct from the frequency of the information waves and generates a synchronizing wave in each time slot allocated for the information waves, the amplitude of said synchronizing wave being a function of an identifier of the synchronizing wave.

80. Method as claimed in claim 75 wherein the step of generating synchronizing waves generates synchronizing waves with a frequency which is distinct from the frequency of the information waves and generates a synchronizing wave in each time slot allocated for the information waves, and wherein the step of extracting the fundamental frequency wave and each of the harmonics of each analog information wave received during its allocated time slot includes calibrating each information wave received by comparison of the amplitude of the synchronization wave as received during the time slot for the information wave with the known amplitude of the synchronization wave as transmitted.

81. Method as claimed in claim 75 wherein the step of allocating one or more source digital signals to unique, repetitive time slots, includes allocating a plurality of source digital signals to each time slot, and wherein the step of generating an analog information wave for each said source digital signal includes generating an information wave with a distinct pre-selected frequency for each of the plurality of source digital signals allocated to each time slot, and wherein the step of transmitting each of the analog information waves within its allocated time slot from each remote transmission location includes transmitting the plurality of information waves allocated to each time slot at distinct frequencies, and wherein the step of receiving each of the analog information waves within its allocated time slot at one or more locations includes receiving the plurality of information waves allocated to each time slot at the pre-selected frequencies, and wherein the step of extracting the fundamental frequency wave and each of the harmonics of each analog information wave received during its allocated time slot includes extracting fundamental frequency waves and harmonics for each of the plurality of information waves received at the pre-selected frequencies, and wherein the step of generating an output digital signal for each information wave received during its allocated time slot includes generating an output digital signal for each of the plurality of information waves received during each time slot.

82. Method claimed in claim 75 wherein the step of generating an analog information signal for each source digital signal further includes a step of simultaneously imputing two or more source digital signals, generating an analog information signal for each source digital signal, and combining the analog signals for a single information wave.

83. Method as claimed in claim 75 wherein each analog information wave generated has a positive segment and a negative segment and wherein the step of generating an analog information wave further includes generating a zero wave segment between the positive and negative segments of each information wave, and the step of extracting the fundamental frequency wave and the harmonics for each analog information wave received during its allocated time slot further includes making a zero correction of the zero wave segment, thereby interposing an interim zero correction on the extracted fundamental frequency and harmonics.

84. A method of digital information transfer comprising the steps of:

a) allocating one or more source digital signals to unique, repetitive time slots;

b) generating an analog information wave for each said source digital signal, each said information wave being synthesized by combining a fundamental frequency wave of a pre-selected wave form and a pre-selected number of harmonics of the fundamental frequency wave, the amplitude and phase of the fundamental frequency wave being fixed and the relative amplitudes of each of the harmonics of the synthesized wave in comparison to the magnitude of the fundamental frequency wave and the phases of each of the harmonics being a function of the magnitude of the corresponding source digital signal as measured during the allocated time slot for the signal;

c) transmitting each of the analog information waves within its allocated time slot;

d) receiving each of the analog information waves within its allocated time slot;

e) extracting the fundamental frequency wave and each of the harmonics of each analog information wave received during its allocated time slot; and f) generating an output digital signal for each information wave received during its allocated time slot, said output digital signal having a digital magnitude which is a function of the relative amplitudes of each of the extracted harmonics in comparison to the amplitude of the extracted fundamental frequency wave and of the phases of each of the extracted harmonics of the corresponding received information wave.

85. Method as claimed in claim 84 further comprising the steps of:

a) transmitting one or more additional harmonics as reference components with fixed reference amplitudes and phases; and b) calibrating the extracted fundamental frequency wave and extracted harmonics of each received information wave, by comparison of the amplitudes of the reference components as transmitted and the amplitudes of the reference components as received.

86. Method as claimed in claim 84 wherein the step of generating synchronizing waves generates synchronizing waves with a frequency which is distinct from the frequency of the information waves and generates a synchronizing wave in each time slot allocated for the information waves.

87. Method as claimed in claim 84 wherein the step of generating synchronizing waves generates synchronizing waves with a frequency which is distinct from the frequency of the information waves and generates a synchronizing wave in each time slot allocated for the information waves, the amplitude of said synchronizing wave being a function of an identifier for the synchronizing wave.

88. Method as claimed in claim 84 wherein the step of generating synchronizing waves generates synchronizing waves with a frequency which is distinct from the frequency of the information waves and generates a synchronizing wave in each time slot allocated for the information waves, and wherein the step of extracting the fundamental frequency wave and each of the harmonics of each analog information wave received during its allocated time slot includes calibrating each information wave received by comparison of the amplitude of the synchronization wave as received during the time slot for the information wave with the known amplitude of the synchronization wave as transmitted.

89. Method as claimed in claim 84 wherein the step of allocating one or more source digital signals to unique, repetitive time slots, includes allocating a plurality of source digital signals to each time slot, and wherein the step of generating an analog information wave for each said source digital signal includes generating an information wave with a distinct pre-selected frequency for each of the plurality of source digital signals allocated to each time slot, and wherein the step of transmitting each of the analog information waves within its allocated time slot includes transmitting the plurality of information waves allocated to each time slot at distinct frequencies, and wherein the step of receiving each of the analog information waves within its allocated time slot includes receiving the plurality of information waves allocated to each time slot at the pre-selected frequencies, and wherein the step of extracting the fundamental frequency wave and each of the harmonics of each analog information wave received during its allocated time slot includes extracting fundamental frequency waves and harmonics for each of the plurality of information waves received at the pre-selected frequencies, and wherein the step of generating an output digital signal for each information wave received during its allocated time slot includes generating an output digital signal for each of the plurality of information waves received during each time slot.

90. Method as claimed in claim 84 wherein each analog information wave generated has a positive segment and a negative segment and wherein the step of generating an analog information wave further includes generating a zero wave segment between the positive and negative segments of each information wave, and the step of extracting the fundamental frequency wave and the harmonics for each analog information wave received during its allocated time slot further includes making a zero correction of the zero wave segment, thereby interposing an interim zero correction on the extracted fundamental frequency and harmonics.

91. Method as claimed in claim 84 wherein the step of generating said analog information waves for said source digital signals and the step of transmitting the information waves within the allocated time slots are performed at a plurality of transmission locations.

92. Method as claimed in claim 84 wherein the step of receiving the information waves within the allocated time slots, the step of extracting the fundamental frequency wave and harmonics for the analog information waves received during the allocated time slots, and the step of generating output digital signals with digital magnitudes which are a function of the relative amplitudes of each of the extracted harmonics in comparison to the amplitude of the extracted fundamental frequency wave and of the phases of each of the extracted harmonics of the corresponding received information waves are performed at a plurality of receiving locations.

93. Method as claimed in claim 84 wherein the step of generating an analog information signal for each source digital signal further includes simultaneously imputing two or more source digital signals, generating an analog information signal for each source digital signal, and combining the analog signals for a single information wave.

94. An apparatus for digital information transfer comprising:

a) a synchronization wave generation circuit;

b) a circuit for allocating one or more source digital signals to unique time slots between successive synchronizing waves;

c) two or more digital to analog signal generators for simultaneously receiving two or more source digital signals which are allocated the same time slot, simultaneously generating an analog information signal for each of said two or more source digital signals;

d) a circuit for combining said analog information signals for a single combined analog information wave, which combined information wave is synthesized by combining a fundamental frequency wave of a pre-selected wave form and a pre-selected number of harmonics of the fundamental frequency wave, the amplitude and phase of the fundamental frequency wave and the amplitude and phase of each of the harmonics of the synthesized wave being a function of the magnitude of the corresponding source digital signal as measured during the allocated time slot for the signal;

e) one or more transmitters for transmitting each combined information wave within its allocated time slot;

f) one or more receivers for receiving the combined information wave within the allocated time slot for the source digital signals as referenced to successive synchronization waves;

g) one or more circuits for extracting the fundamental frequency wave and each of the harmonics of each analog information wave received during its allocated time slot;

h) one or more circuits for generating an output digital signal for each combined information wave received during its allocated time slot, said output digital signal having a digital magnitude which is a function of the amplitude and phase of the extracted fundamental frequency wave and the amplitude and phase of the extracted harmonics of the corresponding received combined information wave.

95. An apparatus as claimed in claim 94 further comprising:

a) circuits for transmitting one or more additional harmonics as reference components with fixed reference amplitudes and phases; and b) circuits for calibrating the extracted fundamental frequency wave and extracted harmonics of each received combined information wave, by comparison of the amplitudes of the reference components as transmitted and the amplitudes of the reference components as received.

96. An apparatus as claimed in claim 94 wherein the digital to analog signal generators for generating an analog combined information wave for each source digital signal within its allocated time slot and the transmitters for transmitting the combined information wave for each source digital signal within its allocated time slot are deployed at a plurality of transmission locations.

97. An apparatus as claimed in claim 94 wherein the receivers, the circuits for extracting the fundamental frequency wave and each of the harmonics of each analog information wave received during its allocated time slot, and the circuits for generating an output digital signal for each combined information wave received during its allocated time slot are deployed at a plurality of receiving locations.

98. An apparatus as claimed in claim 94 wherein the digital to analog signal generators generate a combined information wave for each said source digital signal with the amplitude and phase of the fundamental frequency wave being fixed and the relative amplitudes of each of the harmonics in comparison to the amplitude of the fundamental frequency wave and the phases of each of the harmonics being a function of the magnitude of the corresponding source digital signal as measured during the allocated time slot for the signal, and wherein the circuits for generating output digital signals generate output digital signals having magnitudes which are a function of the relative amplitudes of the extracted harmonics in comparison to the amplitude of the extracted fundamental frequency wave and of the phases of the extracted harmonics of the corresponding received information waves.

99. An apparatus as claimed in claim 94 wherein the circuit for generating synchronizing waves generates synchronizing waves with a frequency which is distinct from the frequency of the information waves and generates a synchronizing wave in each time slot allocated for the information waves.

100. An apparatus as claimed in claim 94 wherein the circuit for generating synchronizing waves generates synchronizing waves with a frequency which is distinct from the frequency of the information waves and generates a synchronizing wave in each time slot allocated for the information waves, the amplitude of said synchronization wave being a function of an identifier for the synchronization wave.

101. An apparatus as claimed in claim 94 wherein the circuit for generating synchronizing waves generates synchronizing waves with a frequency which is distinct from the frequency of the information waves and generates a synchronizing wave in each time slot allocated for the information waves, and wherein the circuits for extracting the fundamental frequency wave and each of the harmonics of each analog information wave received during its allocated time slot further provide for the calibration of each information wave received by comparison of the amplitude of the synchronizing wave as received during the time slot for the information wave with the known amplitude of the synchronizing wave as transmitted.

102. An apparatus as claimed in claim 94 wherein the circuit for allocating one or more source digital signals to unique time slots between successive synchronizing waves provides for the allocation of a plurality of source digital signals to each time slot, and wherein the analog signal generators for generating an analog information wave for each source digital signal generate an information wave with a distinct pre-selected frequency for each of the plurality of source digital signals allocated to each time slot, and wherein the transmitters for transmitting the information wave for each source digital signal within its allocated time slot transmit the plurality of information waves allocated to each time slot at distinct frequencies, and wherein the receivers for receiving the information wave for each source digital signal within the allocated time slot for the source digital signal as referenced to successive synchronization waves receive the plurality of information waves allocated to each time slot at the pre-selected frequencies, and wherein the circuits for extracting the fundamental frequency wave and each of the harmonics of each analog information wave received during its allocated time slot extract fundamental frequency waves and harmonics for each of the plurality of information waves received at the pre-selected frequencies, and wherein the circuits for generating an output digital signal for each information wave received during its allocated time slot generate an output digital signal for each of the plurality of information waves received during each time slot.

103. An apparatus as claimed in claim 94 wherein each analog information wave generated has a positive segment and a negative segment and wherein the circuit for combining said analog information signals for a single combined analog information wave further generates a zero wave segment between the positive and negative segments of each information wave, and the circuits for extracting the fundamental frequency wave and the harmonics for each analog information wave received during its allocated time slot further provides for a zero correction of the zero wave segment, thereby interposing an interim zero correction on the extracted fundamental frequency wave and harmonics.

104. An apparatus for receiving an analog signal comprised of a series of information waves, each information wave being received in an allocated time slot and each information wave being synthesized from a combination of a fundamental frequency wave and a finite number of harmonics of the fundamental frequency wave, and for separating the synthesized wave into its fundamental frequency wave and harmonics comprising:

a) a plurality of pre-amplifiers connected in parallel, each pre-amplifier providing a different level of pre-amplification for the information waves;

b) a plurality of signal power level detectors, each power level detector being connected in series with a pre-amplifier and receiving the pre-amplified information wave from the connected pre-amplifier, and each power level detector measuring the power level of the pre-amplified information wave it receives;

c) a timing control circuit which determines the time period during which each information wave will be admitted to the pre-amplifiers and determines which of the pre-amplified information wave signals from the power level detectors is of an appropriate power level for further processing;

d) an address storage circuit which provides time slot allocations to the timing control circuit;

e) a multiplex circuit which receives the pre-amplified information wave signals from each of the power level detectors and passes only one pre-amplified information wave signal during each allocated time slot;

f) a multi-level impulse filter comprising a plurality of filter circuits connected in parallel, one for the fundamental frequency and one for each of the frequencies of the harmonics of the synthesized information waves, each said filter circuit comprising (1) a plurality of signal delay circuits connected in parallel, (2) a plurality of delay signal switches, each said switch being connected in series with a signal delay circuit, and (3) a narrow bandpass filter connected to each of the delay signal switches;

g) a plurality of final switch circuits, each final switch circuit being connected in series with a filter circuit, said final switch circuits passing the pre-amplified, separated and filtered fundamental frequency wave and harmonics of each information wave received; and h) a timing circuit which establishes the proper timing of the impulse filter operations.

105. An apparatus as claimed in claim 104 further comprising a plurality of component power level detectors which determine the power level of the fundamental frequency wave and each of the harmonics of each received information wave.

106. An apparatus as claimed in claim 104 further comprising a sample hold and signal reconstruct circuit which re-synthesizes the received analog information wave from the separated and filtered fundamental frequency wave and harmonics.

107. An apparatus as claimed in claim 104 further comprising one or more analog to digital convertors for converting the separated and filtered fundamental frequency wave and harmonics of information waves received to digital.

108. An apparatus as claimed in claim 104 further comprising one or more analog to digital convertors for converting the separated and filtered fundamental frequency wave and harmonica of information waves received to digital and an output signal generator for generating an output digital signal with a magnitude which is a function of the amplitude and phase of the fundamental frequency wave and harmonics of the information wave.

109. An apparatus as claimed in claim 104 further comprising a calibration circuit for calibrating the fundamental frequency wave and harmonics by comparison of the amplitudes of one or more harmonics transmitted as reference components with a pre-set amplitude at transmission and the amplitudes of the reference components as received.

110. An apparatus as claimed in claim 104 further comprising one or more analog to digital convertors for converting the separated and filtered fundamental frequency wave and harmonics of information waves received to digital, an output signal generator for generating an output digital signal with a magnitude which is a function of the amplitude and phase of the fundamental frequency wave and harmonics of the information wave, and a buffer circuit for transmitting the output digital signal from selected time slots to the address storage circuit to update the time slot allocations.

111. An apparatus for receiving an analog signal comprised of a series of information waves, each information wave being received in an allocated time slot and each information wave being synthesized from a combination of a fundamental frequency wave and a finite number of harmonics of the fundamental frequency wave, and for separating the synthesized wave into its fundamental frequency wave and harmonics comprising:

a) a plurality of pre-amplifiers connected in parallel, each pre-amplifier providing a different level of pre-amplification for the information waves;

b) a plurality of signal power level detectors, each power level detector being connected in series with a pre-amplifier and receiving the pre-amplified information wave from the connected pre-amplifier, and each power level detector measuring the power level of the pre-amplified information wave it receives;

c) a timing control circuit which determines the time period during which each information wave will be admitted to the pre-amplifiers and determines which of the pre-amplified information wave signals from the power level detectors is of an appropriate power level for further processing;

d) an address storage circuit which provides time slot allocations to the timing control circuit;

e) a multiplex circuit which receives the pre-amplified information wave signals from each of the power level detectors and passes only one pre-amplified information wave signal during each allocated time slot;

f) a multi-level impulse filter circuit for separating the fundamental frequency wave and harmonics of the synthesized information waves, said filter circuit comprising (1) a plurality of signal delay circuits connected in parallel, (2) a plurality of delay signal switches, each said switch being connected in series with a signal delay circuit, and (3) a plurality of narrow bandpass filters connected in parallel to each other and connected together in series with each of the delay signal switches;

43 g) a plurality of final switch circuits, each final switch circuit being connected in series with a narrow bandpass filter, said final switch circuits passing the pre-amplified, separated and filtered fundamental frequency wave and harmonics of each information wave received; and h) a timing circuit which establishes the proper timing of the impulse filter operations.

112. An apparatus as claimed in claim 111 further comprising a plurality of component power level detectors which determine the power level of the fundamental frequency wave and each of the harmonics of each received information wave.

113. An apparatus as claimed in claim 111 further comprising a sample hold and signal reconstruct circuit which re-synthesizes the received analog information wave from the separated and filtered fundamental frequency wave and harmonics.

114. An apparatus as claimed in claim 111 further comprising one or more analog to digital convertors for converting the separated and filtered fundamental frequency wave and harmonics of information waves received to digital.

115. An apparatus as claimed in claim 111 further comprising one or more analog to digital convertors for converting the separated and filtered fundamental frequency wave and harmonics of information waves received to digital and an output signal generator for generating an output digital signal with a magnitude which is a function of the amplitude and phase of the fundamental frequency wave and harmonics of the information wave.

116. An apparatus as claimed in claim 111 further comprising a calibration circuit for calibrating the fundamental frequency wave and harmonics by comparison of the amplitudes of one or more harmonics transmitted as reference components with a pre-set amplitude at transmission and the amplitudes of the reference components as received.

117. An apparatus as claimed in claim 111 further comprising one or more analog to digital convertors for converting the separated and filtered fundamental frequency wave and harmonics of information waves received to digital, an output signal generator for generating an output digital signal with a magnitude which is a function of the amplitude and phase of the fundamental frequency wave and harmonics of the information wave, and a buffer circuit for transmitting the output digital signal from selected time slots to the address storage circuit to update the time slot allocations.

118. An apparatus for receiving an analog signal comprised of a series of information waves, each information wave being received in an allocated time slot and each information wave being synthesized from a combination of a fundamental frequency wave and a finite number of harmonics of the fundamental frequency wave, and for separating the synthesized wave into its fundamental frequency wave and harmonics comprising:

a) a plurality of pre-amplifiers connected in parallel, each pre-amplifier providing a different level of pre-amplification for the information waves;

b) a plurality of signal power level detectors, each power level detector being connected in series with a pre-amplifier and receiving the pre-amplified information wave from the connected pre-amplifier, and each power level detector measuring the power level of the pre-amplified information wave it receives;

c) a timing control circuit which determines the time period during which each information wave will be admitted to the pre-amplifiers and determines which of the pre-amplified information wave signals from the power level detectors is of an appropriate power level for further processing;

44 d) an address storage circuit which provides time slot allocations to the timing control circuit;

e) a multiplex circuit which receives the pre-amplified information wave signals from each of the power level detectors and passes only one pre-amplified information wave signal during each allocated time slot;

f) a multi-level impulse filter comprising a plurality of filter circuits connected in parallel, one for the fundamental frequency and one for each of the frequencies of the harmonics of the synthesized information waves, each said filter circuit comprising (1) a plurality of signal delay circuits connected in parallel, (2) a plurality of delay signal switches, each said switch being connected in series with a signal delay circuit, and (3) a narrow bandpass filter connected to each of the delay signal switches;

g) a plurality of final switch circuits, each final switch circuit being connected in series with a filter circuit, said final switch circuits passing the pre-amplified, separated and filtered fundamental frequency wave and harmonics of each information wave received;

h) a timing circuit which establishes the proper timing of the impulse filter operations;

i) a plurality of component power level detectors which determine the power level of the fundamental frequency wave and each of the harmonics of each received information wave;

j) one or more analog to digital convertors for converting the separated and filtered fundamental frequency wave and harmonics of information waves received to digital; and k) an output signal generator for generating an output digital signal with a magnitude which is a function of the amplitude and phase of the fundamental frequency wave and harmonics of the information wave.

119. An apparatus as claimed in claim 118 further comprising a sample hold and signal reconstruct circuit which re-synthesizes the received analog information wave from the separated and filtered fundamental frequency wave and harmonics.

120. An apparatus as claimed in claim 118 further comprising a buffer circuit for transmitting the output digital signal from selected time slots to the address storage circuit to update the time slot allocations.

121. An apparatus as claimed in claim 118 further comprising a calibration circuit for calibrating the fundamental frequency wave and harmonics by comparison of the amplitudes of one or more harmonics transmitted as reference components with a pre-set amplitude at transmission and the amplitudes of the reference components as received.

122. An apparatus for receiving an analog signal comprised of a series of information waves, each information wave being received in an allocated time slot and each information wave being synthesized from a combination of a fundamental frequency wave and a finite number of harmonics of the fundamental frequency wave, and for separating the synthesized wave into its fundamental frequency wave and harmonics comprising:

a) a plurality of pre-amplifiers connected in parallel, each pre-amplifier providing a different level of pre-amplification for the information waves;

b) a plurality of signal power level detectors, each power level detector being connected in series with a pre-amplifier and receiving the pre-amplified information wave from the connected pre-amplifier, and each power level detector measuring the power level of the pre-amplified information wave it receives;

c) a timing control circuit which determines the time period during which each information wave will be admitted to the pre-amplifiers and determines which of the pre-amplified information wave signals from the power level detectors is of an appropriate power level for further processing;

d) an address storage circuit which provides time slot allocations to the timing control circuit;

e) a multiplex circuit which receives the pre-amplified information wave signals from each of the power level detectors and passes only one pre-amplified information wave signal during each allocated time slot;

f) a multi-level impulse filter circuit for separating the fundamental frequency wave and harmonics of the synthesized information waves, said filter circuit comprising
   (1) a plurality of signal delay circuits connected in parallel,
   (2) a plurality of delay signal switches, each said switch being connected in series with a signal delay circuit, and
   (3) a plurality of narrow bandpass filters connected in parallel to each other and connected together in series with each of the delay signal switches;

g) a plurality of final switch circuits, each final switch circuit being connected in series with a narrow bandpass filter, said final switch circuits passing the pre-amplified, separated and filtered fundamental frequency wave and harmonics of each information wave received;

h) a timing circuit which establishes the proper timing of the impulse filter operations; and i) a plurality of component power level detectors which determine the power level of the fundamental frequency wave and each of the harmonics of each received information wave;

j) one or more analog to digital convertors for converting the separated and filtered fundamental frequency wave and harmonics of information waves received to digital; and k) an output signal generator for generating an output digital signal with a magnitude which is a function of the amplitude and phase of the fundamental frequency wave and harmonics of the information wave.

123. An apparatus as claimed in claim 122 further comprising a sample hold and signal reconstruct circuit which re-synthesizes the received analog information wave from the separated and filtered fundamental frequency wave and harmonics.

124. An apparatus as claimed in claim 122 further comprising a buffer circuit for transmitting the output digital signal from selected time slots to the address storage circuit to update the time slot allocations.

125. An apparatus as claimed in claim 122 further comprising a calibration circuit for calibrating the fundamental frequency wave and harmonics by comparison of the amplitudes of one or more harmonics transmitted as reference components with a pre-set amplitude at transmission and the amplitudes of the reference components as received.

126. An apparatus for receiving an analog signal comprised of a series of information waves, each information wave being received in an allocated time slot and each information wave being synthesized from a combination of a fundamental frequency wave and a finite number of harmonics of the fundamental frequency wave, and for separating the synthesized wave into its fundamental frequency wave and harmonics comprising:

a) a plurality of pre-amplifiers connected in parallel, each pre-amplifier providing a different level of pre-amplification for the information waves;

b) a plurality of signal power level detectors, each power level detector being connected in series with a pre-amplifier and receiving the pre-amplified information wave from the connected pre-amplifier, and each power level detector measuring the power level of the pre-amplified information wave it receives;

c) a timing control circuit which determines the time period during which each information wave will be admitted to the pre-amplifiers and determines which of the pre-amplified information wave signals from the power level detectors is of an appropriate power level for further processing;

d) an address storage circuit which provides time slot allocations to the timing control circuit;

e) a multiplex circuit which receives the pre-amplified information wave signals from each of the power level detectors and passes only one pre-amplified information wave signal during each allocated time slot;

f) a multi-level impulse filter comprising a plurality of filter circuits connected in parallel, one for the fundamental frequency and one for each of the frequencies of the harmonics of the synthesized information waves, each said filter circuit comprising
   (1) a plurality of signal delay circuits connected in parallel,
   (2) a plurality of delay signal switches, each said switch being connected in series with a signal delay circuit, and
   (3) a narrow bandpass filter connected to each of the delay signal switches;

g) a plurality of final switch circuits, each final switch circuit being connected in series with a filter circuit, said final switch circuits passing the pre-amplified, separated and filtered fundamental frequency wave and harmonics of each information wave received;

h) a timing circuit which establishes the proper timing of the impulse filter operations;

i) a sample hold and signal reconstruct circuit which re-synthesizes the received analog information wave from the separated and filtered fundamental frequency wave and harmonics;

j) a plurality of positive peak detectors which determine the maximum positive amplitude of the fundamental frequency wave and each harmonic of the re-synthesized information wave;

k) a plurality of negative peak detectors which determine the maximum negative amplitude of the fundamental frequency wave and each harmonic of the re-synthesized information wave, the negative peak detector being connected in parallel with the positive peak detectors;

l) a plurality of analog to digital convertors for converting the peak positive and peak negative amplitudes to digital; and m) an output signal generator for generating an output digital signal based upon the digital values of the positive and negative peaks.

127. An apparatus as claimed in claim 126 further comprising a buffer circuit for transmitting the output digital signal from selected time slots to the address storage circuit to update the time slot allocations.

128. An apparatus as claimed in claim 126 further comprising a calibration circuit for calibrating the fundamental frequency wave and harmonics by comparison of the amplitudes of one or more harmonics transmitted as reference components with a pre-set amplitude at transmission and the amplitudes of the reference components as received.

129. An apparatus for separating an analog information wave synthesized from a combination of a fundamental frequency wave and a finite number of harmonics of the fundamental frequency wave into its fundamental frequency wave and harmonics comprising:

a) a multi-level impulse filter comprising a plurality of filter circuits connected in parallel, one for the fundamental frequency and one for each of the frequencies of the harmonics of the synthesized information waves, each said filter circuit comprising
   (1) a plurality of signal delay circuits connected in parallel,
   (2) a plurality of delay signal switches, each said switch being connected in series with a signal delay circuit, and
   (3) a narrow bandpass filter connected to each of the delay signal switches; and
b) a plurality of final switch circuits, each final switch circuit being connected in series with a filter circuit.

130. An apparatus for separating an analog information wave synthesized from a combination of a fundamental frequency wave and a finite number of harmonics of the fundamental frequency wave into its fundamental frequency wave and harmonics comprising:

a) a multi-level impulse filter circuit comprising
   (1) a plurality of signal delay circuits connected in parallel,
   (2) a plurality of delay signal switches, each said switch being connected in series with a signal delay circuit, and
   (3) a plurality of narrow bandpass filters connected in parallel to each other and connected together in series with each of the delay signal switches; and
b) a plurality of final switch circuits, each final switch circuit being connected in series with a narrow bandpass filter.

131. An apparatus for digital information transfer comprising:

a) means for generating repetitive synchronizing waves of a pre-set wave form and frequency;
b) means for allocating one or more source digital signals to unique repetitive time slots, a synchronizing wave being generated in each time slot, the time slot allocated to each source digital signal being cycled at a selected frequency;
c) means for generating an analog information wave for each said source digital signal, each said information wave being of a pre-selected wave form and frequency, said information wave frequency being distinct from the frequency of the synchronizing waves, and the amplitude of each information wave being a function of the magnitude of the corresponding source digital signal as measured during the allocated time slot for the signal;
d) means for transmitting each analog information wave and each corresponding synchronizing wave within the time slot allocated to them;
e) means for receiving each analog information wave and each corresponding synchronizing wave within the time slot allocated to them;
f) means for determining the amplitudes of each analog information wave and each corresponding synchronizing wave received during the time slot allocated to them;
g) means for generating an output digital signal for each information wave received during its allocated time slot, said output digital signal having a digital magnitude which is a function of the amplitude of the corresponding received information wave; and
h) means for calibrating each output digital signal by comparison of the amplitude of the corresponding synchronizing wave as received with its known amplitude as transmitted.

132. An apparatus as claimed in claim 131 wherein the means for allocating one or more source digital signals to unique, repetitive time slots, includes a means for allocating a plurality of source digital signals to each time slot, and wherein the means for generating an analog information wave for each said source digital signal includes a means for generating an information wave with a distinct pre-selected frequency for each of the plurality of source digital signals allocated to each time slot, and wherein the means for transmitting each of the analog information waves within its allocated time slot includes a means for transmitting the plurality of information waves allocated to each time slot at pre-selected and distinct frequencies, and wherein the means for receiving each of the analog information waves within its allocated time slot includes a means for receiving the plurality of information waves allocated to each time slot at the pre-selected frequencies, and wherein the means for determining the amplitude of each analog information wave and each corresponding synchronizing wave received during their allocated time slot includes a means for determining the amplitudes of the plurality of information waves received at the pre-selected frequencies, and wherein the means for generating an output digital signal for each information wave received during its allocated time slot includes a means for generating an output digital signal for each of the plurality of information waves received during each time slot, and wherein the means for calibrating each output digital signal includes a means for calibrating each of the output digital signals for the plurality of information waves received by comparison of the amplitude of the corresponding synchronizing wave as received with its known amplitude as transmitted.

133. An apparatus as claimed in claim 131 wherein the means for allocating one or more source digital signals to unique repetitive time slots, the means for generating an analog information wave for each said source digital signal, and the means for transmitting each analog information wave and each corresponding synchronizing wave within the time slot allocated to them are deployed at a plurality of transmission locations.

134. An apparatus as claimed in claim 131 wherein the means for receiving each analog information wave and each corresponding synchronizing wave within the time slot allocated to them, the means for determining the amplitudes of each analog information wave and each corresponding synchronizing wave received during the time slot allocated to them, the means for generating an output digital signal for each information wave received during its allocated time slot, and the means for calibrating each output digital signal by comparison of the amplitude of the corresponding synchronizing wave as received with its known amplitude as transmitted are deployed at a plurality of receiving locations.

135. An apparatus for digital information transfer comprising:
- a) means for generating repetitive synchronizing waves of a pre-set wave form and frequency;
- b) means for transmitting the synchronizing waves to one or more remote transmission locations;
- c) means for receiving the synchronizing waves at each of the remote transmission locations;
- d) means for allocating one or more source digital signals to unique repetitive time slots, a synchronizing wave being generated in each time slot, the time slot allocated to each source digital signal being cycled at a selected frequency;
- e) means for generating an analog information wave for each said source digital signal, each said information wave being of a pre-selected wave form and frequency, said information wave frequency being distinct from the frequency of the synchronizing waves, and the amplitude of each information wave being a function of the magnitude of the corresponding source digital signal as measured during the allocated time slot for the signal;
- f) means for transmitting each analog information wave and each corresponding synchronizing wave within the time slot allocated to them;
- g) means for receiving at one or more receiving locations each analog information wave and each corresponding synchronizing wave within the time slot allocated to them;
- h) means for determining the amplitudes of each analog information wave and each corresponding synchronizing wave received during the time slot allocated to them;
- i) means for generating an output digital signal for each information wave received during its allocated time slot, said output digital signal having a digital magnitude which is a function of the amplitude of the corresponding received information wave; and
- j) means for calibrating each output digital signal by comparison of the amplitude of the corresponding synchronizing wave as received with its known amplitude as transmitted.

136. An apparatus as claimed in claim 135 wherein the means for allocating one or more source digital signals to unique, repetitive time slots, includes a means for allocating a plurality of source digital signals to each time slot, and wherein the means for generating an analog information wave for each said source digital signal includes a means for generating an information wave with a distinct pre-selected frequency for each of the plurality of source digital signals allocated to each time slot, and wherein the means for transmitting each of the analog information waves within its allocated time slot includes a means for transmitting the plurality of information waves allocated to each time slot at pre-selected and distinct frequencies, and wherein the means for receiving each of the analog information waves within its allocated time slot includes a means for receiving the plurality of information waves allocated to each time slot at the pre-selected frequencies, and wherein the means for determining the amplitude of each analog information wave and each corresponding synchronizing wave received during their allocated time slot includes a means for determining the amplitudes of the plurality of information waves received at the pre-selected frequencies, and wherein the means for generating an output digital signal for each information wave received during its allocated time slot includes a means for generating an output digital signal for each of the plurality of information waves received during each time slot, and wherein the means for calibrating each output digital signal includes a means for calibrating each of the output digital signals for the plurality of information waves received by comparison of the amplitude of the corresponding synchronizing wave as received with its known amplitude as transmitted.

137. An apparatus for digital information transfer comprising:
- a) means for generating repetitive synchronizing waves of a pre-set wave form and frequency;
- b) means for allocating one or more source digital signals to unique repetitive time slots, a synchronizing wave being generated in each time slot, the time slot allocated to each source digital signal being cycled at a selected frequency;
- c) means for generating an analog information wave for each said source digital signal, each said information wave being of a pre-selected wave form and frequency, said information wave frequency being distinct from the frequency of the synchronizing waves, and the ratio of the amplitude of each information wave to the amplitude of the synchronizing wave being a function of the magnitude of the corresponding source digital signal as measured during the allocated time slot for the signal;
- d) means for transmitting each analog information wave and each corresponding synchronizing wave within the time slot allocated to them;
- e) means for receiving each analog information wave and each corresponding synchronizing wave within the time slot allocated to them;
- f) means for determining the amplitudes of each analog information wave and each corresponding synchronizing wave received during the time slot allocated to them; and
- g) means for generating an output digital signal for each information wave received during its allocated time slot, said output digital signal having a digital magnitude which is a function of the ratio of the amplitude of the corresponding received information wave to the amplitude of the synchronizing wave.

138. An apparatus as claimed in claim 137 wherein the means for allocating one or more source digital signals to unique, repetitive time slots, includes a means for allocating a plurality of source digital signals to each time slot, and wherein the means for generating an analog information wave for each said source digital signal includes a means for generating an information wave with a distinct pre-selected frequency for each of the plurality of source digital signals allocated to each time slot, and wherein the means for transmitting each of the analog information waves within its allocated time slot includes a means for transmitting the plurality of information waves allocated to each time slot at pre-selected and distinct frequencies, and wherein the means for receiving each of the analog information waves within its allocated time slot includes a means for receiving the plurality of information waves allocated to each time slot at the pre-selected frequencies, and wherein the means for determining the amplitude of each analog information wave and each corresponding synchronizing wave received during their allocated time slot includes a means for determining the amplitudes of the plurality of information waves received at the pre-selected frequencies, and wherein the means for generating an output digital signal for each information wave received during its allocated time slot includes a means for generating an output digital signal for each of the plurality of information waves received during each time slot.

139. An apparatus as claimed in claim 137 wherein the means for allocating one or more source digital signals to unique repetitive time slots, the means for generating an analog information wave for each said source digital signal, and the means for transmitting each analog information wave and each corresponding synchronizing wave within the time slot allocated to them are deployed at a plurality of transmission locations.

140. An apparatus as claimed in claim 137 wherein the means for receiving each analog information wave and each corresponding synchronizing wave within the time slot allocated to them, the means for determining the amplitudes of each analog information wave and each corresponding synchronizing wave received during the time slot allocated to them, and the means for generating an output digital signal for each information wave received during its allocated time slot are deployed at a plurality of receiving locations.

141. An apparatus for digital information transfer comprising:
 a) means for generating repetitive synchronizing waves of a pre-set wave form and frequency;
 b) means for transmitting the synchronizing waves to one or more remote transmission locations;
 c) means for receiving the synchronizing waves at each of the remote transmission locations;
 d) means for allocating one or more source digital signals to unique repetitive time slots, a synchronizing wave being generated in each time slot, the time slot allocated to each source digital signal being cycled at a selected frequency;
 e) means for generating an analog information wave for each said source digital signal, each said information wave being of a pre-selected wave form and frequency, said information wave frequency being distinct from the frequency of the synchronizing waves, and the ratio of the amplitude of each information wave to the amplitude of the synchronizing wave being a function of the magnitude of the corresponding source digital signal as measured during the allocated time slot for the signal;
 f) means for transmitting each analog information wave and each corresponding synchronizing wave within the time slot allocated to them;
 g) means for receiving at one or more receiving locations each analog information wave and each corresponding synchronizing wave within the time slot allocated to them;
 h) means for determining the amplitudes of each analog information wave and each corresponding synchronizing wave received during the time slot allocated to them; and
 i) means for generating an output digital signal for each information wave received during its allocated time slot, said output digital signal having a digital magnitude which is a function of the ratio of the amplitude of the corresponding received information wave to the amplitude of the received synchronizing wave.

142. An apparatus as claimed in claim 141 wherein the means for allocating one or more source digital signals to unique, repetitive time slots, includes a means for allocating a plurality of source digital signals to each time slot, and wherein the means for generating an analog information wave for each said source digital signal includes a means for generating an information wave with a distinct pre-selected frequency for each of the plurality of source digital signals allocated to each time slot, and wherein the means for transmitting each of the analog information waves within its allocated time slot includes a means for transmitting the plurality of information waves allocated to each time slot at pre-selected and distinct frequencies, and wherein the means for receiving each of the analog information waves within its allocated time slot includes a means for receiving the plurality of information waves allocated to each time slot at the pre-selected frequencies, and wherein the means for determining the amplitude of each analog information wave and each corresponding synchronizing wave received during their allocated time slot includes a means for determining the amplitudes of the plurality of information waves received at the pre-selected frequencies, and wherein the means for generating an output digital signal for each information wave received during its allocated time slot includes a means for generating an output digital signal for each of the plurality of information waves received during each time slot.

143. An apparatus for digital information transfer comprising:
 a) means for generating repetitive synchronizing waves of a pre-set wave form and frequency;
 b) means for allocating a plurality of source digital signals to unique repetitive time slots with a plurality of source digital signals being allocated to each time slot, a synchronizing wave being generated in each time slot, and the allocated time slots being cycled at a selected frequency;
 c) means for generating an analog information wave for each of the plurality of source digital signals in each allocated time slot, the information waves for each of the plurality of source digital signals within each time slot being of pre-selected wave forms and distinct frequencies, each of the information wave frequencies also being distinct from the frequency of the synchronizing waves, and the amplitude of each information wave being a function of the magnitude of the corresponding source digital signal as measured during the allocated time slot for the signal;
 d) means for transmitting each of the plurality of analog information waves at its pre-selected frequency and each corresponding synchronizing wave within the time slot allocated to them;
 e) means for receiving each of the plurality of analog information waves at its pre-selected frequency and each corresponding synchronizing wave within the time slot allocated to them;
 f) means for determining the amplitudes of each of the plurality of analog information waves at its pre-selected frequency and each corresponding synchronizing wave received during the time slot allocated to them;
 g) means for generating an output digital signal for each of the plurality of information waves received during each allocated time slot, each said output digital signal having a digital magnitude which is a function of the amplitude of the corresponding received information wave; and
 h) means for calibrating each of the plurality of output digital signals generated in each time slot by comparison of the amplitude of the corresponding synchronizing wave as received in said time slot with its known amplitude as transmitted.

144. An apparatus as claimed in claim 143 wherein the means for allocating a plurality of source digital signals to unique repetitive time slots, the means for generating an analog information wave for each of the plurality of source digital signals in each allocated time slot, and the means for transmitting each of the plurality of analog information waves at its pre-selected frequency and each corresponding synchronizing wave within the time slot allocated to them are deployed at a plurality of transmission locations.

145. An apparatus as claimed in claim 143 wherein the means for receiving each of the plurality of analog information waves at its pre-selected frequency and each corresponding synchronizing wave within the time slot allocated to them, the means for determining the amplitudes of each of the plurality of analog information waves at its pre-selected frequency and each corresponding synchronizing wave received during the time slot allocated to them, the means for generating an output digital signal for each of the plurality of information waves received during each allocated time slot, and the means for calibrating each of the plurality of output digital signals are deployed at a plurality of receiving locations.

146. An apparatus for digital information transfer comprising:
a) means for transmitting generating repetitive synchronizing waves of a pre-set wave form and frequency;
b) means for transmitting the synchronizing waves to one or more remote transmission locations;
c) means for receiving the synchronizing waves at each of the remote transmission locations;
d) means for allocating a plurality of source digital signals to unique repetitive time slots with a plurality of source digital signals being allocated to each time slot, a synchronizing wave being generated in each time slot, and the allocated time slots being cycled at a selected frequency;
e) means for generating an analog information wave for each of the plurality of source digital signals in each allocated time slot, the information waves for each of the plurality of source digital signals within each time slot being of pre-selected wave forms and distinct frequencies, each of the information wave frequencies also being distinct from the frequency of the synchronizing waves, and the amplitude of each information wave being a function of the magnitude of the corresponding source digital signal as measured during the allocated time slot for the signal;
f) means for transmitting each of the plurality of analog information waves at its pre-selected frequency and each corresponding synchronizing wave within the time slot allocated to them;
g) means for receiving at one or more locations each of the plurality of analog information waves at its pre-selected frequency and each corresponding synchronizing wave within the time slot allocated to them;
h) means for determining the amplitudes of each of the plurality of analog information waves at its pre-selected frequency and each corresponding synchronizing wave received during the time slot allocated to them;
i) means for generating an output digital signal for each of the plurality of information waves received during each allocated time slot, each said output digital signal having a digital magnitude which is a function of the amplitude of the corresponding received information wave; and
j) means for calibrating each of the plurality of output digital signals generated in each time slot by comparison of the amplitude of the corresponding synchronizing wave as received in said time slot with its known amplitude as transmitted.

147. An apparatus for digital information transfer comprising:
a) means for generating repetitive synchronizing waves of a pre-set wave form and frequency;
b) means for allocating a plurality of source digital signals to unique repetitive time slots with a plurality of source digital signals being allocated to each time slot, a synchronizing wave being generated in each time slot, and the allocated time slots being cycled at a selected frequency;
c) means for generating an analog information wave for each of the plurality of source digital signals in each allocated time slot, the information waves for each of the plurality of source digital signals within each time slot being of pre-selected wave forms and distinct frequencies, each of the information wave frequencies also being distinct from the frequency of the synchronizing waves, and the ratio of the amplitude of each information wave to the amplitude of the corresponding synchronizing wave being a function of the magnitude of the corresponding source digital signal as measured during the allocated time slot for the signal;
d) means for transmitting each of the plurality of analog information waves at its pre-selected frequency and each corresponding synchronizing wave within the time slot allocated to them;
e) means for receiving each of the plurality of analog information waves at its pre-selected frequency and each corresponding synchronizing wave within the time slot allocated to them;
f) means for determining the amplitudes of each of the plurality of analog information waves at its pre-selected frequency and each corresponding synchronizing wave received during the time slot allocated to them; and
g) means for generating an output digital signal for each of the plurality of information waves received during each allocated time slot, each said output digital signal having a digital magnitude which is a function of the ratio of the amplitude of the corresponding received information wave to the amplitude of the received synchronizing wave.

148. An apparatus as claimed in claim 147 wherein the means for allocating a plurality of source digital signals to unique repetitive time slots, the means for generating an analog information wave for each of the plurality of source digital signals in each allocated time slot, and the means for transmitting each of the plurality of analog information waves at its pre-selected frequency and each corresponding synchronizing wave within the time slot allocated to them are deployed at a plurality of transmission locations.

149. An apparatus as claimed in claim 147 wherein the means for receiving each of the plurality of analog information waves at its pre-selected frequency and each corresponding synchronizing wave within the time slot allocated to them, the means for determining the amplitudes of each of the plurality of analog information waves at its pre-selected frequency and each corresponding synchronizing wave received during the time slot allocated to them, and the means for generating an output digital signal for each of the plurality of information waves received during each allocated time slot are deployed at a plurality of receiving locations.

150. An apparatus for digital information transfer comprising:

a) means for generating repetitive synchronizing waves of a pre-set wave form and frequency;

b) means for transmitting the synchronizing waves to one or more remote transmission locations;

c) means for receiving the synchronizing waves at each of the remote transmission locations;

d) means for allocating a plurality of source digital signals to unique repetitive time slots with a plurality of source digital signals being allocated to each time slot, a synchronizing wave being generated in each time slot, and the allocated time slots being cycled at a selected frequency;

e) means for generating an analog information wave for each of the plurality of source digital signals in each allocated time slot, the information waves for each of the plurality of source digital signals within each time slot being of pre-selected wave forms and distinct frequencies, each of the information wave frequencies also being distinct from the frequency of the synchronizing waves, and the ratio of the amplitude of each information wave to the amplitude of the corresponding synchronizing wave being a function of the magnitude of the corresponding source digital signal as measured during the allocated time slot for the signal;

f) means for transmitting each of the plurality of analog information waves at its pre-selected frequency and each corresponding synchronizing wave within the time slot allocated to them;

g) means for receiving at one or more locations each of the plurality of analog information waves at its pre-selected frequency and each corresponding synchronizing wave within the time slot allocated to them;

h) means for determining the amplitudes of each of the plurality of analog information waves at its pre-selected frequency and each corresponding synchronizing wave received during the time slot allocated to them; and i) means for generating an output digital signal for each of the plurality of information waves received during each allocated time slot, each said output digital signal having a digital magnitude which is a function of the ratio of the amplitude of the corresponding received information wave to the amplitude of the received synchronizing wave.

151. A method of digital information transfer comprising the steps of:

a) generating repetitive synchronizing waves of a pre-set wave form and frequency;

b) allocating one or more source digital signals to unique repetitive time slots, a synchronizing wave being generated in each time slot, the time slot allocated to each source digital signal being cycled at a selected frequency;

c) generating an analog information wave for each said source digital signal, each said information wave being of a pre-selected wave form and frequency, said information wave frequency being distinct from the frequency of the synchronizing waves, and the amplitude of each information wave being a function of the magnitude of the corresponding source digital signal as measured during the allocated time slot for the signal;

d) transmitting each analog information wave and each corresponding synchronizing wave within the time slot allocated to them;

e) receiving each analog information wave and each corresponding synchronizing wave within the time slot allocated to them;

f) determining the amplitudes of each analog information wave and each corresponding synchronizing wave received during the time slot allocated to them;

g) generating an output digital signal for each information wave received during its allocated time slot, said output digital signal having a digital magnitude which is a function of the amplitude of the corresponding received information wave; and h) calibrating each output digital signal by comparison of the amplitude of the corresponding synchronizing wave as received with its known amplitude as transmitted.

152. Method as claimed in claim 151 wherein the step of allocating one or more source digital signals to unique repetitive time slots further includes allocating a plurality of source digital signals to each time slot, and wherein the step of generating an analog information wave for each said source digital signal further includes generating an information wave with a distinct pre-selected frequency for each of the plurality of source digital signals allocated to each time slot, and wherein the step of transmitting each of the analog information waves within its allocated time slot further includes transmitting the plurality of information waves allocated to each time slot at pre-selected and distinct frequencies, and wherein the step of receiving each of the analog information waves within its allocated time slot further includes receiving the plurality of information waves allocated to each time slot at the pre-selected frequencies, and wherein the step of determining the amplitude of each analog information wave and each corresponding synchronizing wave received during their allocated time slot further includes determining the amplitudes of the plurality of information waves received at the pre-selected frequencies, and wherein the step of generating an output digital signal for each information wave received during its allocated time slot further includes generating an output digital signal for each of the plurality of information waves received during each time slot, and wherein the step of calibrating each output digital signal further includes calibrating each of the output digital signals for the plurality of information waves received by comparison of the amplitude of the corresponding synchronizing wave as received with its known amplitude as transmitted.

153. Method as claimed in claim 151 wherein the step of allocating one or more source digital signals to unique repetitive time slots, the step of generating an analog information wave for each said source digital signal, and the step of transmitting each analog information wave and each corresponding synchronizing wave within the time slot allocated to them are performed at a plurality of transmission locations.

154. Method as claimed in claim 151 wherein the step of receiving each analog information wave and each corresponding synchronizing wave within the time slot allocated to them, the step of determining the amplitudes of each analog information wave and each corresponding synchronizing wave received during the time slot allocated to them, the step of generating an output digital signal for each information wave received during its allocated time slot, and the step of calibrating each output digital signal by comparison of the amplitude of the corresponding synchronizing wave as received with its known amplitude as transmitted are performed at a plurality of receiving locations.

155. A method of digital information transfer comprising the steps of:

a) generating repetitive synchronizing waves of a pre-set wave form and frequency;

b) transmitting the synchronizing waves to one or more remote transmission locations;

c) receiving the synchronizing waves at each of the remote transmission locations;

d) allocating one or more source digital signals to unique repetitive time slots, a synchronizing wave being generated in each time slot, the time slot allocated to each source digital signal being cycled at a selected frequency;

e) generating an analog information wave for each said source digital signal, each said information wave being of a pre-selected wave form and frequency, said information wave frequency being distinct from the frequency of the synchronizing waves, and the amplitude of each information wave being a function of the magnitude of the corresponding source digital signal as measured during the allocated time slot for the signal;

f) transmitting each analog information wave and each corresponding synchronizing wave within the time slot allocated to them;

g) receiving at one or more receiving locations each analog information wave and each corresponding synchronizing wave within the time slot allocated to them;

h) determining the amplitudes of each analog information wave and each corresponding synchronizing wave received during the time slot allocated to them;

i) generating an output digital signal for each information wave received during its allocated time slot, said output digital signal having a digital magnitude which is a function of the amplitude of the corresponding received information wave; and j) calibrating each output digital signal by comparison of the amplitude of the corresponding synchronizing wave as received with its known amplitude as transmitted.

156. Method as claimed in claim 155 wherein the step of allocating one or more source digital signals to unique repetitive time slots further includes allocating a plurality of source digital signals to each time slot, and wherein the step of generating an analog information wave for each said source digital signal further includes generating an information wave with a distinct pre-selected frequency for each of the plurality of source digital signals allocated to each time slot, and wherein the step of transmitting each of the analog information waves within its allocated time slot further includes transmitting the plurality of information waves allocated to each time slot at pre-selected and distinct frequencies, and wherein the step of receiving each of the analog information waves within its allocated time slot further includes receiving the plurality of information waves allocated to each time slot at the pre-selected frequencies, and wherein the step of determining the amplitude of each analog information wave and each corresponding synchronizing wave received during their allocated time slot further includes determining the amplitudes of the plurality of information waves received at the pre-selected frequencies, and wherein the step of generating an output digital signal for each information wave received during its allocated time slot further includes generating an output digital signal for each of the plurality of information waves received during each time slot, and wherein the step of calibrating each output digital signal further includes calibrating each of the output digital signals for the plurality of information waves received by comparison of the amplitude of the corresponding synchronizing wave as received with its known amplitude as transmitted.

157. A method of digital information transfer comprising the steps of:

a) generating repetitive synchronizing waves of a pre-set wave form and frequency;

b) allocating one or more source digital signals to unique repetitive time slots, a synchronizing wave being generated in each time slot, the time slot allocated to each source digital signal being cycled at a selected frequency;

c) generating an analog information wave for each said source digital signal, each said information wave being of a pre-selected wave form and frequency, said information wave frequency being distinct from the frequency of the synchronizing waves, and the ratio of the amplitude of each information wave to the amplitude of the synchronizing wave being a function of the magnitude of the corresponding source digital signal as measured during the allocated time slot for the signal;

d) transmitting each analog information wave and each corresponding synchronizing wave within the time slot allocated to them;

e) receiving each analog information wave and each corresponding synchronizing wave within the time slot allocated to them;

f) determining the amplitudes of each analog information wave and each corresponding synchronizing wave received during the time slot allocated to them; and g) generating an output digital signal for each information wave received during its allocated time slot, said output digital signal having a digital magnitude which is a function of the ratio of the amplitude of the corresponding received information wave to the amplitude of the synchronizing wave.

158. Method as claimed in claim 157 wherein the step of allocating one or more source digital signals to unique repetitive time slots further includes allocating a plurality of source digital signals to each time slot, and wherein the step of generating an analog information wave for each said source digital signal further includes a means of generating an information wave with a distinct pre-selected frequency for each of the plurality of source digital signals allocated to each time slot, and wherein the step of transmitting each of the analog information waves within its allocated time slot further includes transmitting the plurality of information waves allocated to each time slot at pre-selected and distinct frequencies, and wherein the step of receiving each of the analog information waves within its allocated time slot further includes receiving the plurality of information waves allocated to each time slot at the pre-selected frequencies, and wherein the step of determining the amplitude of each analog information wave and each corresponding synchronizing wave received during their allocated time slot further includes determining the amplitudes of the plurality of information waves received at the pre-selected frequencies, and wherein the step of generating an output digital signal for each information wave received during its allocated time slot further includes generating an output digital signal for each of the plurality of information waves received during each time slot.

159. Method as claimed in claim 157 wherein the step of allocating one or more source digital signals to unique repetitive time slots, the step of generating an analog information wave for each said source digital signal, and the step of transmitting each analog information wave and each corresponding synchronizing wave within the time slot allocated to them are performed at a plurality of transmission locations.

160. Method as claimed in claim 157 wherein the step of receiving each analog information wave and each corresponding synchronizing wave within the time slot allocated to them, the step of determining the amplitudes of each analog information wave and each corresponding synchronizing wave received during the time slot allocated to them, and the step of generating an output digital signal for each information wave received during its allocated time slot are performed at a plurality of receiving locations.

161. A method of digital information transfer comprising the steps of:
  a) generating repetitive synchronizing waves of a pre-set wave form and frequency;
  b) transmitting the synchronizing waves to one or more remote transmission locations;
  c) receiving the synchronizing waves at each of the remote transmission locations;
  d) allocating one or more source digital signals to unique repetitive time slots, a synchronizing wave being generated in each time slot, the time slot allocated to each source digital signal being cycled at a selected frequency;
  e) generating an analog information wave for each said source digital signal, each said information wave being of a pre-selected wave form and frequency, said information wave frequency being distinct from the frequency of the synchronizing waves, and the ratio of the amplitude of each information wave to the amplitude of the synchronizing wave being a function of the magnitude of the corresponding source digital signal as measured during the allocated time slot for the signal;
  f) transmitting each analog information wave and each corresponding synchronizing wave within the time slot allocated to them;
  g) receiving at one or more receiving locations each analog information wave and each corresponding synchronizing wave within the time slot allocated to them;
  h) determining the amplitudes of each analog information wave and each corresponding synchronizing wave received during the time slot allocated to them; and
  i) generating an output digital signal for each information wave received during its allocated time slot, said output digital signal having a digital magnitude which is a function of the ratio of the amplitude of the corresponding received information wave to the amplitude of the received synchronizing wave.

162. Method as claimed in claim 161 wherein the step of allocating one or more source digital signals to unique repetitive time slots further includes allocating a plurality of source digital signals to each time slot, and wherein the step of generating an analog information wave for each said source digital signal further includes generating an information wave with a distinct pre-selected frequency for each of the plurality of source digital signals allocated to each time slot, and wherein the step of transmitting each of the analog information waves within its allocated time slot further includes transmitting the plurality of information waves allocated to each time slot at pre-selected and distinct frequencies, and wherein the step of receiving each of the analog information waves within its allocated time slot further includes receiving the plurality of information waves allocated to each time slot at the pre-selected frequencies, and wherein the step of determining the amplitude of each analog information wave and each corresponding synchronizing wave received during their allocated time slot further includes determining the amplitudes of the plurality of information waves received at the pre-selected frequencies, and wherein the step of generating an output digital signal for each information wave received during its allocated time slot further includes generating an output digital signal for each of the plurality of information waves received during each time slot.

163. A method of digital information transfer comprising the steps of:
  a) generating repetitive synchronizing waves of a pre-set wave form and frequency;
  b) allocating a plurality of source digital signals to unique repetitive time slots with a plurality of source digital signals being allocated to each time slot, a synchronizing wave being generated in each time slot, and the allocated time slots being cycled at a selected frequency;
  c) generating an analog information wave for each of the plurality of source digital signals in each allocated time slot, the information waves for each of the plurality of source digital signals within each time slot being of pre-selected wave forms and distinct frequencies, each of the information wave frequencies also being distinct from the frequency of the synchronizing waves, and the amplitude of each information wave being a function of the magnitude of the corresponding source digital signal as measured during the allocated time slot for the signal;
  d) transmitting each of the plurality of analog information waves at its pre-selected frequency and each corresponding synchronizing wave within the time slot allocated to them;
  e) receiving each of the plurality of analog information waves at its pre-selected frequency and each corresponding synchronizing wave within the time slot allocated to them;
  f) determining the amplitudes of each of the plurality of analog information waves at its pre-selected frequency and each corresponding synchronizing wave received during the time slot allocated to them;
  g) generating an output digital signal for each of the plurality of information waves received during each allocated time slot, each said output digital signal having a digital magnitude which is a function of the amplitude of the corresponding received information wave; and
  h) calibrating each of the plurality of output digital signals generated in each time slot by comparison of the amplitude of the corresponding synchronizing wave as received in said time slot with its known amplitude as transmitted.

164. Method as claimed in claim 163 wherein the step of allocating a plurality of source digital signals to unique repetitive time slots, the step of generating an analog information wave for each of the plurality of source digital signals in each allocated time slot, and the step of transmitting each of the plurality of analog information waves at its pre-selected frequency and each corresponding synchronizing wave within the time slot allocated to them are performed at a plurality of transmission locations.

165. Method as claimed in claim 163 wherein the step of receiving each of the plurality of analog information waves at its pre-selected frequency and each corresponding synchronizing wave within the time slot allocated to them, the step of determining the amplitudes of each of the plurality of analog information waves at its pre-selected frequency and each corresponding synchronizing wave received during the

61 time slot allocated to them, the step of generating an output digital signal for each of the plurality of information waves received during each allocated time slot, and the step of calibrating each of the plurality of output digital signals are performed at a plurality of receiving locations.

166. A method of digital information transfer comprising the steps of:
  a) transmitting generating repetitive synchronizing waves of a pre-set wave form and frequency;
  b) transmitting the synchronizing waves to one or more remote transmission locations;
  c) receiving the synchronizing waves at each of the remote transmission locations;
  d) allocating a plurality of source digital signals to unique repetitive time slots with a plurality of source digital signals being allocated to each time slot, a synchronizing wave being generated in each time slot, and the allocated time slots being cycled at a selected frequency;
  e) generating an analog information wave for each of the plurality of source digital signals in each allocated time slot, the information waves for each of the plurality of source digital signals within each time slot being of pre-selected wave forms and distinct frequencies, each of the information wave frequencies also being distinct from the frequency of the synchronizing waves, and the amplitude of each information wave being a function of the magnitude of the corresponding source digital signal as measured during the allocated time slot for the signal;
  f) transmitting each of the plurality of analog information waves at its pre-selected frequency and each corresponding synchronizing wave within the time slot allocated to them;
  g) receiving at one or more locations each of the plurality of analog information waves at its pre-selected frequency and each corresponding synchronizing wave within the time slot allocated to them;
  h) determining the amplitudes of each of the plurality of analog information waves at its pre-selected frequency and each corresponding synchronizing wave received during the time slot allocated to them;
  i) generating an output digital signal for each of the plurality of information waves received during each allocated time slot, each said output digital signal having a digital magnitude which is a function of the amplitude of the corresponding received information wave; and
  j) calibrating each of the plurality of output digital signals generated in each time slot by comparison of the amplitude of the corresponding synchronizing wave as received in said time slot with its known amplitude as transmitted.

167. A method of digital information transfer comprising the steps of:
  a) generating repetitive synchronizing waves of a pre-set wave form and frequency;
  b) allocating a plurality of source digital signals to unique repetitive time slots with a plurality of source digital signals being allocated to each time slot, a synchronizing wave being generated in each time slot, and the allocated time slots being cycled at a selected frequency;
  c) generating an analog information wave for each of the plurality of source digital signals in each allocated time slot, the information waves for each of the plurality of source digital signals within each time slot being of pre-selected wave forms and distinct frequencies, each of the information wave frequencies also being distinct from the frequency of the synchronizing waves, and the ratio of the amplitude of each information wave to the amplitude of the corresponding synchronizing wave being a function of the magnitude of the corresponding source digital signal as measured during the allocated time slot for the signal;
  d) transmitting each of the plurality of analog information waves at its pre-selected frequency and each corresponding synchronizing wave within the time slot allocated to them;
  e) receiving each of the plurality of analog information waves at its pre-selected frequency and each corresponding synchronizing wave within the time slot allocated to them;
  f) determining the amplitudes of each of the plurality of analog information waves at its pre-selected frequency and each corresponding synchronizing wave received during the time slot allocated to them; and
  g) generating an output digital signal for each of the plurality of information waves received during each allocated time slot, each said output digital signal having a digital magnitude which is a function of the ratio of the amplitude of the corresponding received information wave to the amplitude of the received synchronizing wave.

168. Method as claimed in claim 167 wherein the step of allocating a plurality of source digital signals to unique repetitive time slots, the step of generating an analog information wave for each of the plurality of source digital signals in each allocated time slot, and the step of transmitting each of the plurality of analog information waves at its pre-selected frequency and each corresponding synchronizing wave within the time slot allocated to them are performed at a plurality of transmission locations.

169. Method as claimed in claim 167 wherein the step of receiving each of the plurality of analog information waves at its pre-selected frequency and each corresponding synchronizing wave within the time slot allocated to them, the step of determining the amplitudes of each of the plurality of analog information waves at its pre-selected frequency and each corresponding synchronizing wave received during the time slot allocated to them, and the step of generating an output digital signal for each of the plurality of information waves received during each allocated time slot are performed at a plurality of receiving locations.

170. A method of digital information transfer comprising the steps of:
  a) generating repetitive synchronizing waves of a pre-set wave form and frequency;
  b) transmitting the synchronizing waves to one or more remote transmission locations;
  c) receiving the synchronizing waves at each of the remote transmission locations;
  d) allocating a plurality of source digital signals to unique repetitive time slots with a plurality of source digital signals being allocated to each time slot, a synchronizing wave being generated in each time slot, and the allocated time slots being cycled at a selected frequency;
  e) generating an analog information wave for each of the plurality of source digital signals in each allocated time slot, the information waves for each of the plurality of source digital signals within each time slot being of pre-selected wave forms and distinct frequencies, each of the information wave frequencies also being distinct from the frequency of the synchronizing waves, and the ratio of the amplitude of each information wave to the amplitude of the corresponding synchronizing wave being a function of the magnitude of the corresponding source digital signal as measured during the allocated time slot for the signal;

f) transmitting each of the plurality of analog information waves at its pre-selected frequency and each corresponding synchronizing wave within the time slot allocated to them;

g) receiving at one or more locations each of the plurality of analog information waves at its pre-selected frequency and each corresponding synchronizing wave within the time slot allocated to them;

h) determining the amplitudes of each of the plurality of analog information waves at its pre-selected frequency and each corresponding synchronizing wave received during the time slot allocated to them; and i) generating an output digital signal for each of the plurality of information waves received during each allocated time slot, each said output digital signal having a digital magnitude which is a function of the ratio of the amplitude of the corresponding received information wave to the amplitude of the received synchronizing wave.

171. An apparatus for receiving an analog signal comprised of a series of information waves, each information wave being received in an allocated time slot and each information wave being synthesized from a combination of a fundamental frequency wave and a finite number of harmonics of the fundamental frequency wave, and for separating the synthesized wave into its fundamental frequency wave and harmonics comprising:

a) a plurality of pre-amplifiers connected in parallel, each pre-amplifier providing a different level of pre-amplification for the information waves;

b) a plurality of signal power level detectors, each power level detector being connected in series with a pre-amplifier and receiving the pre-amplified information wave from the connected pre-amplifier, and each power level detector measuring the power level of the pre-amplified information wave it receives;

c) a timing control circuit which determines the time period during which each information wave will be admitted to the pre-amplifiers and determines which of the pre-amplified information wave signals from the power level detectors is of an appropriate power level for further processing;

d) an address storage circuit which provides time slot allocations to the timing control circuit;

e) a multiplex circuit which receives the pre-amplified information wave signals from each of the power level detectors and passes only one pre-amplified information wave signal during each allocated time slot;

f) a multi-level impulse filter circuit for separating the fundamental frequency wave and harmonics of the synthesized information waves, said filter circuit comprising (1) a plurality of signal delay circuits connected in parallel, (2) a plurality of delay signal switches, each said switch being connected in series with a signal delay circuit, and (3) a plurality of narrow bandpass filters connected in parallel to each other and connected together in series with each of the delay signal switches;

g) a plurality of final switch circuits, each final switch circuit being connected in series with a narrow bandpass filter, said final switch circuits passing the pre-amplified, separated and filtered fundamental frequency wave and harmonics of each information wave received;

h) a timing circuit which establishes the proper timing of the impulse filter operations;

i) a sample hold and signal reconstruct circuit which re-synthesizes the received analog information wave from the separated and filtered fundamental frequency wave and harmonics;

j) a plurality of positive peak detectors which determine the maximum positive amplitude of the fundamental frequency wave and each harmonic of the re-synthesized information wave;

k) a plurality of negative peak detectors which determine the maximum negative amplitude of the fundamental frequency wave and each harmonic of the re-synthesized information wave, the negative peak detector being connected in parallel with the positive peak detectors;

l) a plurality of analog to digital convertors for converting the peak positive and peak negative amplitudes to digital; and m) an output signal generator for generating an output digital signal based upon the digital values of the positive and negative peaks.

172. An apparatus as claimed in claim 171 further comprising a buffer circuit for transmitting the output digital signal from selected time slots to the address storage circuit to update the time slot allocations.

173. An apparatus as claimed in claim 171 further comprising a calibration circuit for calibrating the fundamental frequency wave and harmonics by comparison of the amplitudes of one or more harmonics transmitted as reference components with a pre-set amplitude at transmission and the amplitudes of the reference components as received.

174. An apparatus for receiving and separating a plurality of simultaneous, combined analog signals of distinct frequencies, each said analog signal being comprised of a series of information waves in allocated time slots, said time slots being common for each of the simultaneous analog signals, said apparatus comprising:

a) a plurality of pre-amplifiers connected in parallel, each pre-amplifier providing a different level of pre-amplification for the plurality of information waves received simultaneously in each time slot;

b) a plurality of signal power level detectors, each power level detector being connected in series with a pre-amplifier and receiving the plurality of pre-amplified information waves in each time slot from the connected pre-amplifier, and each power level detector measuring the power level of the plurality of pre-amplified information waves it receives in each time slot;

c) a timing control circuit which determines the time period during which each information wave will be admitted to the pre-amplifiers and determines which of the pre-amplified signals from the power level detectors is of an appropriate power level for further processing;

d) an address storage circuit which provides time slot allocations to the timing control circuit;

e) a multiplex circuit which receives the pre-amplified information wave signals from each of the power level detectors and passes the simultaneous signals from only one pre-amplifier during each allocated time slot;

f) a multi-level impulse filter comprising a plurality of filter circuits connected in parallel, one for each frequency of analog signal received, each said filter circuit comprising
   (1) a plurality of signal delay circuits connected in parallel,
   (2) a plurality of delay signal switches, each said switch being connected in series with a signal delay circuit, and
   (3) a narrow bandpass filter connected to each of the delay signal switches;

g) a plurality of final switch circuits, each final switch circuit being connected in series with a filter circuit, said final switch circuits passing the pre-amplified, separated and filtered information waves received in each time slot; and h) a timing circuit which establishes the proper timing of the impulse filter operations.

175. An apparatus as claimed in claim 174 further comprising a plurality of power level detectors, each power level detector being connected in series with a final switch circuit, and determining the power level of each of the plurality of separated information waves in each time slot.

176. An apparatus as claimed in claim 174 further comprising a sample hold and signal reconstruct circuit which recombines the separated and filtered information waves in each time slot.

177. An apparatus as claimed in claim 174 further comprising a plurality of analog to digital convertors for converting the separated and filtered information waves received in each time slot to digital.

178. An apparatus as claimed in claim 174 further comprising one or more analog to digital convertors for converting the separated and filtered information waves information waves in each time slot to digital and an output signal generator for generating an output digital signal, for each converted information wave, with a magnitude which is a function of the digital magnitude of the converted information wave.

179. An apparatus as claimed in claim 174 further comprising a calibration circuit for calibrating each of the separated and filtered information waves in each time slot by comparison of the amplitude of one or more information waves having a pre-set amplitude at transmission, in each time slot, with the amplitude of said pre-set information waves as received.

180. An apparatus as claimed in claim 174 further comprising one or more analog to digital convertors for converting the separated and filtered information waves in each time slot to digital, an output signal generator for generating an output digital signal, for each converted information wave, with a magnitude which is a function of the digital magnitude of the converted information wave, and a buffer circuit for transmitting an output digital signal from selected time slots to the address storage circuit to update the time slot allocations.

181. An apparatus for receiving and separating a plurality of simultaneous, combined analog signals of distinct frequencies, each said analog signal being comprised of a series of information waves in allocated time slots, said time slots being common for each of the simultaneous analog signals, said apparatus comprising:

a) a plurality of pre-amplifiers connected in parallel, each pre-amplifier providing a different level of pre-amplification for the plurality of information waves received simultaneously in each time slot;

b) a plurality of signal power level detectors, each power level detector being connected in series with a pre-amplifier and receiving the plurality of pre-amplified information waves in each time slot from the connected pre-amplifier, and each power level detector measuring the power level of the plurality of pre-amplified information waves it receives in each time slot;

c) a timing control circuit which determines the time period during which each information wave will be admitted to the pre-amplifiers and determines which of the pre-amplified signals from the power level detectors is of an appropriate power level for further processing;

d) an address storage circuit which provides time slot allocations to the timing control circuit;

e) a multiplex circuit which receives the pre-amplified information wave signals from each of the power level detectors and passes the simultaneous signals from only one pre-amplifier during each allocated time slot;

f) a multi-level impulse filter circuit for separating the combined analog signals received, said filter circuit comprising
   (1) a plurality of signal delay circuits connected in parallel,
   (2) a plurality of delay signal switches, each said switch being connected in series with a signal delay circuit, and
   (3) a plurality of narrow bandpass filters connected in parallel to each other and connected together in series with each of the delay signal switches;

g) a plurality of final switch circuits, each final switch circuit being connected in series with a narrow bandpass filter, said final switch circuits passing the pre-amplified, separated and filtered information waves received in each time slot; and h) a timing circuit which establishes the proper timing of the impulse filter operations.

182. An apparatus as claimed in claim 181 further comprising a plurality of power level detectors, each power level detector being connected in series with a final switch circuit, and determining the power level of each of the plurality of separated information waves in each time slot.

183. An apparatus as claimed in claim 181 further comprising a sample hold and signal reconstruct circuit which recombines the separated and filtered information waves in each time slot.

184. An apparatus as claimed in claim 181 further comprising a plurality of analog to digital convertors for converting the separated and filtered information waves received in each time slot to digital.

185. An apparatus as claimed in claim 181 further comprising one or more analog to digital convertors for converting the separated and filtered information waves information waves in each time slot to digital and an output signal generator for generating an output digital signal, for each converted information wave, with a magnitude which is a function of the digital magnitude of the converted information wave.

186. An apparatus as claimed in claim 181 further comprising a calibration circuit for calibrating each of the separated and filtered information waves in each time slot by comparison of the amplitude of one or more information waves having a pre-set amplitude at transmission, in each time slot, with the amplitude of said pre-set information waves as received.

187. An apparatus as claimed in claim 181 further comprising one or more analog to digital convertors for converting the separated and filtered information waves in each time slot to digital, an output signal generator for generating an output digital signal, for each converted information wave, with a magnitude which is a function of the digital magnitude of the converted information wave, and a buffer circuit for transmitting an output digital signal from selected time slots to the address storage circuit to update the time slot allocations.

188. An apparatus for receiving and separating a plurality of simultaneous, combined analog signals of distinct frequencies, each said analog signal being comprised of a series of information waves in allocated time slots, said time slots being common for each of the simultaneous analog signals, said apparatus comprising:

a) a plurality of pre-amplifiers connected in parallel, each pre-amplifier providing a different level of pre-amplification for the plurality of information waves received simultaneously in each time slot;

b) a plurality of signal power level detectors, each power level detector being connected in series with a pre-amplifier and receiving the plurality of pre-amplified information waves in each time slot from the connected pre-amplifier, and each power level detector measuring the power level of the plurality of pre-amplified information waves it receives in each time slot;

c) a timing control circuit which determines the time period during which each information wave will be admitted to the pre-amplifiers and determines which of the pre-amplified signals from the power level detectors is of an appropriate power level for further processing;

d) an address storage circuit which provides time slot allocations to the timing control circuit;

e) a multiplex circuit which receives the pre-amplified information wave signals from each of the power level detectors and passes the simultaneous signals from only one pre-amplifier during each allocated time slot;

f) a multi-level impulse filter comprising a plurality of filter circuits connected in parallel, one for each frequency of analog signal received, each said filter circuit comprising
  (1) a plurality of signal delay circuits connected in parallel,
  (2) a plurality of delay signal switches, each said switch being connected in series with a signal delay circuit, and
  (3) a narrow bandpass filter connected to each of the delay signal switches;

g) a plurality of final switch circuits, each final switch circuit being connected in series with a filter circuit, said final switch circuits passing the pre-amplified, separated and filtered information waves received in each time slot; and h) a timing circuit which establishes the proper timing of the impulse filter operations;

i) a plurality of power level detectors, each power level detector being connected in series with a final switch circuit, and determining the power level of each of the plurality of separated information waves in each time slot;

j) a plurality of analog to digital convertors for converting the separated and filtered information waves received in each time slot to digital; and k) an output signal generator for generating an output digital signal, for each converted information wave, with a magnitude which is a function of the digital magnitude of the converted information wave.

189. An apparatus as claimed in claim 188 further comprising a sample hold and signal reconstruct circuit which recombines the separated and filtered information waves in each time slot.

190. An apparatus as claimed in claim 188 further comprising a calibration circuit for calibrating each of the separated and filtered information waves in each time slot by comparison of the amplitude of one or more information waves having a pre-set amplitude at transmission, in each time slot, with the amplitude of said pre-set information waves as received.

191. An apparatus as claimed in claim 188 further comprising a buffer circuit for transmitting an output digital signal from selected time slots to the address storage circuit to update the time slot allocations.

192. An apparatus for receiving and separating a plurality of simultaneous, combined analog signals of distinct frequencies, each said analog signal being comprised of a series of information waves in allocated time slots, said time slots being common for each of the simultaneous analog signals, said apparatus comprising:

a) a plurality of pre-amplifiers connected in parallel, each pre-amplifier providing a different level of pre-amplification for the plurality of information waves received simultaneously in each time slot;

b) a plurality of signal power level detectors, each power level detector being connected in series with a pre-amplifier and receiving the plurality of pre-amplified information waves in each time slot from the connected pre-amplifier, and each power level detector measuring the power level of the plurality of pre-amplified information waves it receives in each time slot;

c) a timing control circuit which determines the time period during which each information wave will be admitted to the pre-amplifiers and determines which of the pre-amplified signals from the power level detectors is of an appropriate power level for further processing;

d) an address storage circuit which provides time slot allocations to the timing control circuit;

e) a multiplex circuit which receives the pre-amplified information wave signals from each of the power level detectors and passes the simultaneous signals from only one pre-amplifier during each allocated time slot;

f) a multi-level impulse filter circuit for separating the combined analog signals received, said filter circuit comprising
  (1) a plurality of signal delay circuits connected in parallel,
  (2) a plurality of delay signal switches, each said switch being connected in series with a signal delay circuit, and
  (3) a plurality of narrow bandpass filters connected in parallel to each other and connected together in series with each of the delay signal switches;

g) a plurality of final switch circuits, each final switch circuit being connected in series with a narrow bandpass filter, said final switch circuits passing the pre-amplified, separated and filtered information waves received in each time slot; and h) a timing circuit which establishes the proper timing of the impulse filter operations;

i) a plurality of power level detectors, each power level detector being connected in series with a final switch circuit, and determining the power level of each of the plurality of separated information waves in each time slot;

j) a plurality of analog to digital convertors for converting the separated and filtered information waves received in each time slot to digital; and k) an output signal generator for generating an output digital signal, for each converted information wave, with a magnitude which is a function of the digital magnitude of the converted information wave.

193. An apparatus as claimed in claim 192 further comprising a sample hold and signal reconstruct circuit which recombines the separated and filtered information waves in each time slot.

194. An apparatus as claimed in claim 192 further comprising a calibration circuit for calibrating each of the separated and filtered information waves in each time slot by comparison of the amplitude of one or more information waves having a pre-set amplitude at transmission, in each time slot, with the amplitude of said pre-set information waves as received.

195. An apparatus as claimed in claim 192 further comprising a buffer circuit for transmitting an output digital signal from selected time slots to the address storage circuit to update the time slot allocations.

196. An apparatus for separating a plurality of simultaneous, combined analog signals of distinct frequencies, each said analog signal being comprised of a series of information waves in allocated time slots, said time slots being common for each of the simultaneous analog signals, said apparatus comprising:

a) a multi-level impulse filter comprising a plurality of filter circuits connected in parallel, one for each frequency of analog signal received, each said filter circuit comprising (1) a plurality of signal delay circuits connected in parallel, (2) a plurality of delay signal switches, each said switch being connected in series with a signal delay circuit, and (3) a narrow bandpass filter connected to each of the delay signal switches; and b) a plurality of final switch circuits, each final switch circuit being connected in series with a filter circuit.

197. An apparatus for separating a plurality of simultaneous, combined analog signals of distinct frequencies, each said analog signal being comprised of a series of information waves in allocated time slots, said time slots being common for each of the simultaneous analog signals, said apparatus comprising:

a) a multi-level impulse filter circuit, said filter circuit comprising (1) a plurality of signal delay circuits connected in parallel, (2) a plurality of delay signal switches, each said switch being connected in series with a signal delay circuit, and (3) a plurality of narrow bandpass filters connected in parallel to each other and connected together in series with each of the delay signal switches; and b) a plurality of final switch circuits, each final switch circuit being connected in series with a narrow bandpass filter.

* * * * *